United States Patent
Choe et al.

(10) Patent No.: US 9,037,296 B2
(45) Date of Patent: May 19, 2015

(54) ROBOT CLEANER, AND SYSTEM AND METHOD FOR REMOTELY CONTROLLING THE SAME

(75) Inventors: Suuk Choe, Changwon-Si (KR);
Sunghun Lee, Changwon-Si (KR);
Junho Jang, Changwon-Si (KR);
Hyunwoong Park, Changwon-Si (KR);
Seungmin Baek, Changwon-Si (KR);
Yiebin Kim, Changwon-Si (KR)

(73) Assignee: LG Electronics Inc., Seoul (KR)

(*) Notice: Subject to any disclaimer, the term of this patent is extended or adjusted under 35 U.S.C. 154(b) by 292 days.

(21) Appl. No.: 13/605,513

(22) Filed: Sep. 6, 2012

(65) Prior Publication Data

US 2013/0060379 A1 Mar. 7, 2013

(30) Foreign Application Priority Data

Sep. 7, 2011 (KR) .................. 10-2011-0090875
Sep. 7, 2011 (KR) .................. 10-2011-0090879

(51) Int. Cl.
| | |
|---|---|
| G06F 19/00 | (2011.01) |
| B25J 5/00 | (2006.01) |
| G06N 3/00 | (2006.01) |
| H04M 1/725 | (2006.01) |
| B60L 1/00 | (2006.01) |
| B60L 11/18 | (2006.01) |

(52) U.S. Cl.
CPC ............. *G06N 3/008* (2013.01); *A47L 2201/04* (2013.01); *H04M 1/72533* (2013.01); *B60L 1/003* (2013.01); *B60L 11/1805* (2013.01); *B60L 2250/16* (2013.01); *B60L 2260/32* (2013.01); *Y02T 10/7005* (2013.01); *Y10S 901/47* (2013.01)

(58) Field of Classification Search
USPC ........ 700/245, 258, 259, 250, 1, 3; 901/1, 46, 901/47; 318/568.12; 180/167
See application file for complete search history.

(56) References Cited

U.S. PATENT DOCUMENTS

| | | | |
|---|---|---|---|
| 6,611,738 B2 * | 8/2003 | Ruffner ........................... | 701/23 |
| 2002/0156556 A1 * | 10/2002 | Ruffner ........................... | 701/23 |
| 2003/0216834 A1 * | 11/2003 | Allard ............................ | 700/245 |
| 2005/0222933 A1 * | 10/2005 | Wesby ............................ | 705/36 |
| 2008/0039974 A1 * | 2/2008 | Sandin et al. .................. | 700/258 |
| 2010/0046365 A1 * | 2/2010 | Ozaki ............................. | 370/220 |
| 2010/0063628 A1 * | 3/2010 | Landry et al. ................. | 700/258 |

FOREIGN PATENT DOCUMENTS

| | | |
|---|---|---|
| JP | 2003-205483 A | 7/2003 |
| JP | 2005319526 A | 11/2005 |
| KR | 10-2004-0003088 A | 1/2004 |
| KR | 10-2007-0102197 A | 10/2007 |
| KR | 10-0821162 B1 | 4/2008 |
| KR | 10-2008-0050954 A | 6/2008 |
| KR | 10-2011-0018211 A | 2/2011 |

* cited by examiner

*Primary Examiner* — Ronnie Mancho
(74) *Attorney, Agent, or Firm* — McKenna Long & Aldridge LLP

(57) ABSTRACT

Disclosed are a robot cleaner, and a system and method for remotely controlling the robot cleaner. Since the robot cleaner is accessed to a terminal through a network, the robot cleaner can be controlled in more various manners. A situation inside a house can be real-time checked from the outside, and the satiation can be rapidly handled according to a state of the robot cleaner. Since the terminal and the robot cleaner are connected to each other through a network, a voice call function and an interphone function can be implemented. Furthermore, the robot cleaner can perform automatic cleaning, manual cleaning, and reservation cleaning in an autonomous manner, or in a remote-controlled manner.

23 Claims, 52 Drawing Sheets

ROBOT CLEANER, AND SYSTEM AND METHOD FOR REMOTELY CONTROLLING THE SAME

CROSS-REFERENCE TO RELATED APPLICATION

Pursuant to 35 U.S.C. §119(a), this application claims the benefit of earlier filing date and right of priority to Korean Applications No. 10-2011-0090875, filed on Sep. 7, 2011 and No. 10-2011-0090879, filed on Sep. 7, 2011, the contents of which is incorporated by reference herein in its entirety.

BACKGROUND OF THE DISCLOSURE

1. Field of the Disclosure

The present disclosure relates to a remotely-controllable robot cleaner, a terminal for remotely-controlling the robot cleaner, and a system and method for remotely-controlling the same.

2. Background of the Disclosure

Generally, a robot has been developed for an industrial use, and has managed some parts of factory automation. As the robot is applied to various fields recently, medical robots, space robots, home robots used at homes, etc. are being developed.

A representative of the home robots is a robot cleaner, a kind of home electronic appliance capable of performing a cleaning operation by sucking peripheral dust particles or foreign materials while autonomously moving on a predetermined region. This robot cleaner is provided with a chargeable battery, and is provided with an obstacle sensor for avoiding an obstacle while moving.

The robot cleaner is controlled by using a remote controller (a user interface), buttons provided at a cleaner body, etc. Nowadays, a robot cleaner capable of recognizing a self position and creating a map using a camera or each type of sensors, is being developed.

SUMMARY OF THE DISCLOSURE

Therefore, an aspect of the detailed description is to provide a robot cleaner remotely-controlled by a terminal, and capable of performing a cleaning operation by a cleaning command of the terminal.

Another aspect of the detailed description is to provide a terminal for remotely-controlling a robot cleaner, the terminal capable of performing automatic cleaning, manual cleaning, reservation cleaning, cleaning mode change, etc., and capable of real-time checking a state of the robot cleaner.

Still another aspect of the detailed description is to provide a remote-controlling system and method including a robot cleaner and a terminal, and capable of remotely-controlling the robot cleaner, capable of remotely-monitoring the periphery of the robot cleaner, and capable of real-time checking a state of the robot cleaner.

To achieve these and other advantages and in accordance with the purpose of this specification, as embodied and broadly described herein, there is provided a robot cleaner, comprising: a communication unit configured to receive a control signal from an external terminal, and to transmit a response signal with respect to the control signal; and a control unit configured to execute a control command by extracting the control command from the control signal, and configured to create the response signal, wherein the control unit is configured to extract a cleaning start command or a cleaning stop command from the control signal, and is configured to perform a cleaning operation according to the cleaning start command, or to stop the cleaning operation according to the cleaning stop command.

According to one embodiment, the communication unit may be configured to receive cleaning reservation information from the terminal, and the control unit may perform a cleaning operation based on the cleaning reservation information.

According to another embodiment, the control unit may be configured to extract an audio signal from the control signal, and to execute a control command corresponding to the audio signal.

The robot cleaner may further comprise an audio output unit configured to output the audio signal to the outside.

The robot cleaner may further comprise an audio recognition unit configured to extract an audio signal from a peripheral sound, and to recognize the extracted audio signal. The control unit may be configured to convert the audio signal recognized by the audio recognition unit, into the response signal.

To achieve these and other advantages and in accordance with the purpose of this specification, as embodied and broadly described herein, there is also provided a system for remotely-controlling a robot cleaner, the system comprising: a robot cleaner configured to execute a control command included in a control signal by receiving the control signal, and configured to transmit, to the terminal, one or more data including image information or a cleaning map; and a terminal configured to create the control signal corresponding to the control command and to transmit the control signal to the robot cleaner, and configured to create a control screen based on the data and to display the control screen, wherein the control command includes a cleaning start command or a cleaning stop command.

To achieve these and other advantages and in accordance with the purpose of this specification, as embodied and broadly described herein, there is still also provided a method for remotely-controlling a robot cleaner in a system including a robot cleaner, and a terminal for controlling the robot cleaner, the method comprising: the robot cleaner's receiving a control signal from the terminal; the robot cleaner's extracting, from the control signal, a control command including a cleaning start command or a cleaning stop command; and the robot cleaner's performing a cleaning operation according to the cleaning start command, or the robot cleaner's stopping the cleaning operation according to the cleaning stop command.

The method for remotely-controlling a robot cleaner may further comprise: the terminal's receiving an input of an audio signal; the terminal's converting the audio signal into a control signal, and transmitting the control signal to the robot cleaner; the robot cleaner's extracting the audio signal from the control signal; and the robot cleaner's outputting the audio signal to the outside.

In the system and method for remotely-controlling a robot cleaner, the robot cleaner may be provided with a remote-controlling communication means mounted therein, such that it is easily controlled from the outside by a terminal such as a mobile terminal.

The robot cleaner may perform automatic cleaning, manual cleaning and reservation cleaning, in an autonomous manner or in a remote-controlled manner. The robot cleaner may perform a charging operation by real-time checking a state of a battery while performing a cleaning operation. The robot cleaner may real-time transmit state information to the terminal, such that a user easily checks a state of the robot cleaner through the terminal. And, the robot cleaner may execute a control command through voice recognition, and may execute a voice call through the terminal.

The terminal may easily remote-control the robot cleaner by executing a remote control program, and may allow a user to real-time check a state of the robot cleaner or a peripheral situation.

The terminal may enhance cleaning efficiency by controlling the robot cleaner to perform automatic cleaning, manual cleaning, reservation cleaning, cleaning mode change, etc., In the system and method for remotely-controlling a robot cleaner, the robot cleaner may be controlled in various manners, as the robot cleaner and the terminal are accessed to each other through a network.

In the system and method for remote-controlling a robot cleaner, a situation inside a house may be real-time checked from the outside, and the situation may be rapidly handled according to a state of the robot cleaner.

Since the robot cleaner and the terminal are accessed to each other through a network, a voice call function or an interphone function may be executed.

In the present disclosure, a user's convenience may be enhanced, and operation efficiency and stability of the robot cleaner may be enhanced.

Furthermore, when a user accesses the robot cleaner through the terminal, the robot cleaner may perform an access authentication operation. This may prevent misuse of the robot cleaner.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Figure 6:
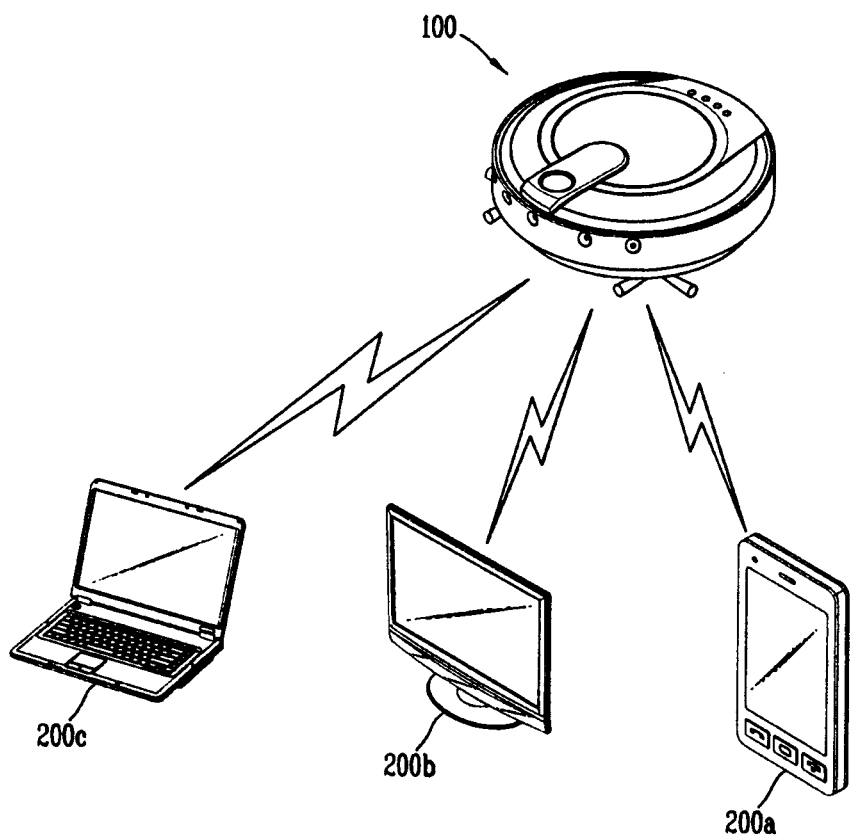
FIG. 6 is a view schematically showing a remote control system for a robot cleaner according to an embodiment.

Referring to FIG. 6, a system for remotely controlling a robot cleaner according to an embodiment, comprises one or more robot cleaners 100, and a terminal 200. The robot cleaner 100 is configured to execute a control command included in a control signal by receiving the control signal, and configured to transmit, to the terminal 200, one or more data including image information or a cleaning map. The terminal 200 is configured to create a control signal corresponding to a control command and to transmit the control signal to the robot cleaner 100, and configured to create a control screen based on the data received from the robot cleaner and to display the control screen. Here, the control command includes a cleaning start command or a cleaning stop command. Alternatively, the control command may include a patrol command, a moving command, a charging command, a setting change command, etc.

Generally, the terminal is categorized into a mobile/portable terminal and a stationary terminal according to a movable state. In the present disclosure, the terminal includes the mobile terminal and the stationary terminal. Also, the terminal is categorized into a handheld terminal and a vehicle mount terminal according to a user's portable state. For instance, the terminal includes a cell-phone (PCS phone), a smart phone, a notebook (laptop computer), a digital broadcasting terminal, Personal Digital Assistants (PDA), a Portable Multimedia Player (PMP), a navigation system, etc. A remote controlling system may have a different network scheme according to a type of the terminal. For instance, in case of a cell-phone or a smart phone, the remote controlling system may use a mobile communication network such as 3G, CDMA and WCDMA. In this case, the robot cleaner and the terminal transmit or receive radio signals to/from a base station, an external terminal, a server, etc. on a mobile communication network.

Figure 1:
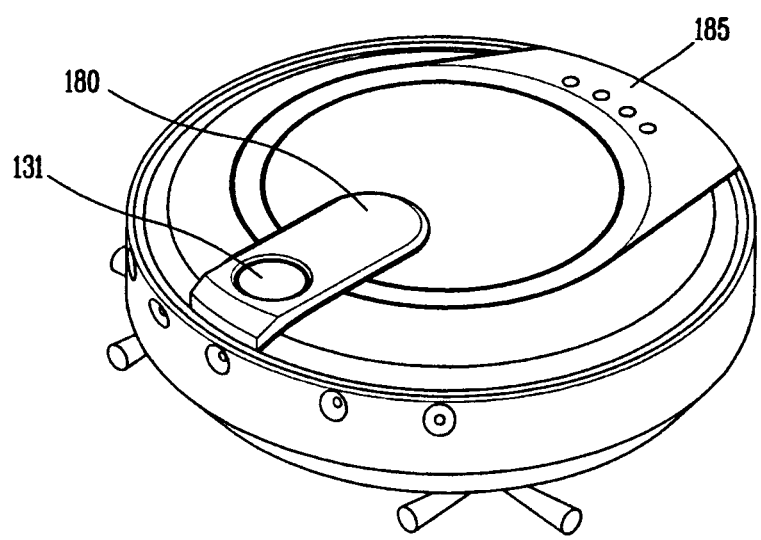
FIG. 1 is a perspective view showing the appearance of a robot cleaner according to embodiments of the present disclosure.
Figure 2:
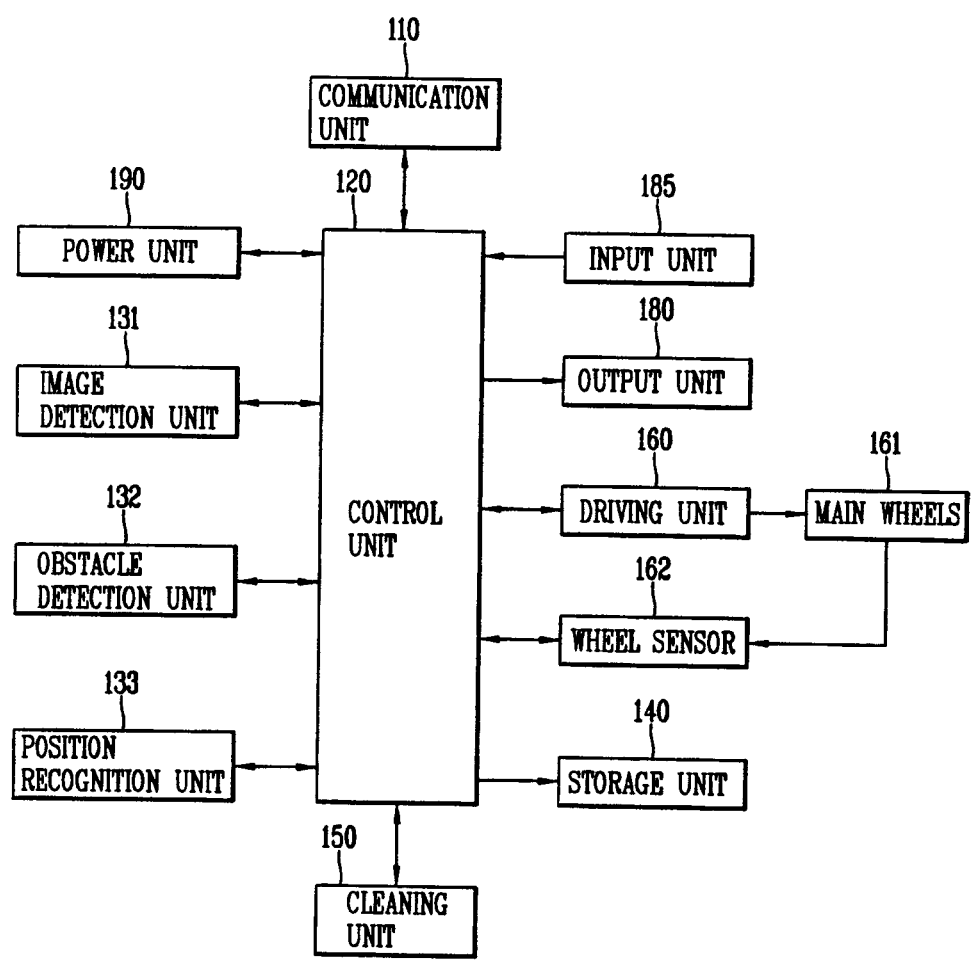
FIGS. 2 and 3 are block diagrams showing a detailed configuration of a robot cleaner according to embodiments of the present disclosure.

Referring to FIGS. 1 and 2, the robot cleaner 100 according to an embodiment of the present disclosure comprises a communication unit 110 and a control unit 120. And, the robot cleaner 100 further comprises an image detection unit 131, an obstacle detection unit 132, and a position recognition unit 133. The communication unit 110 is configured to receive a control signal from an external terminal, and to transmit a response signal with respect to the control signal to the terminal. The control unit 120 is configured to execute a control command by extracting the control command from the control signal, and is configured to create a response signal. The control unit 120 is configured to extract a cleaning start command or a cleaning stop command from the control signal, and is configured to perform a cleaning operation according to the cleaning start command, or to stop the cleaning operation according to the cleaning stop command.

The communication unit 110 is accessed to the terminal through a communication method among currently-available communication methods including a wired communication method, a radio communication method and a satellite communication method, thereby exchanging signals and data with the terminal. The communication unit 110 receives a control signal from the terminal, and transmits state information of the robot cleaner, obstacle information, position information, image information, a map, etc. Furthermore, the communication unit 110 may perform communication with the terminal, using one of short range radio communications including a radio frequency (RF) communication, Bluetooth, an infrared ray communication (IrDA), a wireless LAN, zigbee, etc. For instance, if the terminal is a smart phone, the robot cleaner may be further provided with a communication unit according to a communication method which can be used by the smart phone. The communication unit 110 receives, from the terminal 200, cleaning reservation information of the robot cleaner. The control unit 120 performs a cleaning operation based on the cleaning reservation information.

Figure 3:
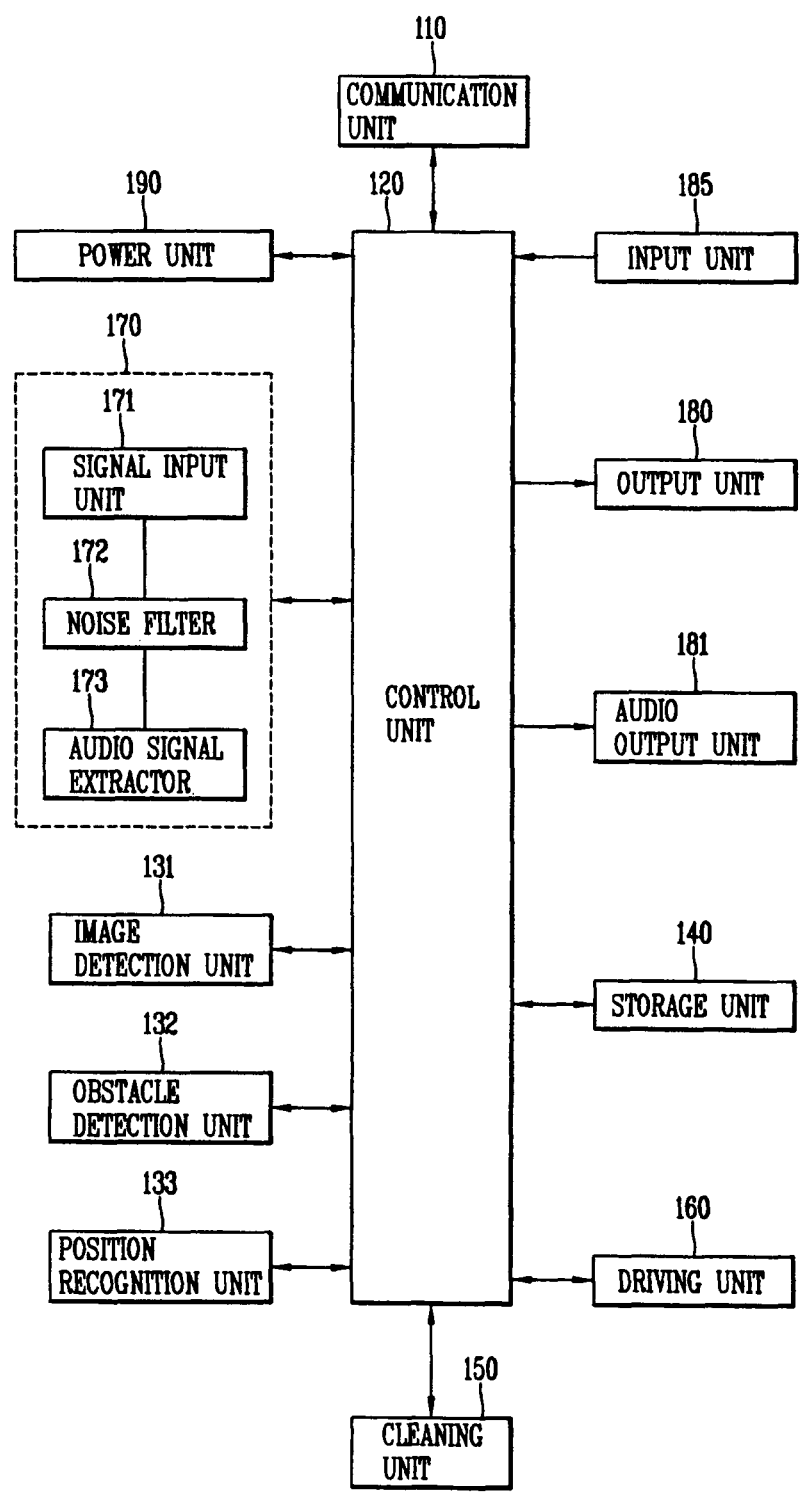

Referring to FIGS. 1 to 3, the robot cleaner may further comprise an image detection unit 131 installed towards the upper side or the front side, provided with an upper camera sensor, and configured to detect image information by capturing the periphery of the robot cleaner. If the image detection unit 131 is provided with a plurality of upper camera sensors, the camera sensors may be formed on the upper surface or the side surface of the robot cleaner, at constant intervals or at constant angles. The image detection unit 131 may be used as another type of position recognition unit. The image detection unit 131 may further include a camera configured to capture a subject, a lens connected to the camera and focusing the camera on the subject, a camera controller configured to control the camera, and a lens controller configured to control the lens. As the lens, preferably used is a lens having a wide view angle so that all the peripheral regions, e.g., all the regions on the ceiling may be captured at a predetermined position. The control unit 120 may extract feature points from the image information captured by the image detection unit. Then, the control unit 120 may recognize the position of the robot cleaner based on the feature points, and may create a map with respect to a cleaning region.

Referring to FIG. 2 or 3, the robot cleaner further includes an obstacle detection unit 132 having one or more sensors, and configured to detect peripheral obstacles using detection signals of the sensors, and to output obstacle information. The control unit 120 creates a map based on the obstacle information.

Figure 4:
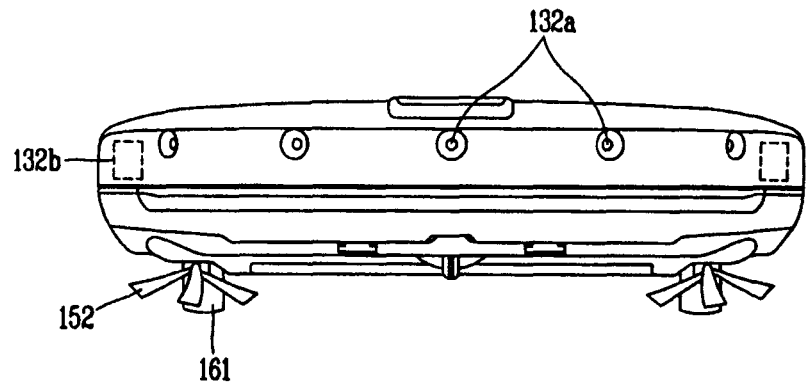
FIG. 4 is an enlarged view of an output unit of a robot cleaner according to an embodiment.

As shown in FIG. 1 or 4, the obstacle detection unit 132 includes first sensors 132a installed on a front circumferential surface of the robot cleaner at constant intervals. And, the obstacle detection unit 132 may include second sensors 132b protruding towards the outside of a body. Positions and types of the first and second sensors may be variable according to a type of the robot cleaner, and the obstacle detection unit may include various sensors. The first sensors are configured to detect an object which exists in a moving direction of the robot cleaner, i.e. an obstacle, and then transmits obstacle information to the control unit 120. That is, the first sensors detect protrusions, appliances, furniture, wall surfaces, wall corners, etc. which exist on a moving path of the robot cleaner, and then transmits obstacle information to the control unit 120. The first sensor may be implemented as an infrared ray sensor, an ultrasonic sensor, an RF sensor, a geomagnetic sensor, etc. And, the second sensors 132b detect an obstacle which exists at the front or lateral side, and transmits obstacle information to the control unit 120. That is, the second sensors detect protrusions, appliances, furniture, wall surfaces, wall corners, etc. which exist on a moving path of the robot cleaner, and then transmit obstacle information to the control unit 120. The second sensor may be implemented as an infrared ray sensor, an ultrasonic sensor, an RF sensor, a position sensitive device (PSD) sensor, etc.

Figure 5:
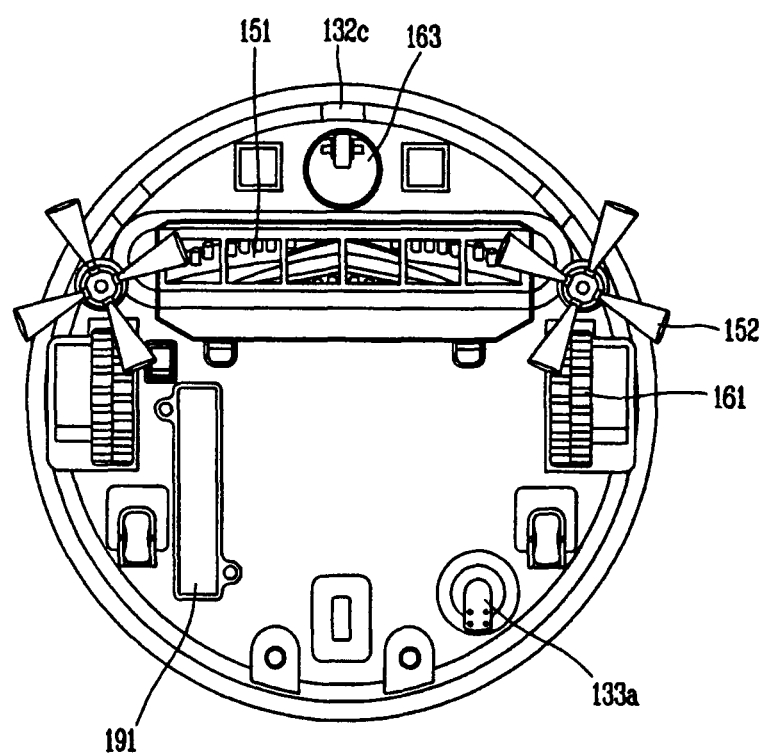
FIG. 5 is a rear view showing the bottom surface of a robot cleaner according to an embodiment.

As shown in FIG. 5, the obstacle detection unit 132 may further include a cliff sensor 132c installed at the bottom surface of the body, and configured to detect an obstacle which is on the floor, e.g., a cliff. The cliff sensor is configured to obtain stable measurement values regardless of reflectivity of the floor and a color difference. Like the PSD sensor, the cliff sensor may be implemented in the form of an infrared ray module.

The obstacle detection unit 132 may further include a charging signal sensor (not shown) for receiving a guide signal transmitted from a charging station. The robot cleaner receives a guide signal transmitted from the charging station using the charging signals sensor, thereby checking a position and a direction of the charging station. The charging station creates a guide signal indicating a direction and a distance so that the robot cleaner can return to the charging station. The robot cleaner receives the guide signal transmitted from the charging station, and determines the current position and sets a moving direction. Then, the robot cleaner returns to the charging station. The charging signal sensor may be implemented as an infrared ray sensor, an ultrasonic sensor, a radio frequency (RF) sensor, etc, and may be generally used as an infrared ray sensor. The charging signal sensor is provided at an inner or outer side of the robot cleaner. For instance, the charging signal sensor may be installed below an output unit 180, or at the periphery of the image detection unit 131.

The output unit 180 may display, on the screen, the remaining amount of a battery. And, the terminal 200 may display, on one side of the screen of a display unit, a charged state and the remaining amount of the battery.

Referring to FIG. 2 or 3, the robot cleaner further includes a position recognition unit 133 having one or more sensors, and configured to recognize the position of the robot cleaner using detection signals of the sensors, and configured to output position information. The control unit 120 corrects a map using the position information output from the position recognition unit 133.

As shown in FIG. 5, the position recognition unit 133 includes a lower camera sensor 133a provided on the rear surface of the robot cleaner, and configured to capture the floor (i.e., a surface to be cleaned) while the robot cleaner moves. The lower camera sensor 133a is called an 'optical flow sensor', and converts a lower side image inputted from an image sensor provided therein thus to create a predetermine type of image data. The lower camera data may detect the position of the robot cleaner regardless of sliding of the robot cleaner. The control unit 120 real-time compares image data captured by the lower camera sensor to each other, thus to calculate a moving distance and a moving direction, thereby calculating the position of the robot cleaner. As the lower side of the robot cleaner is observed by the lower camera sensor, the controller can compensate for an error due to sliding of the robot cleaner, the sliding occurred at a position calculated by other means.

The position recognition unit 133 further includes an acceleration sensor configured to sense a change of a moving speed, due to start, stop, direction conversion, collision with an object, etc. The acceleration sensor may be attached to a region close to the main wheels or the auxiliary wheels, and may be sense sliding or idle rotation of the wheels. A moving speed of the robot cleaner may be calculated based on an acceleration sensed by the acceleration sensor, and the calculated moving speed is compared with a reference speed, thereby checking or compensating for the position of the robot cleaner. However, the acceleration sensor is generally mounted in the control unit 120, and senses a speed change of the robot cleaner occurring in a cleaning mode or a running mode. That is, the acceleration sensor senses an impact amount due to a speed change, and outputs a voltage corresponding to the impact amount. Accordingly, the acceleration sensor may perform functions of an electronic bumper.

The position recognition unit 133 further includes a gyro sensor configured to sense a rotation direction and a rotation angle when the robot cleaner moves or cleans. The gyro sensor senses an angular speed of the robot cleaner, and outputs a voltage proportional to the angular speed. The control unit 120 calculates a rotation direction and a rotation angle of the robot cleaner based on the voltage outputted from the gyro sensor.

Referring to FIG. 2 or 3, the position recognition unit 133 may further include wheel sensors 162 connected to the right and left main wheels 161, and sensing RPMs of the right and left main wheels 161. The wheel sensors 162 may be implemented as a rotary encoder. When the robot cleaner moves in a running mode or a cleaning mode, the rotary encoder senses RPMs of the right and left main wheels, and outputs the sensed RPMs. The control unit 120 may calculate rotation speeds of the right and left main wheels based on the sensed RPMs. The control unit 120 may precisely recognize the position of the robot cleaner based on detection information sensed by the acceleration sensor, the gyro sensor, the wheel sensor and the lower camera sensor, and image information obtained by the image detection unit. And, the control unit 120 may create a precise map based on a position of the robot cleaner, the position recognized based on obstacle information obtained by the obstacle detection unit, and image information obtained by the image detection unit. The communication unit 110 transmits, to the terminal, data including image information, obstacle information, position information, a map, a cleaning region, etc.

Referring to FIG. 2 or 3, the robot cleaner may further include a storage unit 140 configured to store therein at least one of image information, obstacle information, position information, a map and a cleaning region. The storage unit 140 is configured to store therein a control program for controlling the robot cleaner, and data associated with the control program. The storage unit 140 may further store therein a cleaning type and a running type. As the storage unit 140, a non-volatile memory (NVM, NVRAM) is mainly used. The NVM indicates a storage device capable of maintaining stored information even if power is not supplied thereto. The NVM includes a ROM, a flash memory, a magnetic computer memory device (e.g., a hard disk, a diskette drive, and a magnetic tape), an optical drive, a magnetic RAM, a PRAM, etc.

Referring to FIG. 2 or 3, the robot cleaner may further include a cleaning unit 150. The cleaning unit 150 consists of a dust box configured to store collected dust particles therein, a suction fan configured to provide a driving power to suck dust particles within a cleaning region, and a suction motor configured to suck air by rotating the suction fan. Referring to FIG. 5, the cleaning unit 150 further includes an agitator 151 rotatably mounted to a lower part of the body of the robot cleaner, and a side brush 152 configured to clean a corner or an edge of a wall, etc. with rotating centering around a vertical shaft of the body. The agitator 151 makes dust particles on the floor or a carpet move to the air with rotating centering around a horizontal shaft of the body of the robot cleaner. A plurality of blades are provided on an outer circumferential surface of the agitator 151 in a spiral form. A brush may be provided between the blades.

Referring to FIG. 5, the robot cleaner is provided with right and left main wheels 161 at two lower sides thereof. A handgrip may be installed at two side surfaces of the wheels, for facilitation of a user's grasp. Referring to FIG. 2 or FIG. 3, the robot cleaner may further include a driving unit 160 connected to the right and left main wheels 161 for driving. The driving unit 160 is provided with wheel motors connected to the right and left main wheels 161, and configured to move the robot cleaner by driving the wheel motors. The wheel motors are connected to the main wheels, respectively thus to rotate the main wheels, and can be rotated in two directions in an independent manner. And, the robot cleaner is provided with one or more auxiliary wheels on the rear surface thereof. The auxiliary wheels serve to support the body, to minimize friction between a lower surface of the body and the bottom surface (surface to be cleaned), and to allow the robot cleaner to smoothly move.

Referring to FIG. 2 or 3, the robot cleaner further includes an input unit 185 through which a user directly inputs a control command to the robot cleaner. The user may input, through the input unit 185, a command instructing an output of one or more information among information stored in a storage unit 140. The input unit 185 may be implemented as one or more buttons. For instance, the input unit 185 may include an OK button and a set button. The OK button is used to input a command for certifying obstacle information, position information, image information, a cleaning region, a map, etc. The set button is used to input a command for setting such information. The input unit may be provided with a reset button for inputting a command for resetting such information, a deletion button, a cleaning start button, a stop button, etc. As another example, the input unit 185 may be provided with a button for setting reservation information, or a button for deleting reservation information. The input unit 185 may be further provided with a button for setting a cleaning mode, or a button for changing a cleaning mode. The input unit 185 may be further provided with a button for inputting a command instructing the robot cleaner to return to a charging station. As shown in FIG. 1, the input unit 185 may be installed at an upper part of the robot cleaner, in the form of hard or soft keys, a touch pad, etc. The input unit 185 may be implemented in the form of a touch screen together with the output unit 180.

As shown in FIG. 1, the output unit 180 is installed at an upper part of the robot cleaner. However, the installation position may be variable. For instance, the output unit 180 outputs, to a screen, reservation information, a battery state, intensive cleaning, space extension, a cleaning or running operation in a zigzag form, etc. The output unit 180 may output the current cleaning state of the robot cleaner, and the current state of each unit of the robot cleaner. The output unit 180 may display, on the screen, obstacle information, position information, image information, a map, a cleaning region, etc. The output unit 180 may be implemented as one of a light emitting diode (LED), a liquid crystal display (LCD), a plasma display panel (PDP), and an organic light emitting diode (OLED).

Referring to FIG. 2 or 3, the robot cleaner further includes a power unit 190. The power unit 190 is provided with a chargeable battery to supply power into the robot cleaner. The power unit 190 supplies, to each unit, a driving power and an operation power required when the robot cleaner moves or when the robot cleaner performs a cleaning operation. When the remaining amount of power is deficient, the robot cleaner moves to a charging station to be supplied with a charging current. The robot cleaner further includes a battery sensing unit (not shown) configured to sense a charged state of a battery, and to transmit detection information to the control unit 120. As the battery 191 is connected to the battery sensing unit, the remaining amount and a charged state of the battery are transmitted to the control unit 120. The remaining amount of battery power may be displayed on the screen of the output unit. As shown in FIG. 5, the battery 191 may be disposed at a central lower part of the robot cleaner. Alternatively, the battery 191 may be disposed at one of the right and left sides so that a dust box can be positioned at the lowest end of the body. In the latter case, the robot cleaner may be further provided with a balance weight for preventing an unbalanced state of the battery.

The control unit 120 presets a reference value (battery remaining amount), and compares the battery remaining amount with the reference value. If the battery remaining amount is less than the reference value as a result of the comparison, the control unit 120 moves the robot cleaner to a charging station for charging. As an example, the control unit 120 may stop other operations according to a charging command applied from the terminal, and move the robot cleaner to the charging station. As another example, the control unit 120 may extract a charging command, and then may execute either the charging command or the previous operation, according to a result of the comparison between the battery remaining amount and the reference value.

Figure 83:
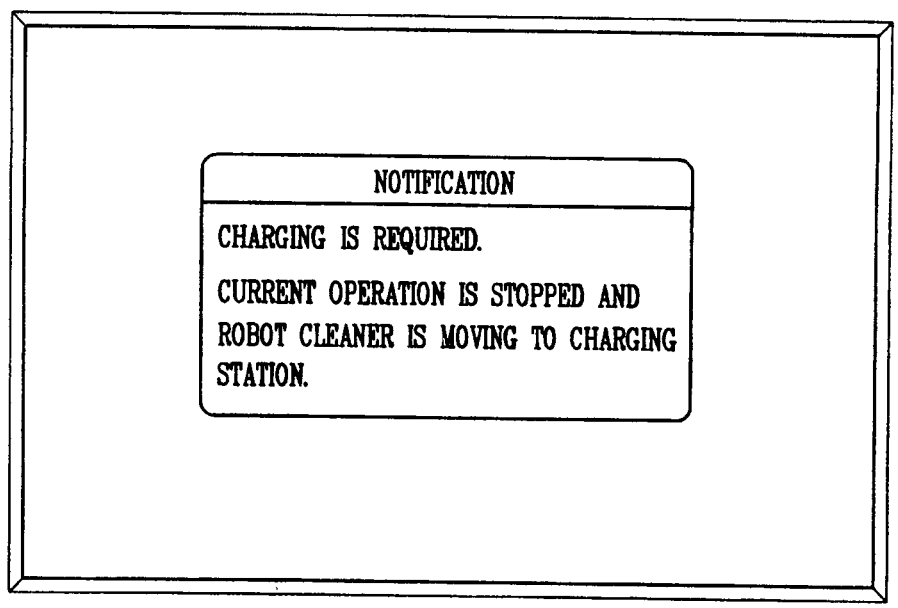
FIGS. 83 to 86 are views showing a screen of a terminal for explaining an automatic charging operation while a robot cleaner performs a cleaning operation or patrols.
Figure 84:
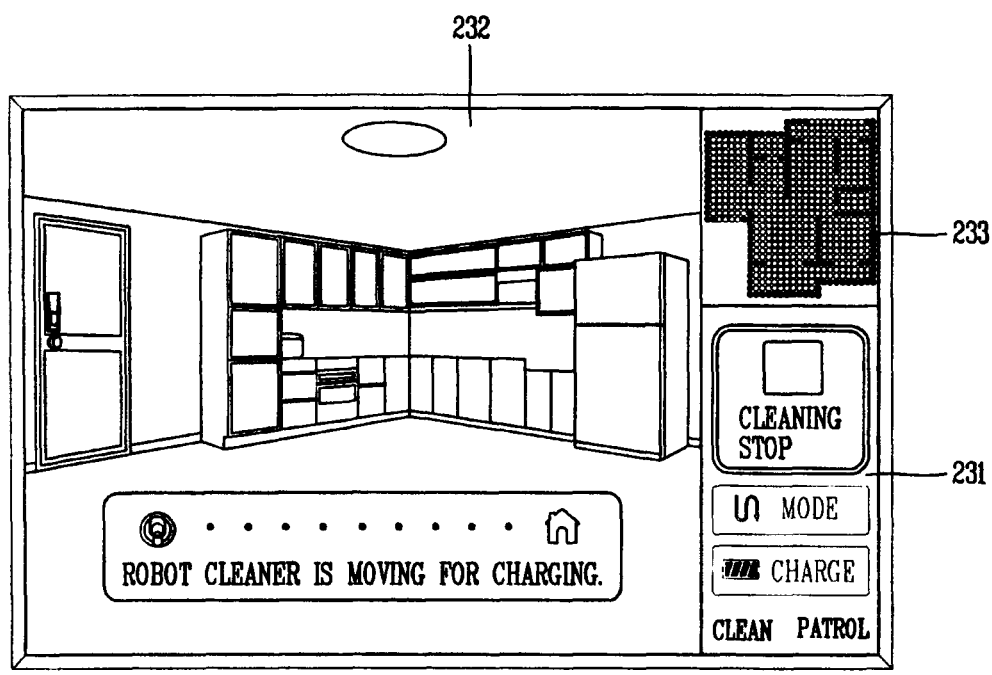
Figure 85:
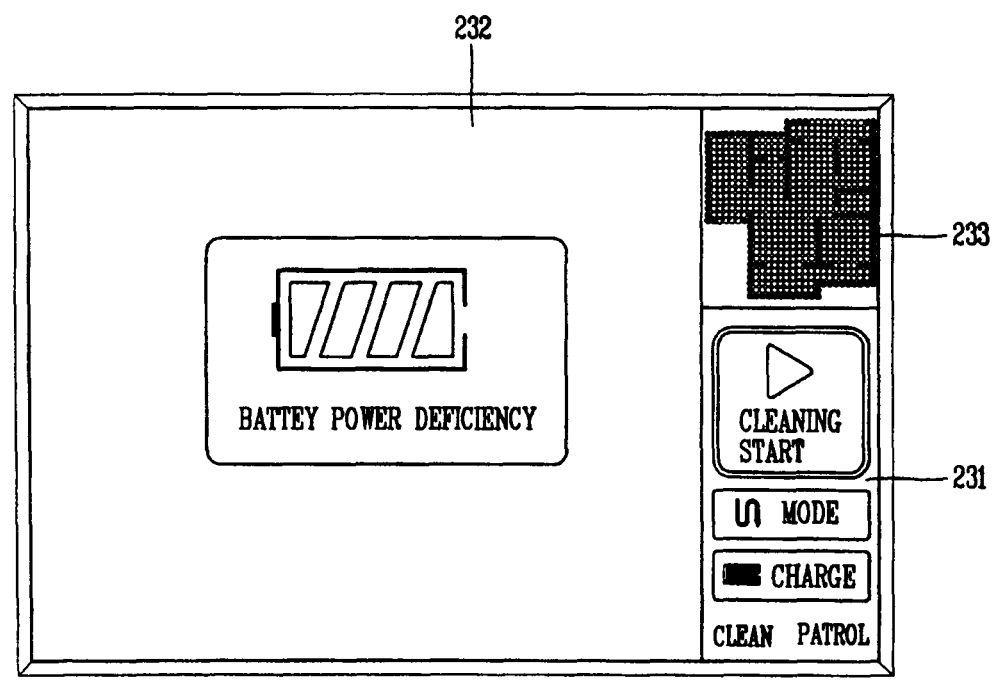
Figure 86:
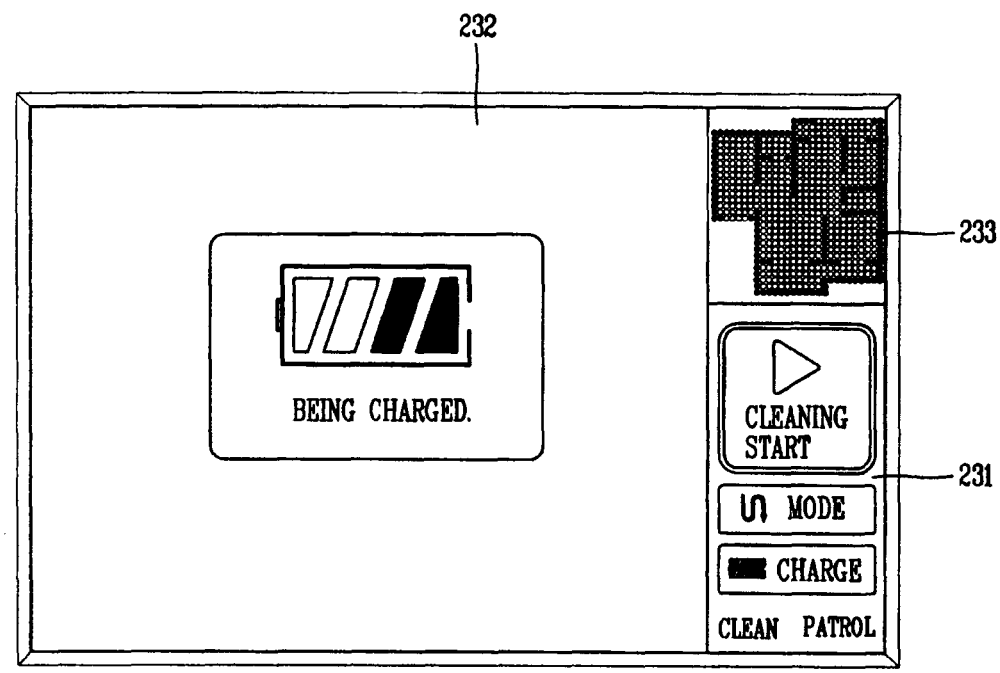

Referring to FIGS. 83 to 86, the robot cleaner 100 may perform an automatic charging operation while performing a cleaning operation. That is, the robot cleaner may perform a charging operation while performing a cleaning operation, by autonomously sensing a charged state of the battery, not by receiving a charging command from the outside. As shown in FIG. 83, the terminal 200 may display a message such as "Charging is required." and "Stop the current operation and move to charging station." The terminal 200 may real-time receive state information from the robot cleaner 100. As shown in FIGS. 84 to 86, the terminal 200 may display a message such as "The robot cleaner is moving for charging.", "The remaining amount of battery is deficient.", "The robot cleaner is being charged.", etc.

Referring to FIG. 3, a robot cleaner according to another embodiment further includes an audio output unit 181 provided at one side of the robot cleaner, and configured to output an audio signal recognized by the control unit 120 to the outside. The audio output unit 181 is a means to output a sound or a voice, which includes a beeper, a speaker, etc. Once a user inputs a voice through a microphone provided in the terminal, the terminal converts the received voice into a control signal. The terminal transmits a control signal to the robot cleaner. Then, the control unit 120 extracts an audio signal from the control signal, and recognizes the extracted audio signal. The audio output unit 181 provides the audio signal extracted by the control unit 120 to a user of the robot cleaner. Here, the robot cleaner performs an interphone function. The interphone function may include a video call function.

Referring to FIG. 3, in a robot cleaner according to still another embodiment, the control unit 120 extracts an audio signal from the control signal, and recognizes the extracted audio signal. And, the control unit 120 extracts the control command from the audio signal. The storage unit 140 may further store therein the audio signal, and the control command corresponding to the audio signal. The storage unit 140 pre-stores an audio signal, and pre-stores a control command with respect to the audio signal in a patterned manner or in a database manner. The control command includes a cleaning start command, a cleaning stop command, a patrol command, a moving command, a charging command, a setting change command, etc. A user may pre-store, in the storage unit, an audio signal and a control command with respect to the audio signal, through the input unit 185.

Referring to FIG. 3, the robot cleaner further includes an audio recognition unit 170 configured to extract an audio signal from a peripheral sound, and to recognize the extracted audio signal. The control unit 120 converts the audio signal recognized by the audio recognition unit 170, into a response signal. The communication unit 110 transmits a response signal to the terminal, and the terminal outputs the audio signal through a speaker mounted therein. Here, the robot cleaner performs a phone function.

Referring to FIG. 3, the audio recognition unit 170 includes a signal input unit 171 configured to receive an input of a sound, a noise filter 172 configured to remove noise from the sound, and an audio signal extractor 173 configured to extract an audio signal from the sound having noise removed therefrom. The signal input unit 171 is a device configured to receive an input of an external sound, which may be implemented as a microphone. The noise filter 172 is configured to extract an audio signal from an external sound, and to remove noise. For instance, the audio signal extractor 173 may extract an audio signal in a sampling manner at predetermined time intervals, the audio signal having noise removed therefrom by a noise filter.

The communication unit 110 may transmit, to the terminal, image information detected by the image detection unit 131, and an audio signal recognized by the audio recognition unit 170. And, the communication unit 110 may receive, from the terminal, image information and an audio signal (control signal). Under this configuration, the robot cleaner 100 and the terminal 200 may perform a video call function. That is, the robot cleaner is mounted with the image detection unit and the audio recognition unit, thereby compressing image information and an audio signal input thereto. Then, the robot cleaner transmits the compressed image information and audio signal, to a user of the terminal remotely-accessed thereto. At the same time, the robot cleaner may decode an audio signal and image information received from the terminal remotely-accessed thereto, thereby outputting to a user thereof. For instance, the robot cleaner and the terminal perform direct data transmission/reception through hole punching or a server. This can implement data transmission circumstances, and enable real-time video call through voice compression, image compression and bi-directional streaming.

Figure 7:
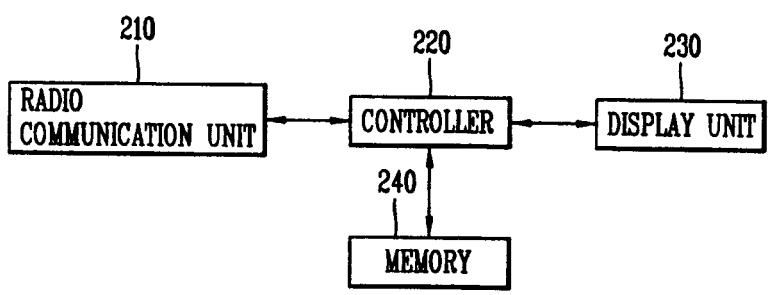
FIG. 7 is a block diagram showing a configuration of a terminal according to an embodiment.

Referring to FIG. 7, the terminal according to an embodiment includes a radio communication unit 210, a controller 220, and a display unit 230.

The radio communication unit 210 is configured to transmit a control signal created from the controller 220 to the robot cleaner 100, and receive, from the robot cleaner 100, one or more data including image information or a map. Said one or more data include image information, obstacle information, position information, a map, a cleaning region, state information, etc. The controller 220 is configured to create a control signal, and to create a control screen using the data. Here, the control command includes a cleaning start command or a cleaning stop command. The radio communication unit 210 may include one or more modules through which radio communication is performed between the terminal 200 and a radio communication system, or between a plurality of terminals, or between the terminal and the robot cleaner 100. For instance, the radio communication unit 210 may include a broadcast receiving module, a mobile communication module, a wireless internet module, a short-range communication module, a position information module, etc.

The broadcast receiving module receives broadcast signals and/or broadcast associated information from an external broadcast management server (or other network entity) via a broadcast channel. The mobile communication module transmits and/or receives radio signals to and/or from at least one of a base station, an external terminal and a server. Such radio signals may include a voice call signal, a video call signal or various types of data according to text and/or multimedia message transmission and/or reception. The wireless Internet module supports wireless Internet access. This module may be internally or externally coupled to the terminal. Here, as the wireless Internet technique, a wireless local area network (WLAN), Wi-Fi, wireless broadband (WiBro), world interoperability for microwave access (WiMAX), high speed downlink packet access (HSDPA), and the like, may be used. The short-range communication module is a module for supporting short range communications. Some examples of short-range communication technology include Bluetooth, Radio Frequency IDentification (RFID), Infrared Data Association (IrDA), Ultra-WideBand (UWB), ZigBee, and the like.

Figure 8:
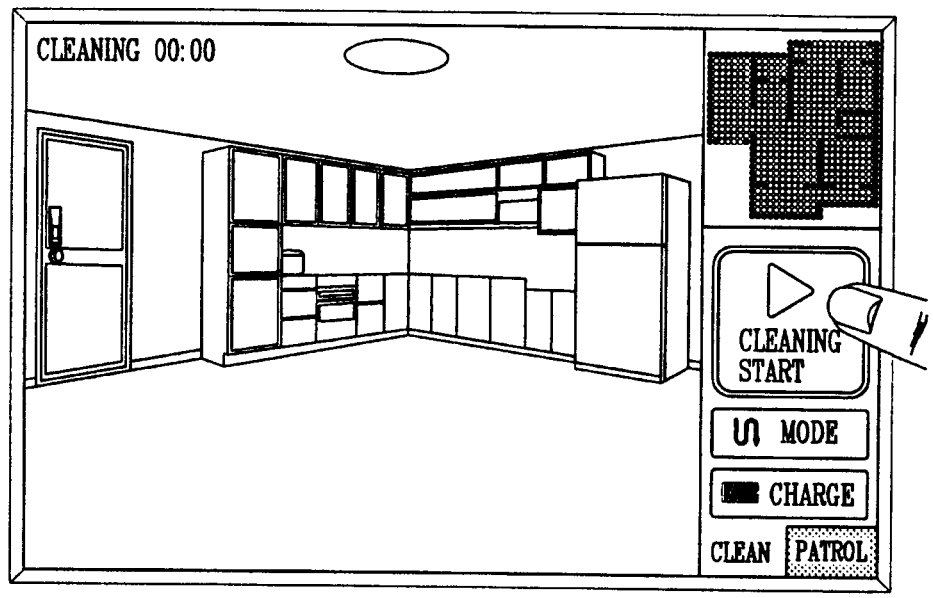
FIGS. 8 and 9 are views showing a screen of a terminal for explaining an operation to transmit a cleaning command to a robot cleaner by the terminal.

The display unit 230 includes a touch recognition region 231 for receiving an input of a control command, and is configured to display a control screen. The display unit 230 may display an icon according to a communication type (e.g., Wi-Fi, 3G), display communication sensitivity, and display the remaining amount of a battery of the robot cleaner. As shown in FIG. 8, the display unit 230 may display a touch recognition region having a first region (S232) and a second region (S233) having a size equal to or less than that of the first region. The first region (S232) is configured to display the control screen, and on which the control command is input. In case of a mobile terminal or a notebook having no touch screen (touch pad), a touch recognition region is not implemented. In this case, an input unit to which a control command rather than a touch recognition command is input, may be separately formed from an output unit for outputting a control screen.

The display unit 230 may alternately display, on a touch recognition region, a cleaning start icon for inputting a cleaning start command, and a cleaning stop icon for inputting a cleaning stop command. The display unit 230 may further include a mode icon for setting a cleaning mode. Upon receipt of a touch input with respect to the mode icon, the controller 220 creates a mode setting screen. The created mode setting screen is displayed on the display unit 230. The display unit 230 may further include a cleaning reservation icon for setting cleaning reservation. Upon receipt of a touch input with respect to the cleaning reservation icon, the controller 220 creates a cleaning reservation screen. The created cleaning reservation screen is displayed on the display unit 230.

The display unit 230 displays information processed in the terminal. That is, the display unit 230 displays a control screen. For instance, when the terminal is in a phone call mode, the display unit 230 may display a User Interface (UI) or a Graphic User Interface (GUI) associated with a call. The display unit 230 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

If the display unit 230 and a touch sensor for sensing a touch operation have a layered structure therebetween, the display unit 230 may be used as an input touch screen as well as an output device. The touch sensor may be implemented as a touch film, a touch sheet, a touch pad, and the like. The touch sensor may be configured to convert changes of a pressure applied to a specific part of the display unit 230, or a capacitance occurring from a specific part of the display unit 230, into electric input signals. Also, the touch sensor may be configured to sense not only a touched position and a touched area, but also a touch pressure. The touch sensor may be implemented as a proximity-touch sensor which does not substantially touch the screen, but approach to the screen with a distance. The proximity-touch sensor may indicate a sensor to sense presence or absence of an object approaching to a surface to be sensed, or an object disposed near a surface to be sensed, by using an electromagnetic field or infrared rays without a mechanical contact. In the present disclosure, 'touch recognition' includes not only 'proximity touch', a status that the pointer is positioned to be proximate onto the touch screen without contact, but also 'contact touch', a status that the pointer substantially comes in contact with the touch screen.

Referring to FIG. 7, the terminal may further include a memory 240. The memory 240 may store a program for the processing and control of the controller 220. Alternatively, the memory 240 may temporarily store input/output data (e.g., phone book data, messages, still images, video and the like). Also, the memory 240 may pre-store a control signal for controlling the robot cleaner, and a control command corresponding to the control signal, in a patterned manner.

As another example, the memory 240 may further store therein an audio signal, and a control command corresponding to the audio signal, in a patterned manner. The controller 220 creates a control signal, using an audio signal corresponding to a control command. The robot cleaner executes a control command by extracting the control command from an audio signal received from the terminal.

The terminal may further include an audio/video (NV) input unit, a user input unit, a sensing unit, an interface unit, a power supply unit, etc.

The A/V input unit is configured to receive an audio or video signal, and may include a camera, a microphone or the like. The user input unit may create input data for allowing a user to control various operations of the terminal. The user input unit may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 230 in a layered manner, it may form a touch screen. The sensing unit detects a current status (or state) of the terminal, a location of the terminal, the presence or absence of a user's touch (contact) with the terminal, the orientation of the terminal, an acceleration or deceleration movement of the terminal, etc, and creates commands or signals for controlling the operation of the terminal.

The interface unit may be generally implemented to interface the terminal 200 with external devices. The interface unit may allow data reception from an external device, power delivery to each component in the terminal, or a data transmission from the terminal to an external device. The power unit receives external power or inner power under control of the controller 220, and supplies required power to each component.

The controller 220 typically controls the overall operations of the terminal. For example, in case of a mobile phone or a smart phone, the controller 220 performs the control and processing associated with telephony calls, data communications, video calls, and the like. The controller 220 may perform a pattern recognition processing so as to recognize writing or drawing input on the display unit 230 as a text or an image.

The controller 220 is configured to create a control signal corresponding to a control command with respect to the robot cleaner 100, and to create a control screen using data and a response signal. The control command includes a moving command, a patrol command, a charging command, a setting change command, etc., as well as a cleaning command such as cleaning start and cleaning stop.

The controller 220 may create a control signal in a converting manner from an audio signal. The robot cleaner outputs a received audio signal to a user, thereby executing an interphone function.

The terminal 200 may further include a camera configured to detect image information by capturing the periphery. The robot cleaner 100 and the terminal 200 may perform a video call function, by transmitting and receiving (transceiving) image information and an audio signal with each other. That is, the robot cleaner is mounted with the image detection unit and the audio recognition unit, thereby compressing image information and an audio signal input thereto. Then, the robot cleaner transmits the compressed image information and audio signal, to a user of the terminal remotely-accessed thereto. At the same time, the robot cleaner may decode an audio signal and image information received from the terminal remotely-accessed thereto, thereby outputting to a user thereof. For instance, the robot cleaner and the terminal perform direct data transmission/reception through hole punching or a server. This can implement data transmission environments, and enable real-time video call through voice compression, image compression and bi-directional streaming.

As another example, the controller 220 may extract a control command from an audio signal. If an audio signal corresponds to a control command for controlling the robot cleaner, the controller 220 creates a control signal corresponding to the control command. The radio communication unit 210 may transmit, to the robot cleaner, the control signal created by the controller. And, the robot cleaner may extract a control command from the control signal, and may execute the control command.

Figure 93:
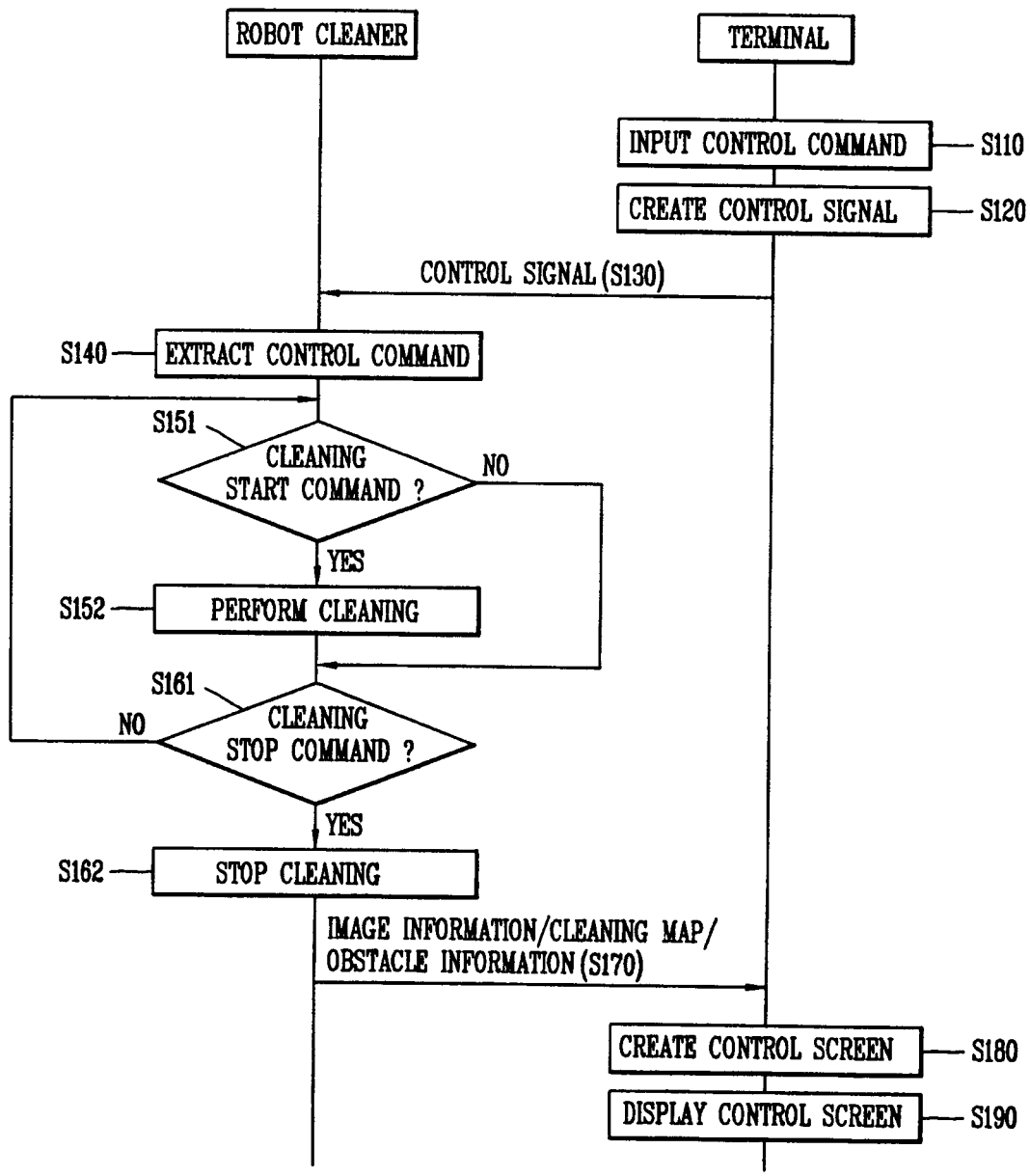
FIGS. 93 to 96 are flowcharts schematically showing a method for remotely controlling a robot cleaner according to embodiments of the present disclosure.

Referring to FIG. 93, a method for remotely controlling a robot cleaner according to an embodiment includes the robot cleaner's receiving a control signal from the terminal (S130), the robot cleaner's extracting, from the control signal, a cleaning start command or a cleaning stop command (S140), and the robot cleaner's performing a cleaning operation according to the cleaning start command, or stopping the cleaning operation according to the cleaning stop command (S150). Hereinafter, a remote control system for a robot cleaner, the system including a robot cleaner and a terminal which controls the robot cleaner, will be explained with reference to FIGS. 1 to 7.

The terminal 200 receives a control command, and creates a control signal corresponding to the control command (S110, S120). Here, the control command includes a cleaning start command, a cleaning stop command, a moving command, a patrol start command, a patrol stop command, a charging command, a set changing command, etc. Once a user inputs a control command by touching the cleaning start command or the cleaning stop command (S110), the terminal creates a control signal in correspondence to a communication protocol, and transmits the control signal to the robot cleaner 100 through a network (S130). The robot cleaner extracts a control command included in the control signal (S140), starts a cleaning operation according to the cleaning start command (S151, S152), and stops a cleaning operation according to the cleaning stop command (S161, S162). The robot cleaner continuously transmits, to the terminal, data such as image information, a map and obstacle information (S170). And, the terminal creates a control screen using the data (S180), and displays the created control screen (S190).

Figure 94:
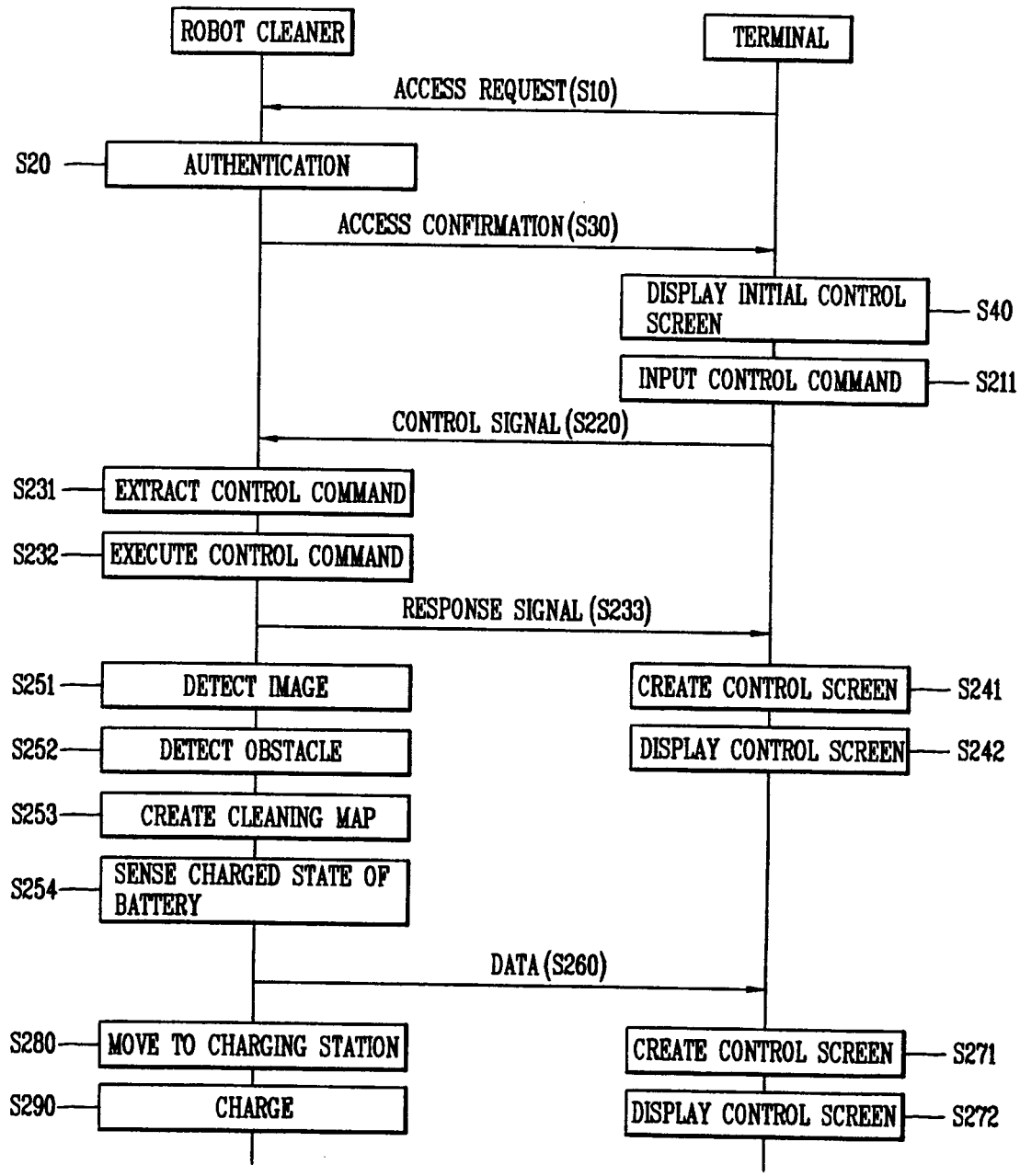

Referring to FIG. 94, the method for remotely controlling a robot cleaner further includes the robot cleaner's transmitting, to the terminal, one or more data including image information or map (S260), the terminal's creating a control screen using the data (S271), and the terminal's displaying the control screen (S272). The robot cleaner detects information on peripheral images using an image detection unit (S251), and detects information on peripheral obstacles using an obstacle detection unit (S252). The robot cleaner may create a map based on the obstacle information and the position information (S253). The robot cleaner transmits, to the terminal, the data such as the image information, the obstacle information, and the map (S260).

Referring to FIG. 94, the robot cleaner may continuously sense a charged state of a battery while performing a cleaning operation (S254), and may transmit sensing information to the terminal (S260). Even if there is no charging command received from the terminal, the robot cleaner may move to a charging station based on the sensing information, and perform a charging operation (S290).

Referring to FIG. 94, the method for remotely controlling a robot cleaner may further include the terminal's requesting for access to the robot cleaner (S10), the robot cleaner's authenticating the access (S20), the robot cleaner's approving and verifying the access to the terminal (S30), and the terminal's displaying an initial control screen (S40).

Figure 47:
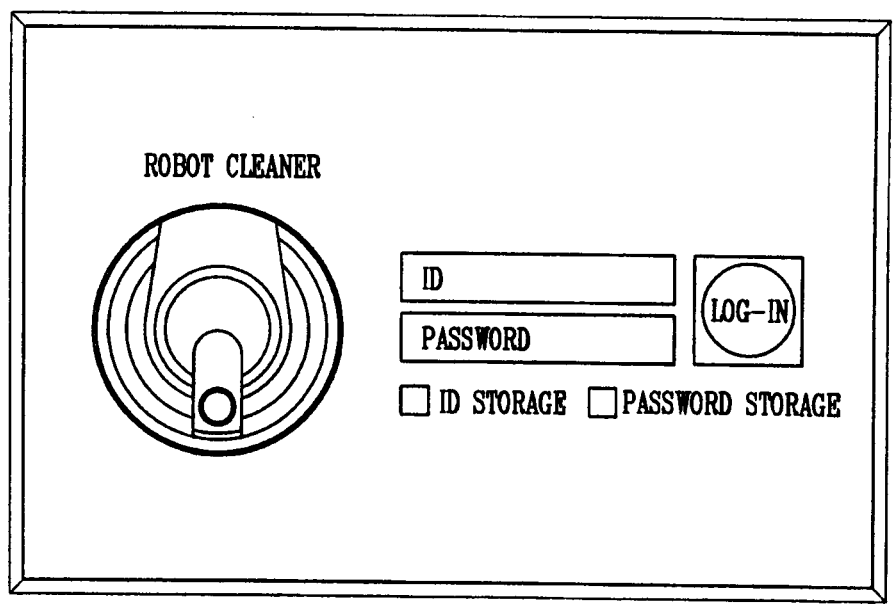
FIGS. 47 to 54 are views showing a screen of a terminal for explaining an operation to access a robot cleaner through a terminal.
Figure 48:
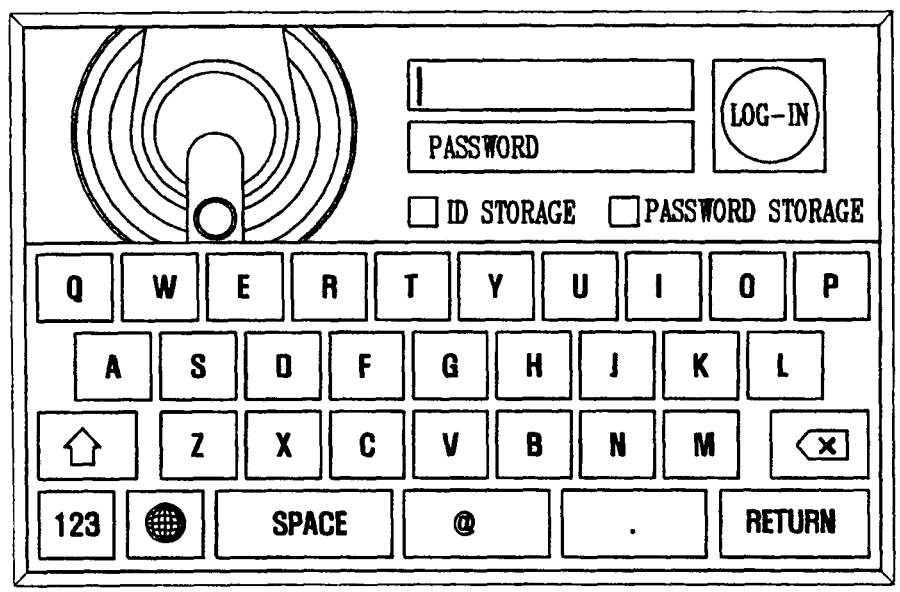
Figure 49:
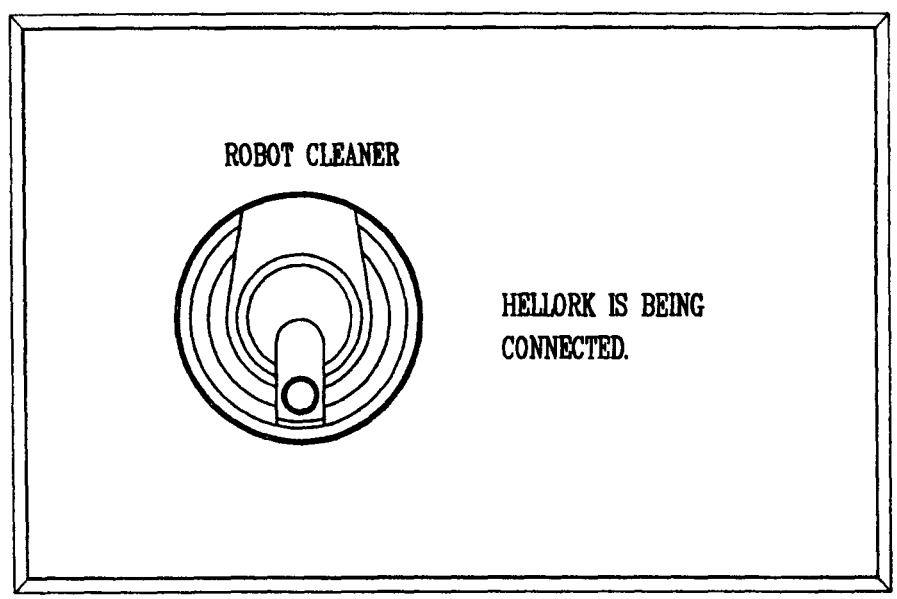

Once the terminal executes a remote control program for remotely controlling the robot cleaner, a log-in window for inputting log-in information on the robot cleaner is created as shown in FIG. 47. The remote control program may be pre-stored in a memory of the terminal, or may be downloaded from a server which stores therein a remote control program. In case of a smart phone, a remote control program is downloaded in the form of an application, and then is displayed on the screen of the display unit in the form of an icon, so that a user can execute the application by touching the icon. Once the user inputs log-in information as shown in FIG. 48, the terminal requests for access to the robot cleaner (S10). Referring to FIG. 49, the robot cleaner may execute an authentication with respect to the log-in information, and the terminal may display, on the screen, a message informing that the terminal is accessing the robot cleaner.

Figure 50:
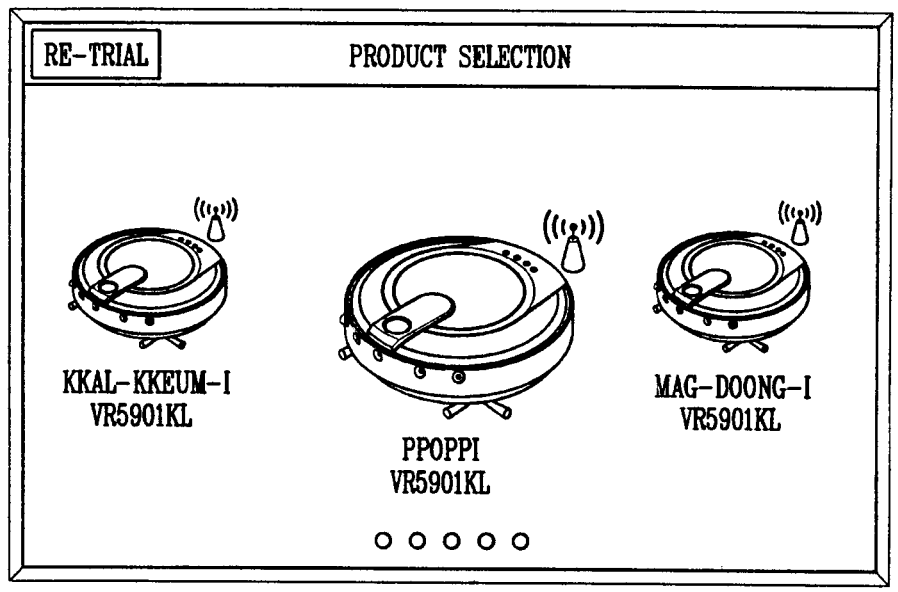
Figure 51:
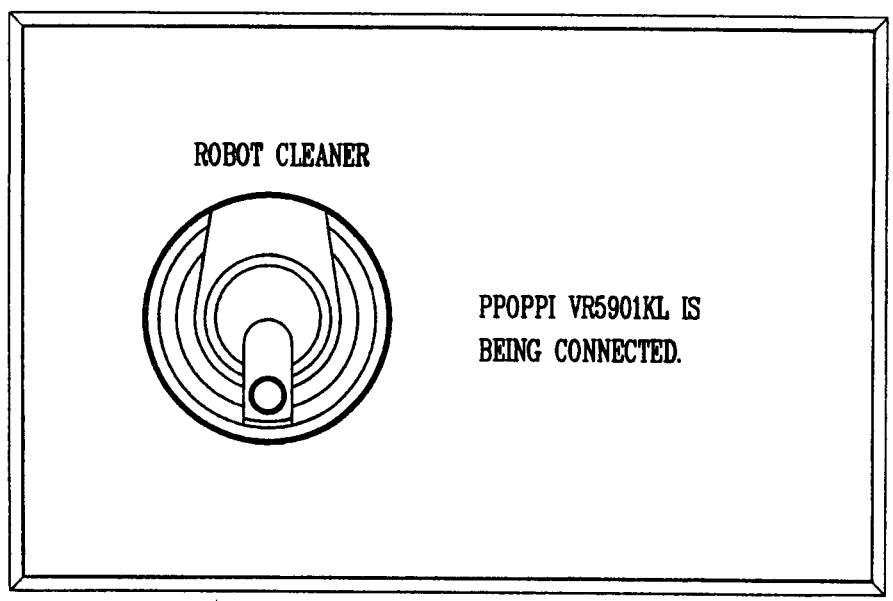

As shown in FIG. 50, the terminal may be accessed to one of a plurality of robot cleaners. The display unit displays a plurality of connectable robot cleaners, in the form of a list or icons. Once a user selects one of the plurality of robot cleaners, the selected robot cleaner executes an authentication with respect to the terminal as shown in FIG. 51.

Figure 52:
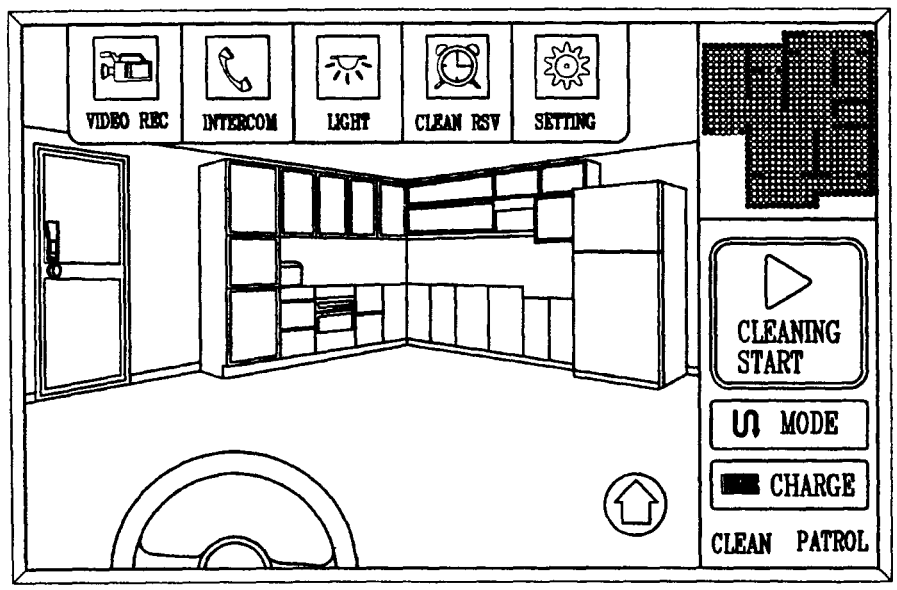
Figure 53:
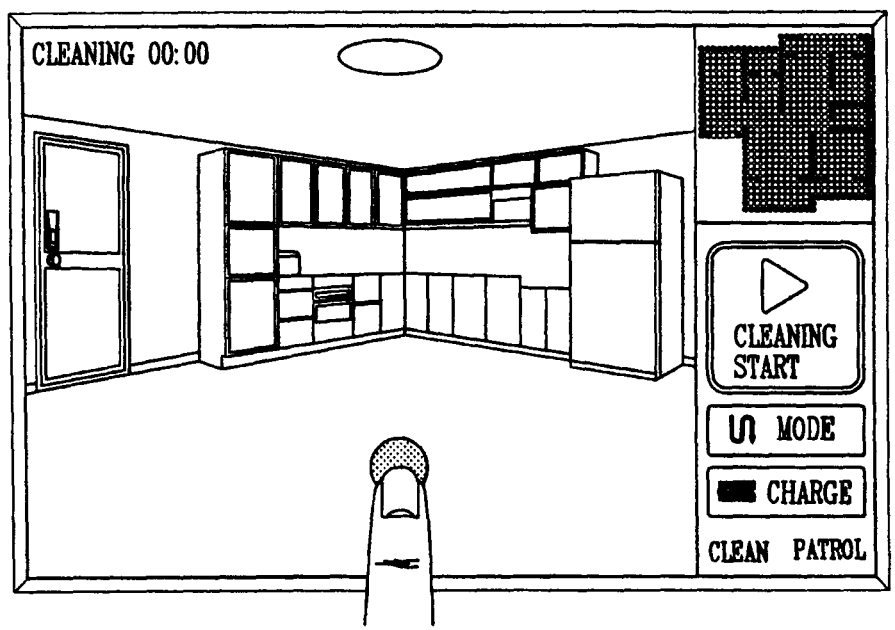
Figure 54:
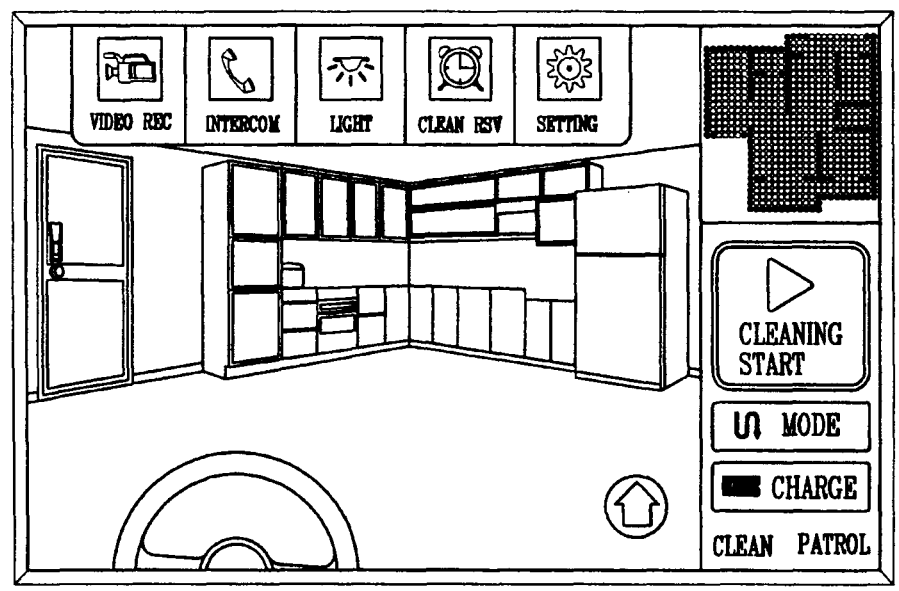

After the authentication, the robot cleaner transmits an access confirmation signal to the terminal (S30), and the terminal displays an initial control screen (S40). The initial control screen may include an option menu as shown in FIG. 52, or may include data such as image information and a map as shown in FIG. 53. In the latter case, upon detection of a touch input to a first region, the display unit may display an option menu as shown in FIG. 54. And, the controller may control the display unit to temporarily display an option menu as shown in FIG. 52, and then to display data as the initial control screen as shown in FIG. 53.

Figure 55:
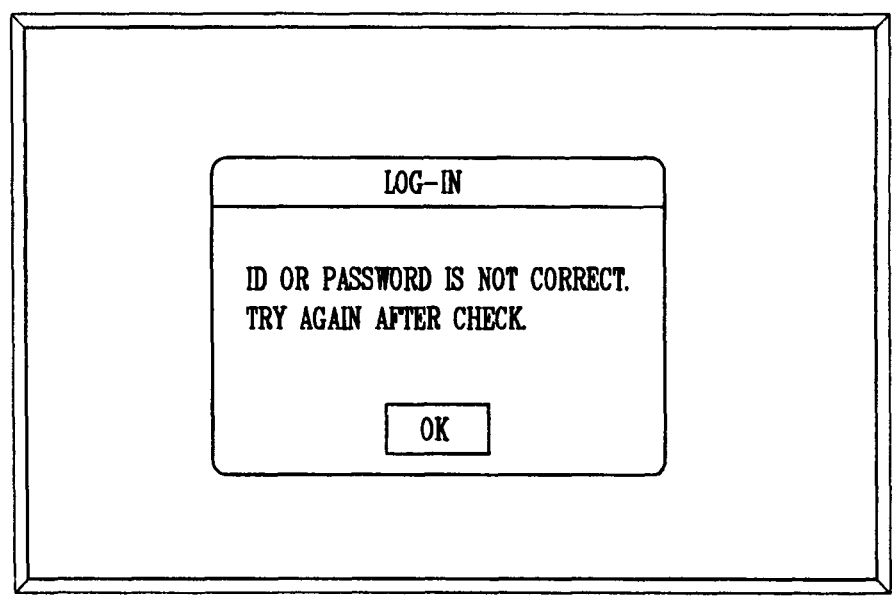
FIGS. 55 to 61 are views showing a screen of a terminal, the screen displaying an error message when the terminal is accessing the robot cleaner.
Figure 56:
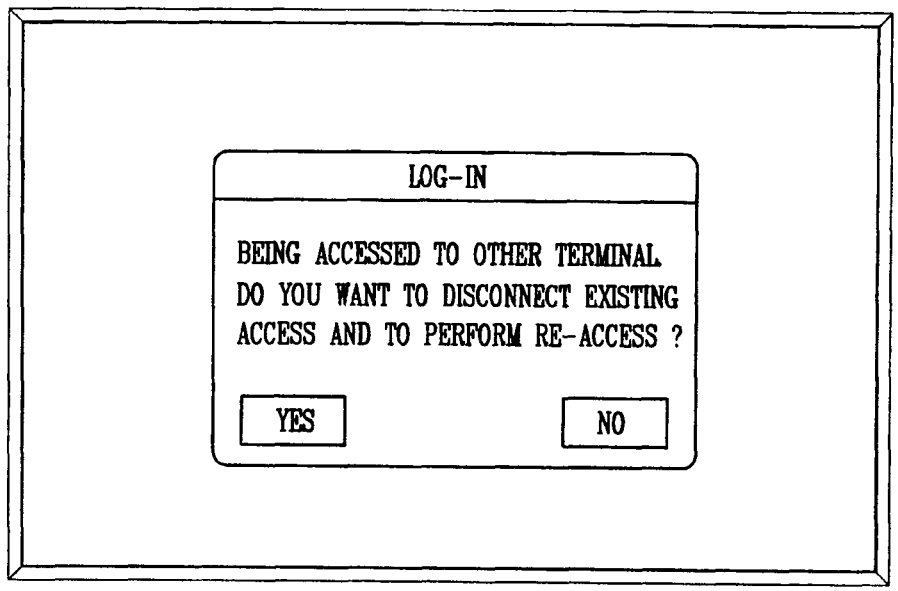
Figure 57:
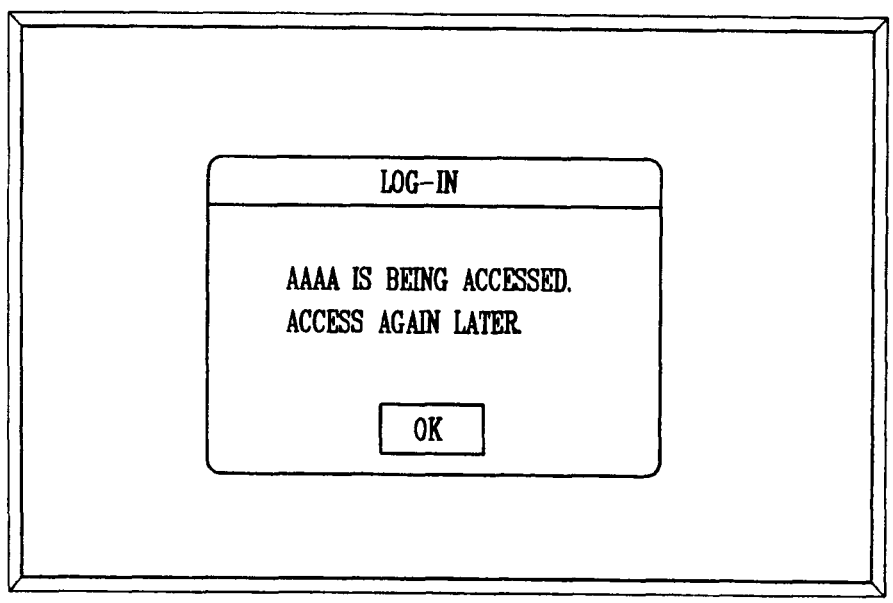
Figure 58:
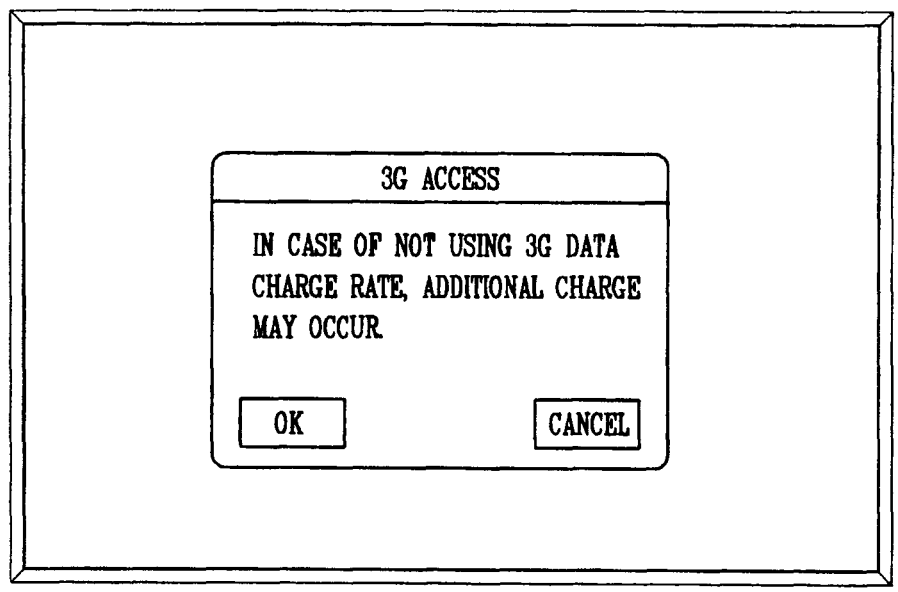
Figure 59:
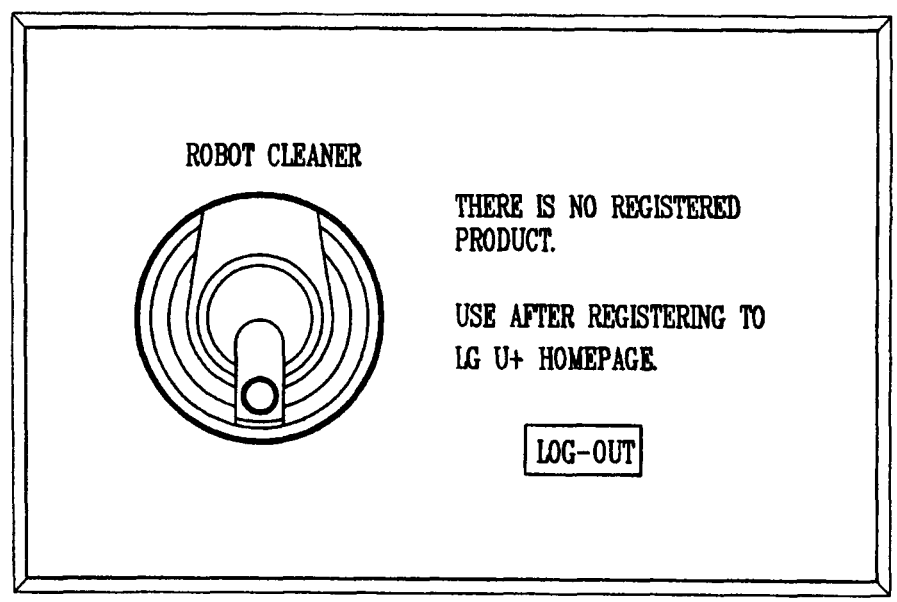
Figure 60:
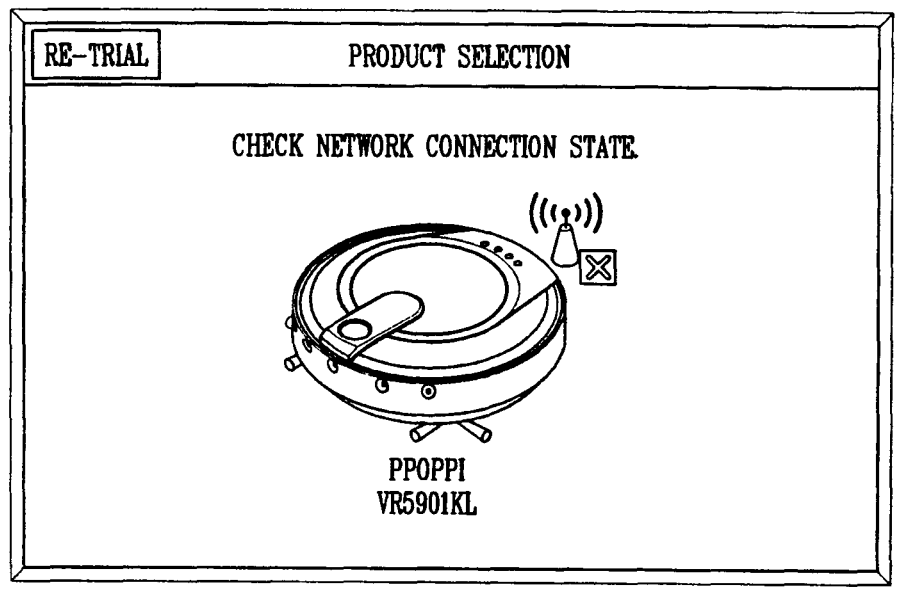
Figure 61:
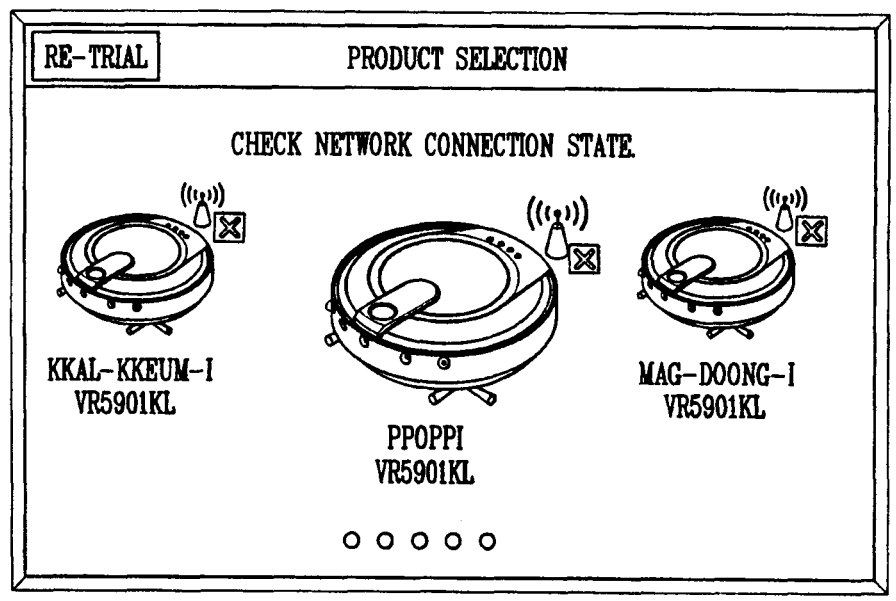

If log-in information is not consistent with pre-stored authentication information, the robot cleaner transmits an access non-acknowledgement signal to the terminal. Then, the terminal displays an error message such as 'ID or password is not correct. Please try again after check.' as shown in FIG. 55. If a robot cleaner to be accessed is accessing other terminal, the display unit may display an error message as shown in FIG. 56. If a robot cleaner to be accessed is being used by other user, the display unit may display an error message as shown in FIG. 57. The terminal may display a guide message according to a communication type as shown in FIG. 58. If a robot cleaner selected by a user has not been registered to a network, the terminal may display an error message as shown in FIG. 59. If the robot cleaner has not accessed a network, the terminal may display error messages as shown in FIGS. 60 and 61.

Figure 95:
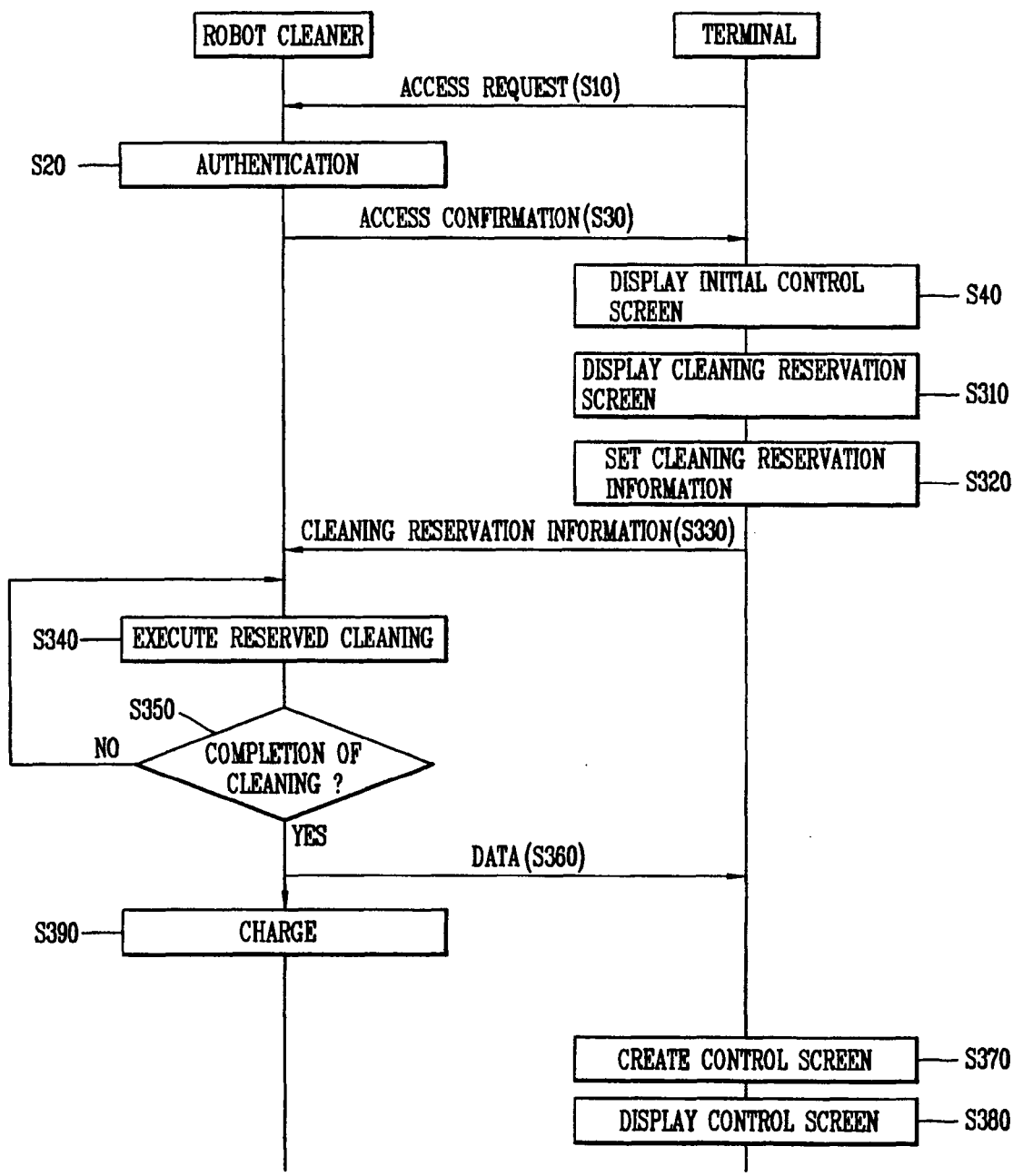

Referring to FIG. 95, the method for remotely controlling a robot cleaner may further include the terminal's creating cleaning reservation information with respect to the robot cleaner (S320), and the terminal's transmitting the cleaning reservation information to the robot cleaner (S330). The robot cleaner may perform or stop a cleaning operation based on the cleaning reservation information set by the terminal. Upon completion of reserved cleaning, the robot cleaner moves to a charging station for charging (S390). While performing reserved cleaning, the robot cleaner transmits, to the terminal, information such as image information, obstacle information, a map and a battery charged state (S360). The terminal creates a control screen based on the received data (S370), and displays the created control screen (S380).

Figure 18:
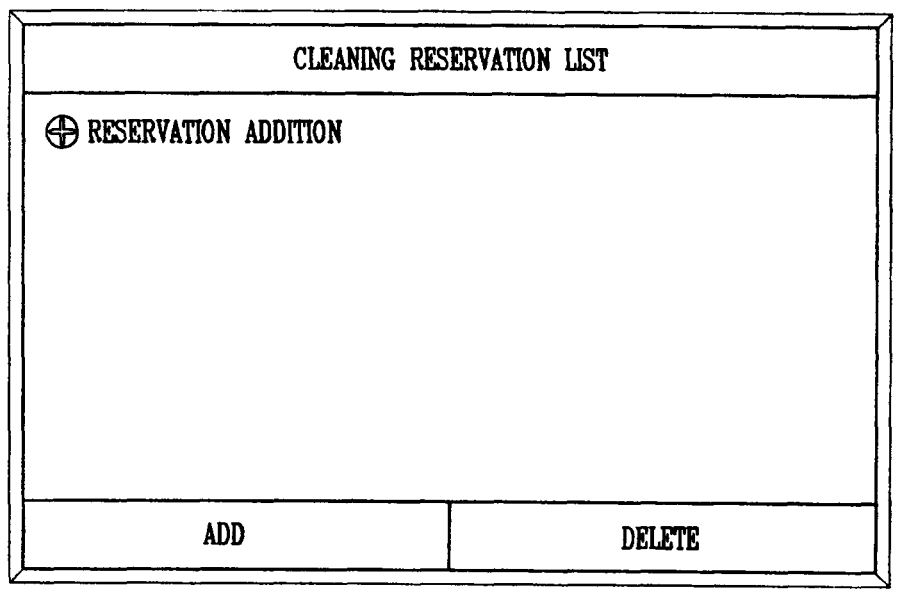
FIGS. 18 to 25 are views showing a screen of a terminal for explaining an operation to set cleaning reservation to the robot cleaner.
Figure 19:
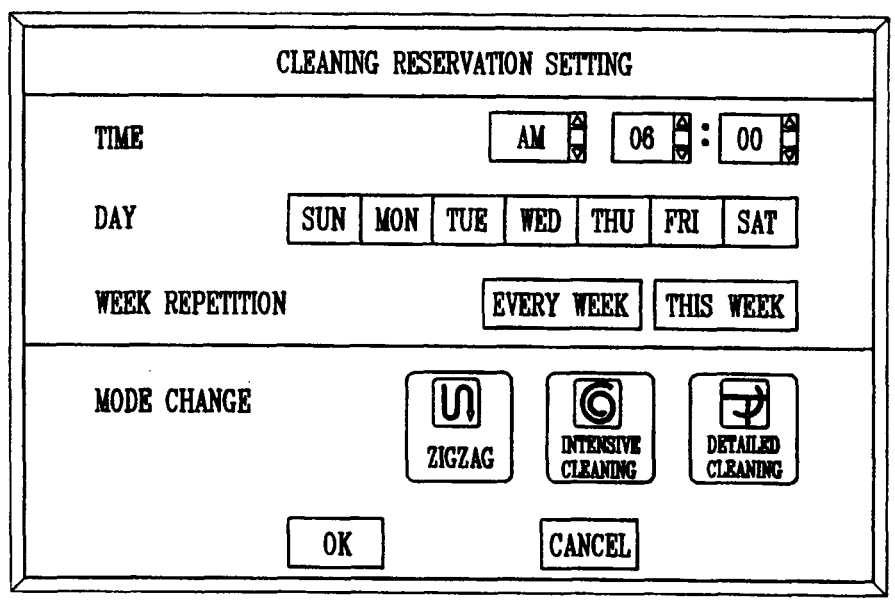
Figure 20:
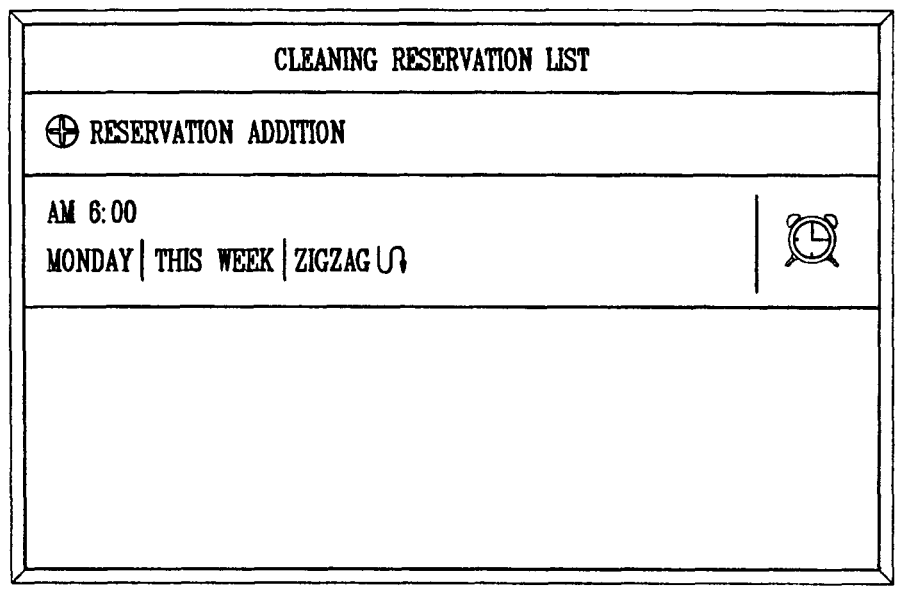
Figure 21:
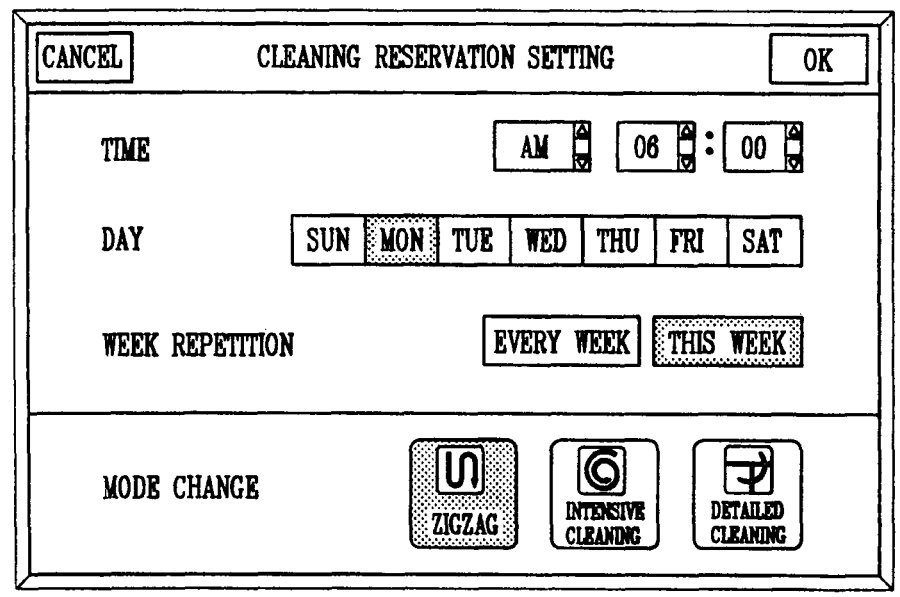
Figure 22:
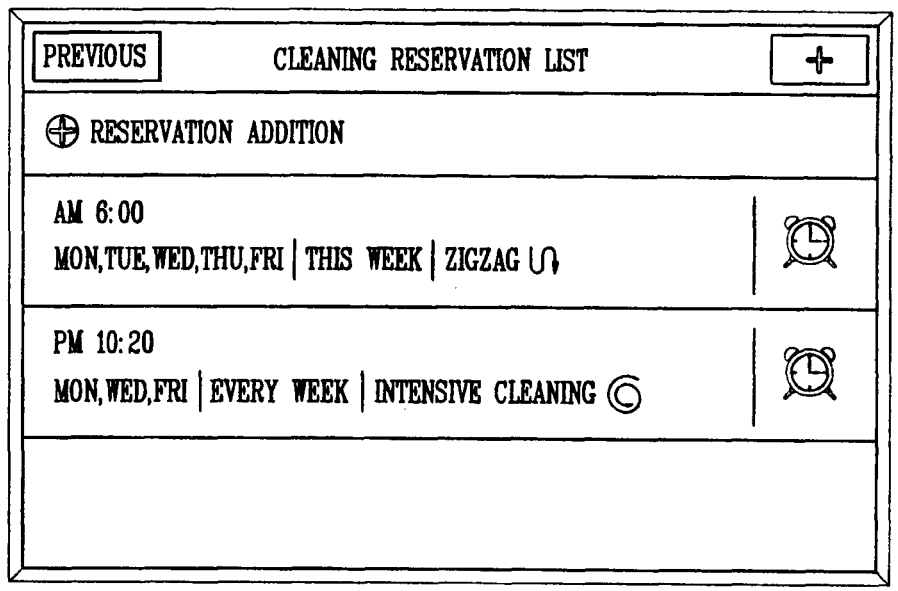
Figure 23:
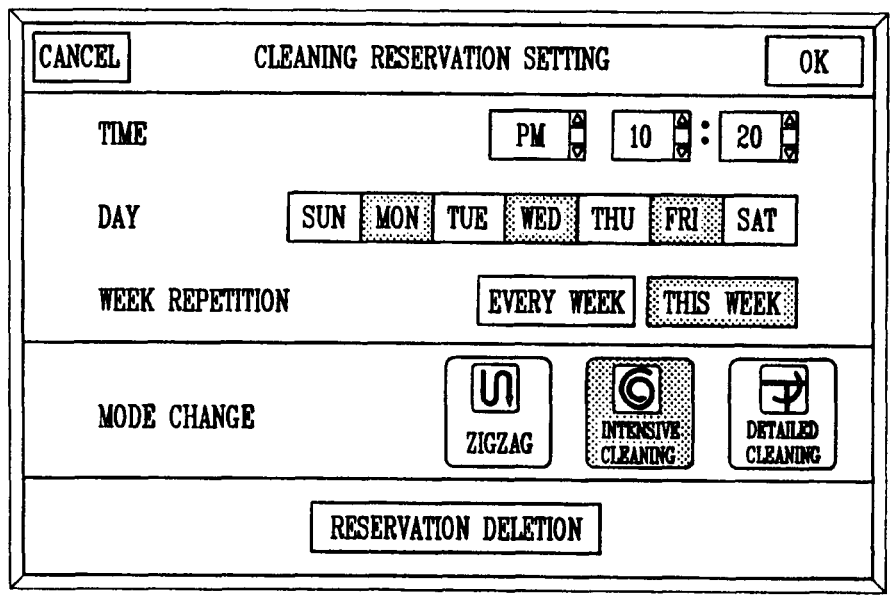
Figure 24:
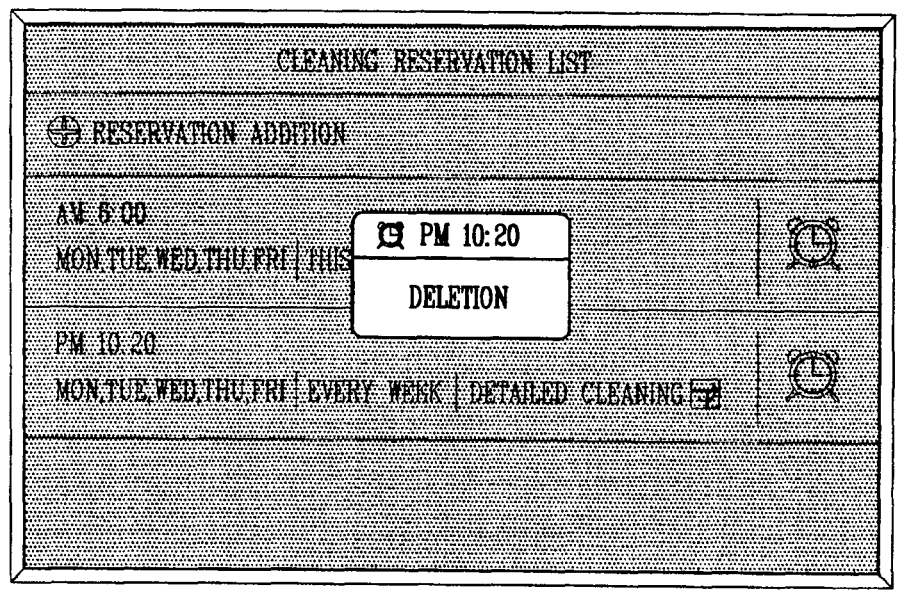
Figure 25:
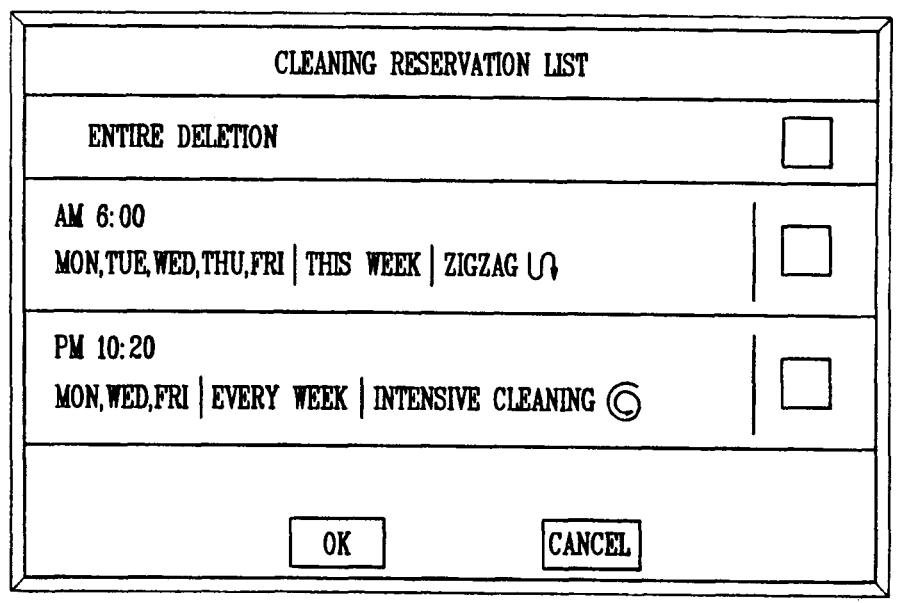
Figure 26:
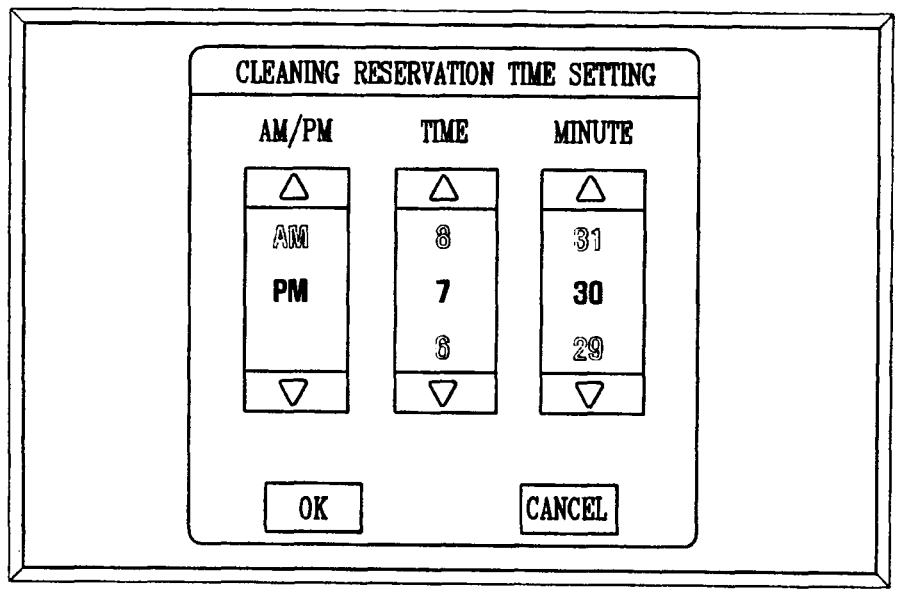
FIGS. 26 and 27 are views showing an example of the detailed setting of FIGS. 18 to 25.
Figure 27:
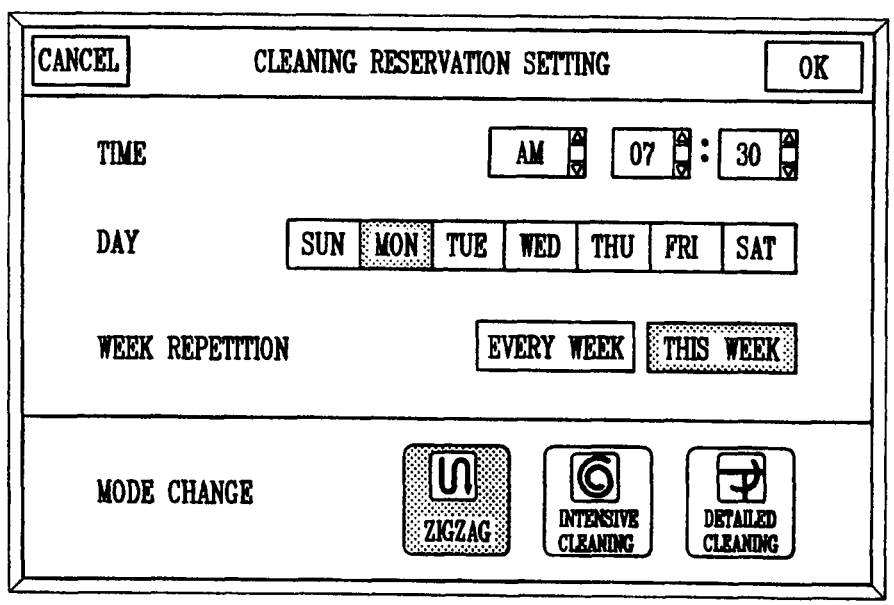
Figure 28:
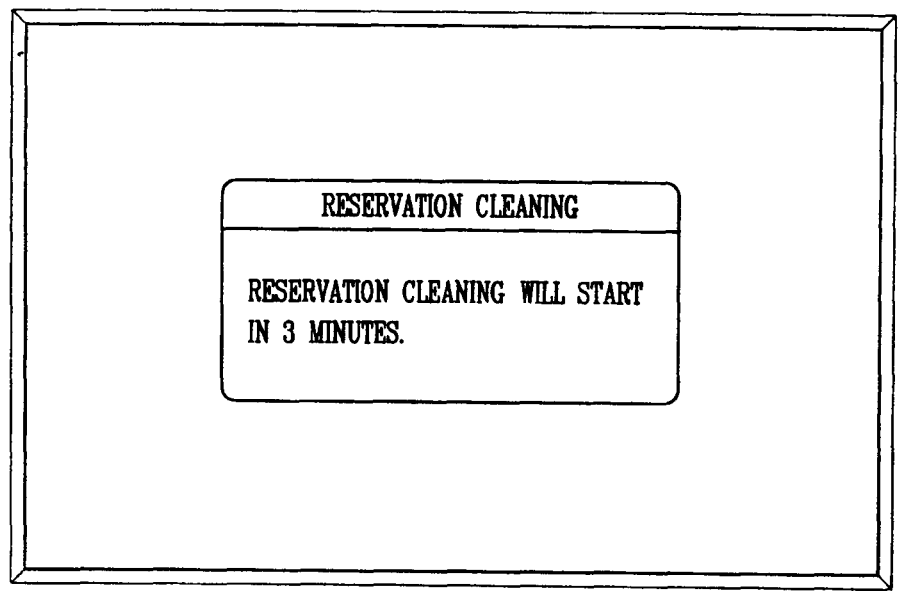
FIG. 28 is a view showing a screen of a terminal when a robot cleaner performs a reservation cleaning operation.

If a user touches the control screen while the display unit 230 displays the control screen, the terminal displays a cleaning reservation icon. If a user touches the cleaning reservation icon, the terminal displays a cleaning reservation list on the screen as shown in FIG. 18. If a user inputs a cleaning reservation adding command, the display unit displays a setting screen as shown in FIG. 19 or 21. As shown in FIG. 20 or 22, the cleaning reservation list is added to the current screen. FIG. 23 is a view showing a screen where a cleaning reservation list can be edited. A 'reservation deletion' button may be created at the lower end of the screen. Once a deletion command is input, the display unit may display a deletion guide message. A user may delete the cleaning reservation list wholly or partially as shown in FIG. 25. FIG. 26 is a view showing another example of a cleaning reservation time setting screen, and FIG. 27 is a view showing another example of a screen displaying a cleaning reservation list. The terminal displays a cleaning reservation screen (S310), and transmits cleaning reservation information to the robot cleaner (S330) once a cleaning reservation has been set (S320). The robot cleaner receives the cleaning reservation information (S330), and performs a reservation cleaning when the current time reaches a reserved time (S340). Once the reservation cleaning has started, the terminal displays, on the display unit, a message informing the start of the reservation cleaning, as shown in FIG. 28.

Figure 9:
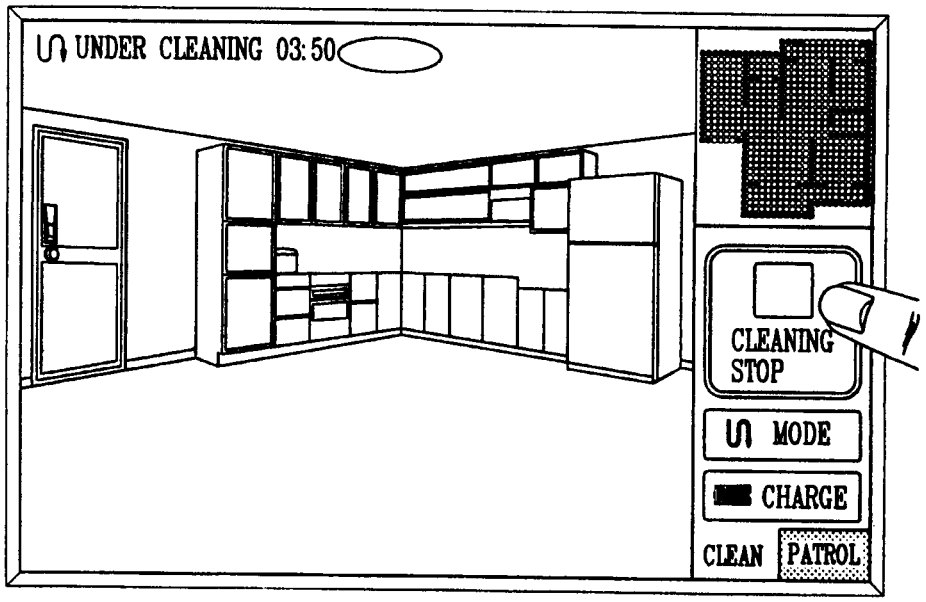
Figure 10:
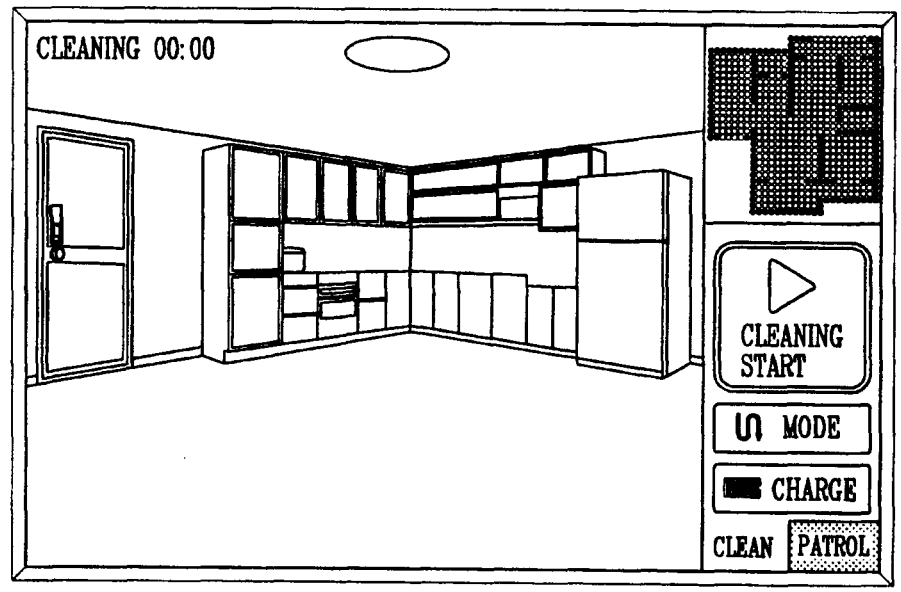
FIGS. 10 to 14 are views showing a screen of a terminal for explaining a cleaning operation being performed by the robot cleaner.
Figure 11:
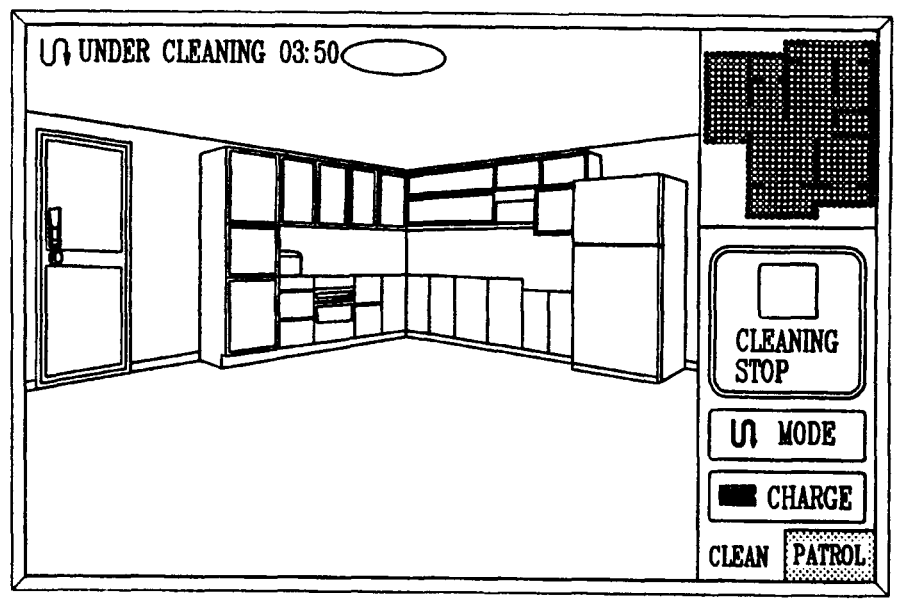

Referring to FIGS. 8 and 9, the terminal displays, on the display unit, image information and a map transmitted from the robot cleaner, and displays one or more icons (S190). Then, the terminal receives, from a user, an input of a cleaning start command or a cleaning stop command (S110), thereby creating a control signal based on the command (S120), and transmitting the created control signal to the robot cleaner (S130). The display unit 230 may display a cleaning start icon and a cleaning stop icon in an alternating manner. And, the display unit may display, on the screen, a cleaning mode, a charging icon, a cleaning tap, a patrol tap, etc. Once a cleaning start command is input, the display unit may display a cleaning mode, the current cleaning state, and a cleaning time. The robot cleaner may extract a control command from a control signal (S140), and may perform a cleaning operation according to a cleaning start command (S151, S152). Alternatively, the robot cleaner may stop the cleaning operation according to a cleaning stop command (S161, S162).

Figure 12:
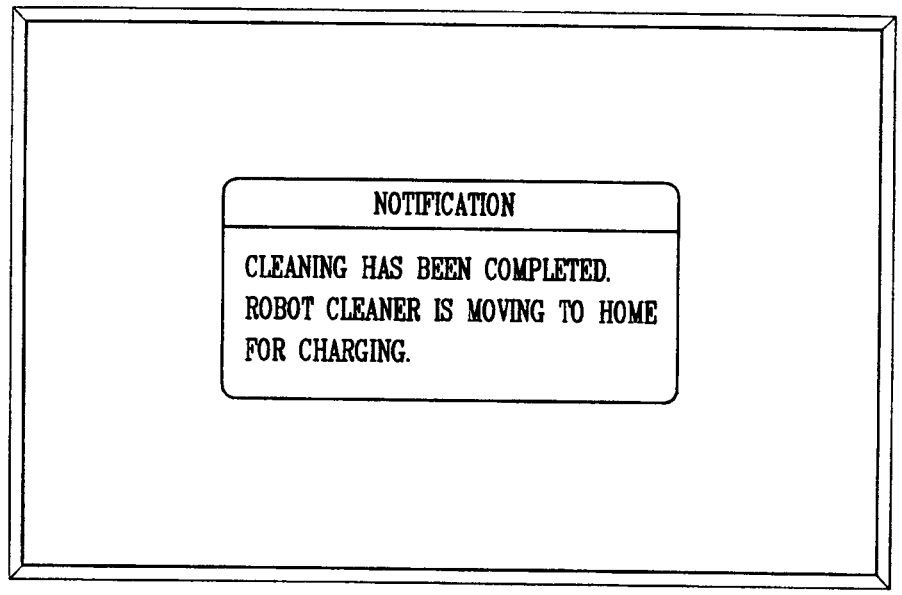
Figure 13:
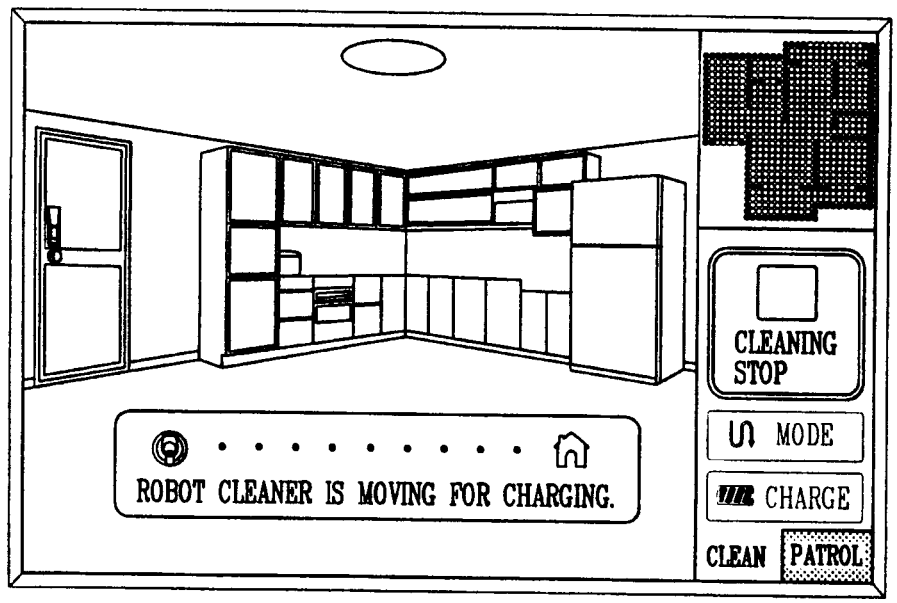
Figure 14:
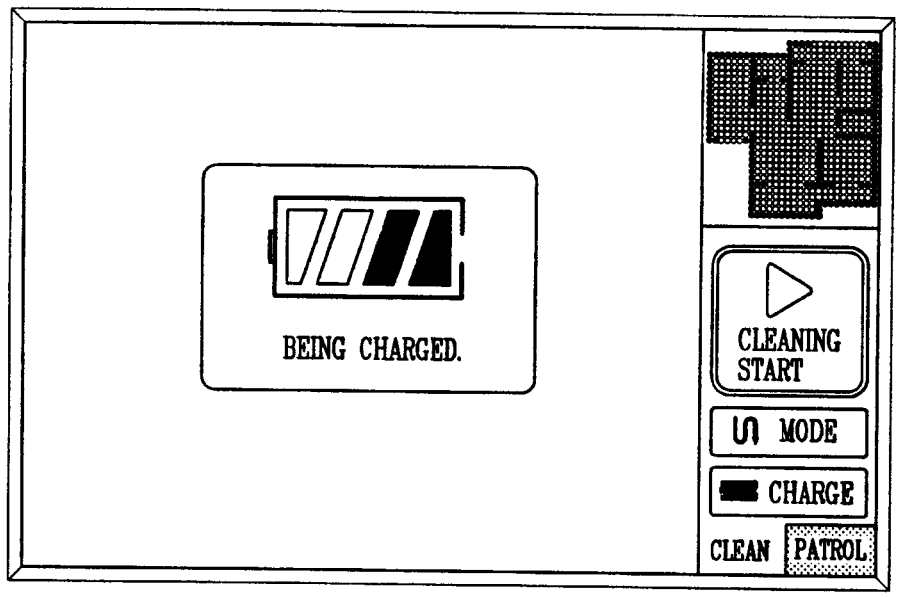

Referring to FIGS. 10 to 14, the robot cleaner performs an automatic charging operation after completing the cleaning operation. Referring to FIG. 12, if the robot cleaner has completed the cleaning operation, the display unit displays a cleaning completion screen. The robot cleaner moves to a charging station by receiving a guide signal from the charging station, or based on information stored therein, the information on the position of the charging station (S390). The radio communication unit receives state information of the robot cleaner, and the display unit displays a message on the screen as shown in FIG. 13, the message informing that "The robot cleaner is moving for charging." (S380). As shown in FIG. 14, while the robot cleaner is being charged, the display unit 230 may display a message on the screen, the message informing that "The robot cleaner is being charged.".

Figure 15:
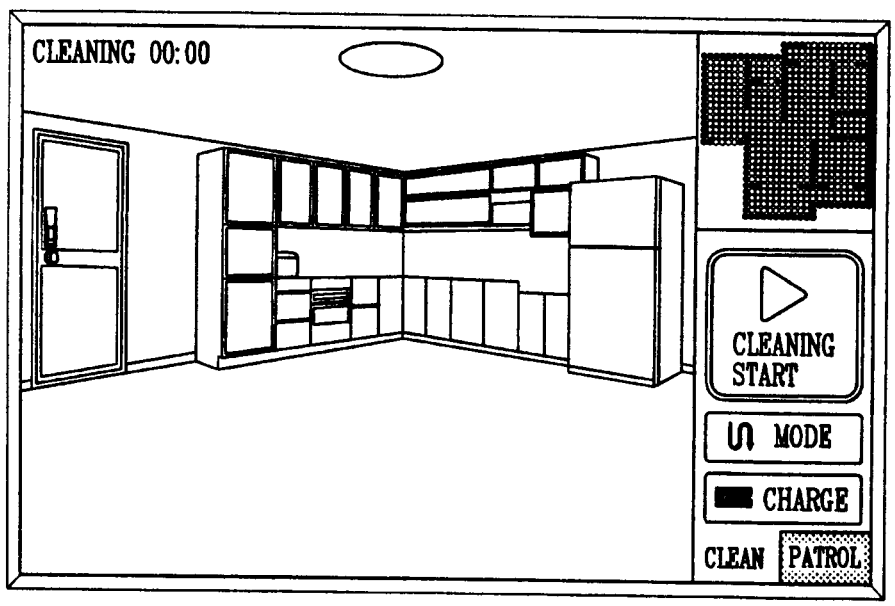
FIGS. 15 to 17 are views showing a screen of a terminal for explaining an operation to set a cleaning mode to the robot cleaner.
Figure 16:
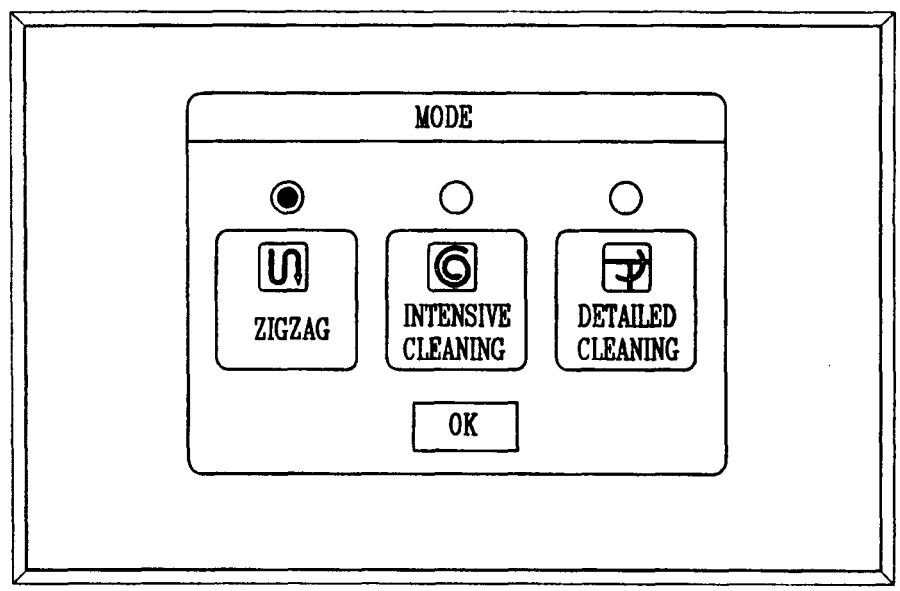
Figure 17:
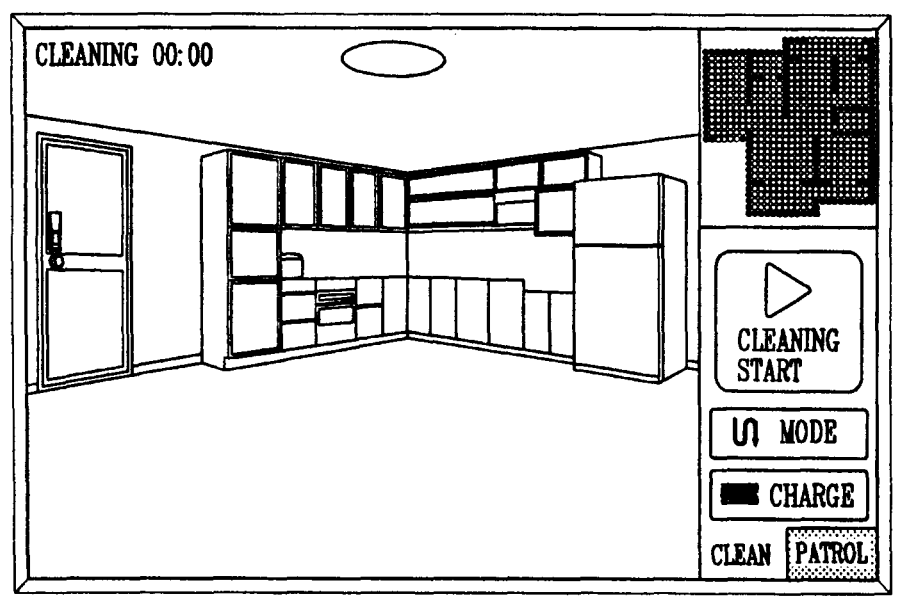

Referring to FIGS. 15 to 17, the terminal may display, on the display unit, a mode icon for changing a cleaning mode. Upon receipt of a touch input with respect to the mode icon, the display unit displays a mode setting screen as shown in FIG. 16. If a user selects one cleaning mode and then presses an OK button, the display unit displays the selected cleaning mode on the screen as shown in FIG. 17.

Figure 29:
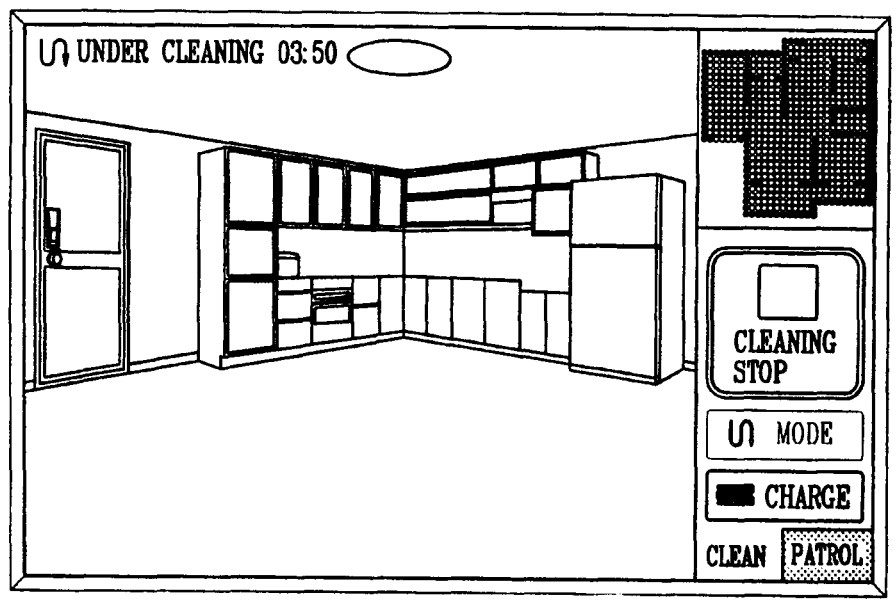
FIGS. 29 to 33 are views showing a screen of a terminal for explaining an operation to automatically perform a charging operation by a robot cleaner while the robot cleaner performs a cleaning operation.
Figure 30:
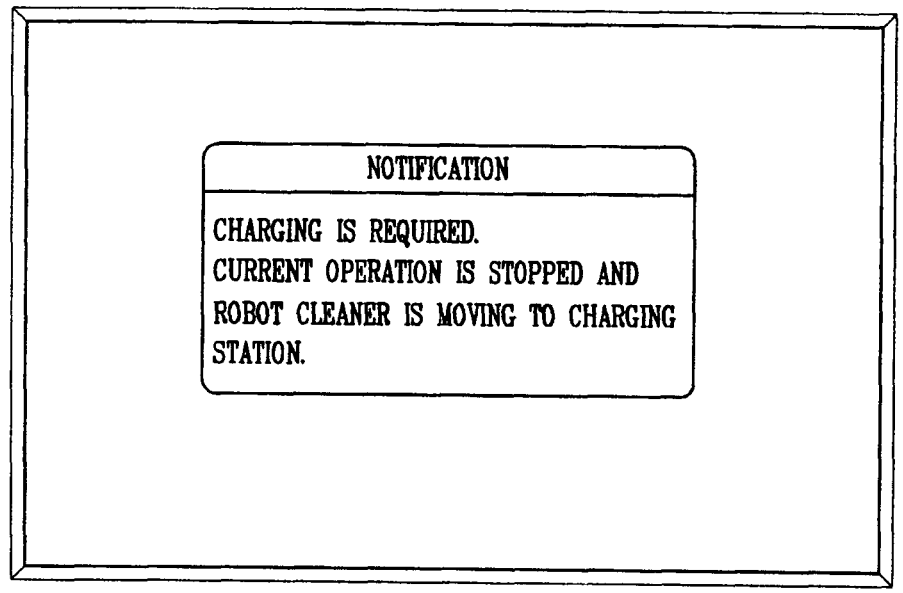
Figure 31:
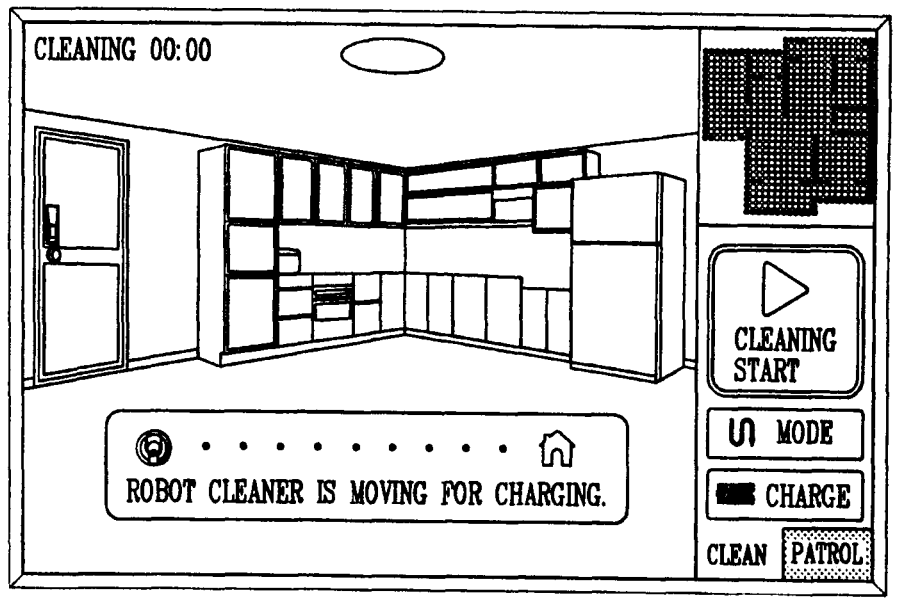
Figure 32:
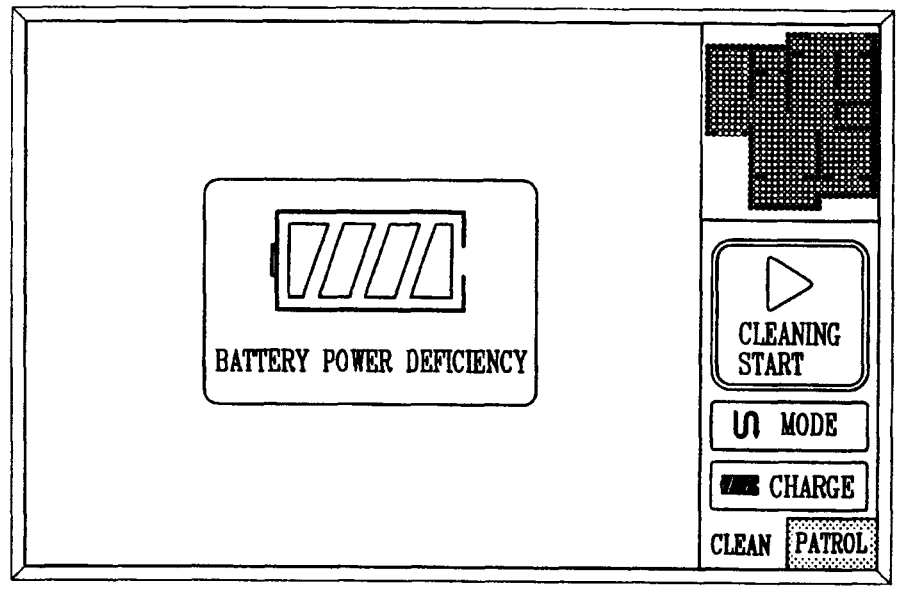
Figure 33:
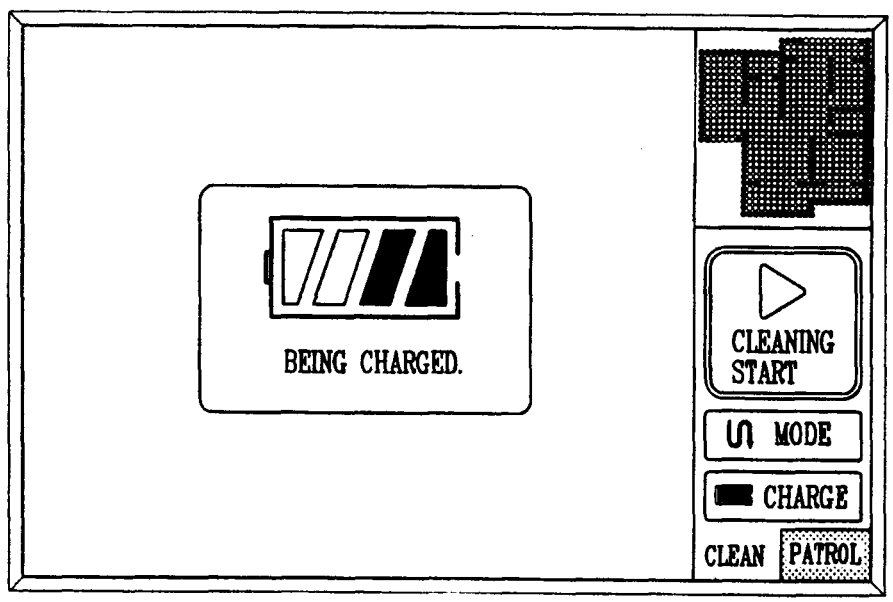
Figure 34:
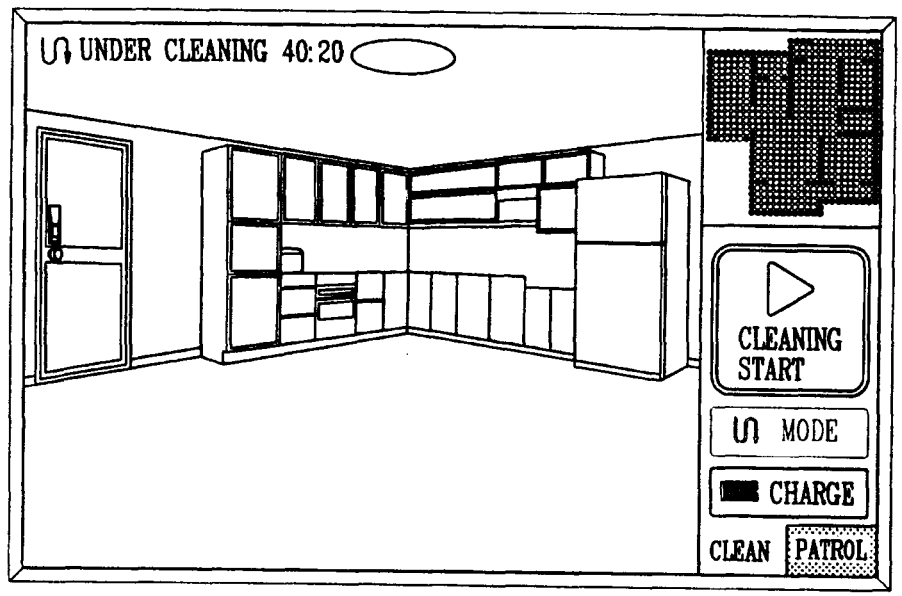
FIGS. 34 to 36 are views showing a screen of a terminal, the screen displaying a wheel locked state while the robot cleaner performs a cleaning operation.

Referring to FIGS. 29 to 33, the robot cleaner may sense a charged state of the battery during a cleaning operation as shown in FIG. 29 (S254), and may autonomously move to a charging station according to a sensing result (S280) thus to perform a charging operation (S290). As shown in FIG. 30, the display unit 230 may display a message informing that "Charging is required." and "Stop the current operation and move to charging station." The radio communication unit may real-time receive state information from the robot cleaner (S260). And, as shown in FIGS. 31 to 33, the display unit may display messages such as "The robot cleaner is moving for charging.", "The remaining amount of battery is deficient." and "The robot cleaner is being charged." (S271, S272).

Figure 35:
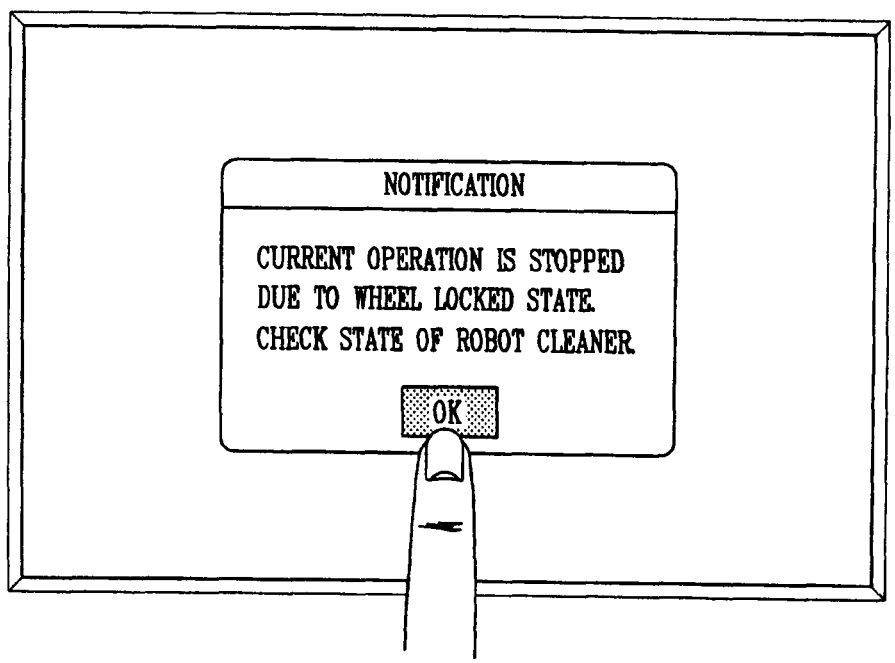
Figure 36:
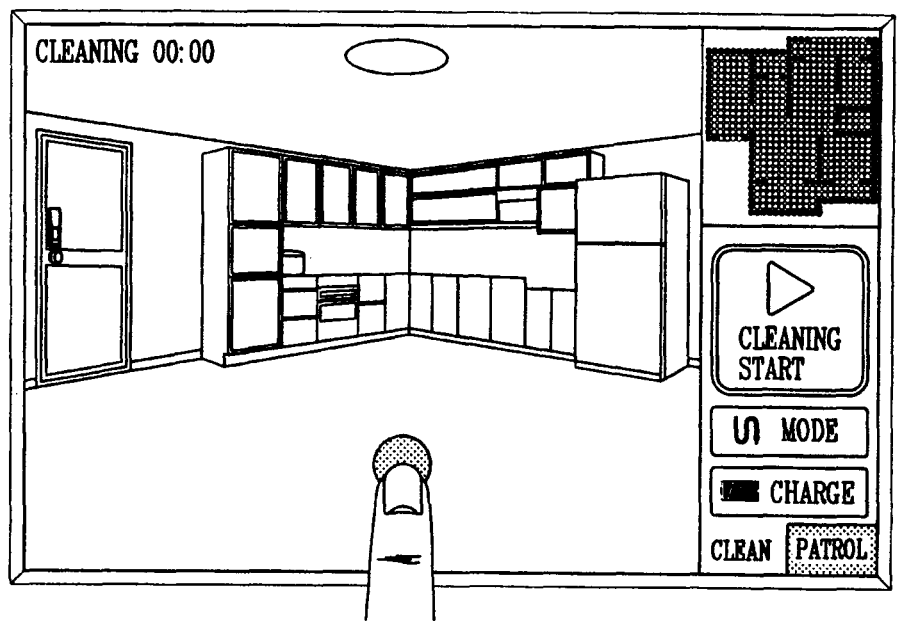

As shown in FIG. 35, if an error such as a wheel locked state occurs while the robot cleaner performs a cleaning operation, the terminal receives an error message thus to create a control screen. Then, the terminal displays the crated control screen. If a user touches (clicks) an OK button, the display unit may re-display the previous screen as shown in FIG. 36.

Figure 37:
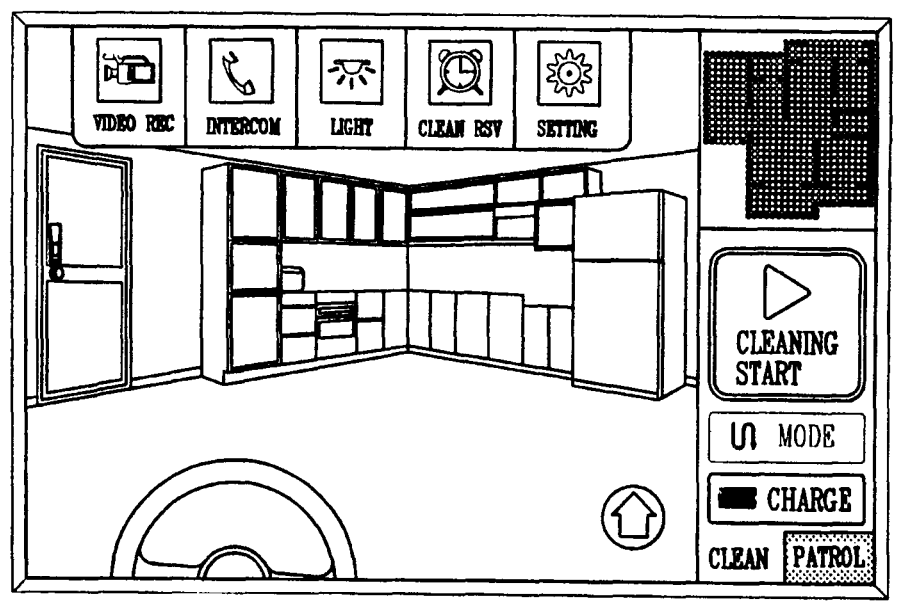
FIGS. 37 to 39 are views showing an example of screen conversion of a terminal which displays data of a robot cleaner.
Figure 38:
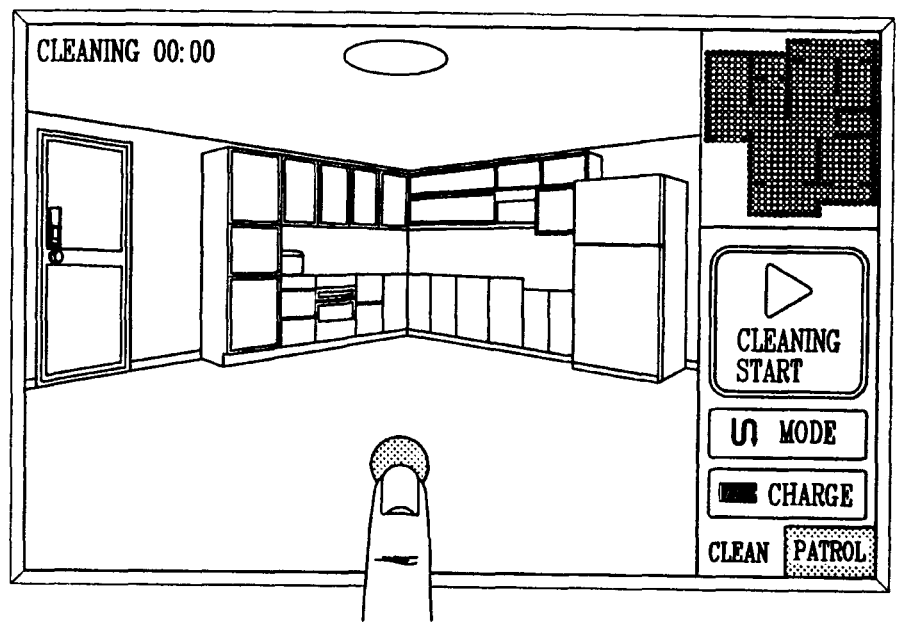
Figure 39:
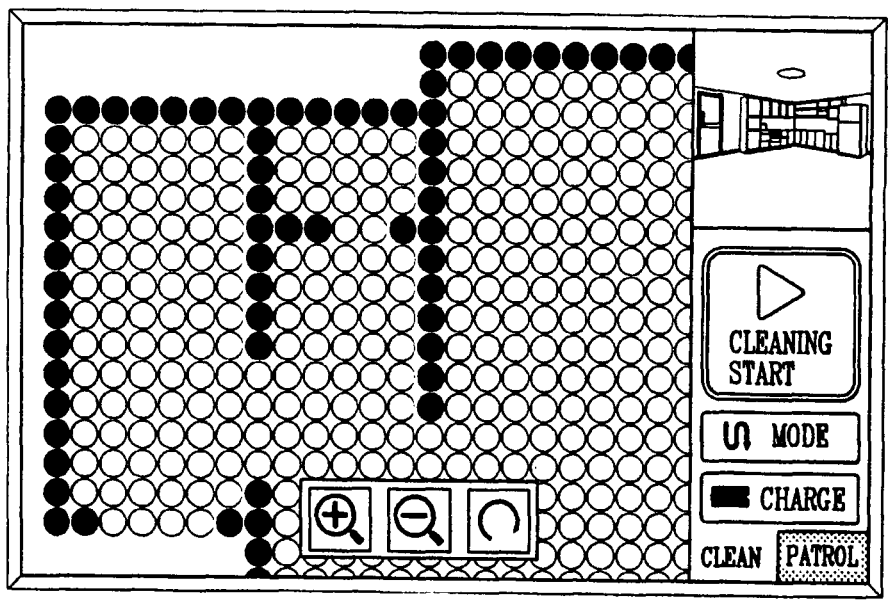

FIGS. 37 and 38 are views showing examples of an initial control screen. Once a user inputs log-in information, the terminal requests for access to the robot cleaner (S10). If the robot cleaner transmits an access confirmation signal to the terminal (S30) after having performed the authentication (S20), the display unit displays an initial control screen (S40). The terminal may display an option menu for a predetermined time as shown in FIG. 37, and then may display preset image information, map, etc. on the initial control screen as shown in FIG. 38. As shown in FIG. 39, a map region and an image information region may be switched from each other.

Figure 40:
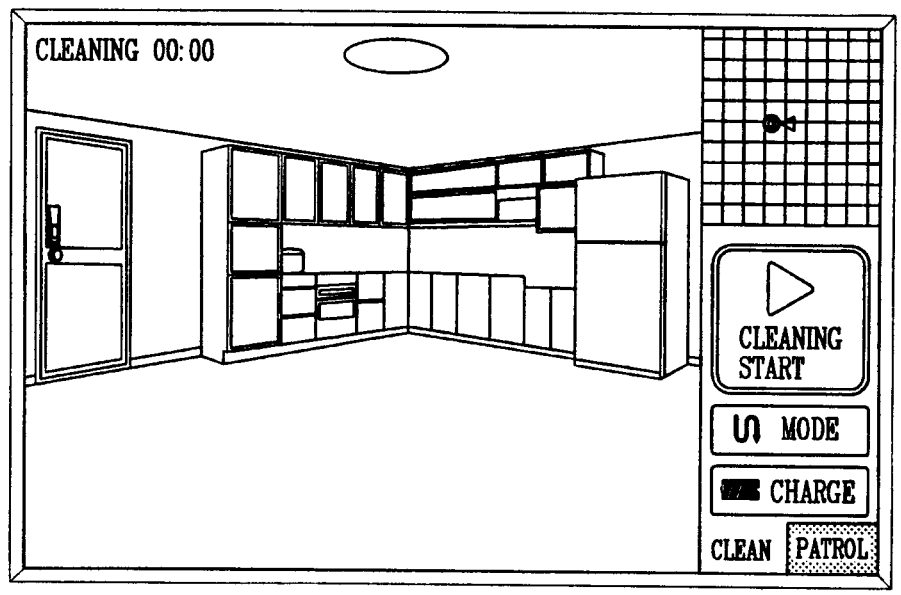
FIGS. 40 to 43 are views showing a screen of a terminal for explaining an operation to create a cleaning map by a robot cleaner.
Figure 41:
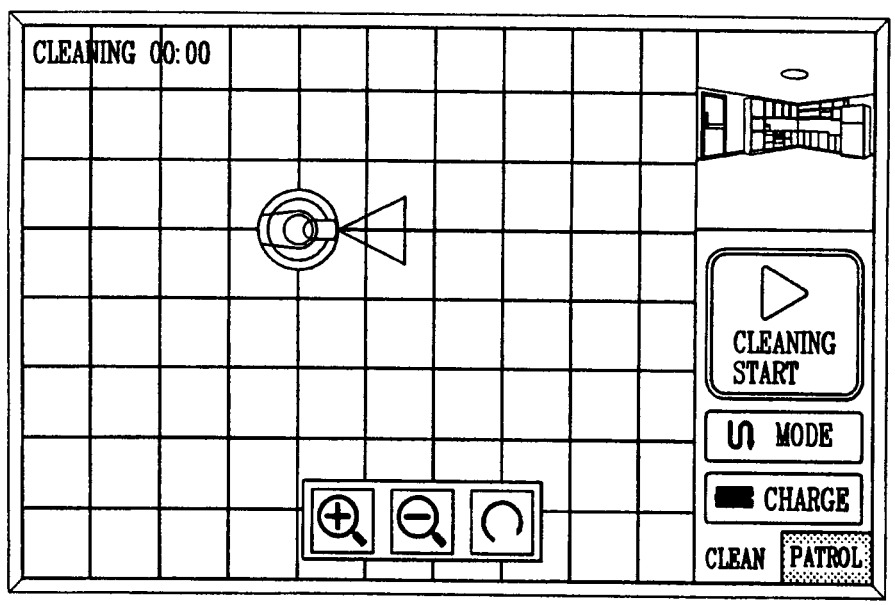
Figure 42:
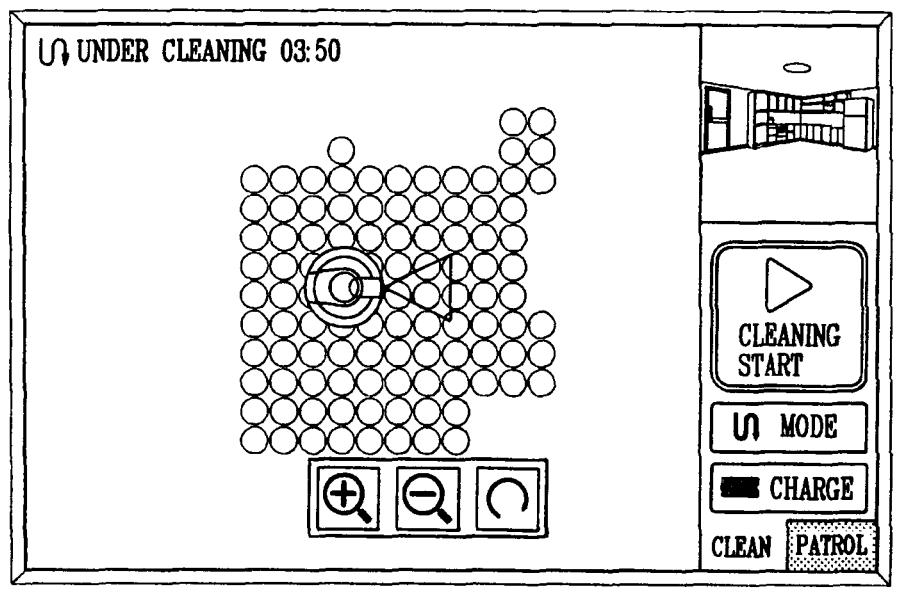
Figure 43:
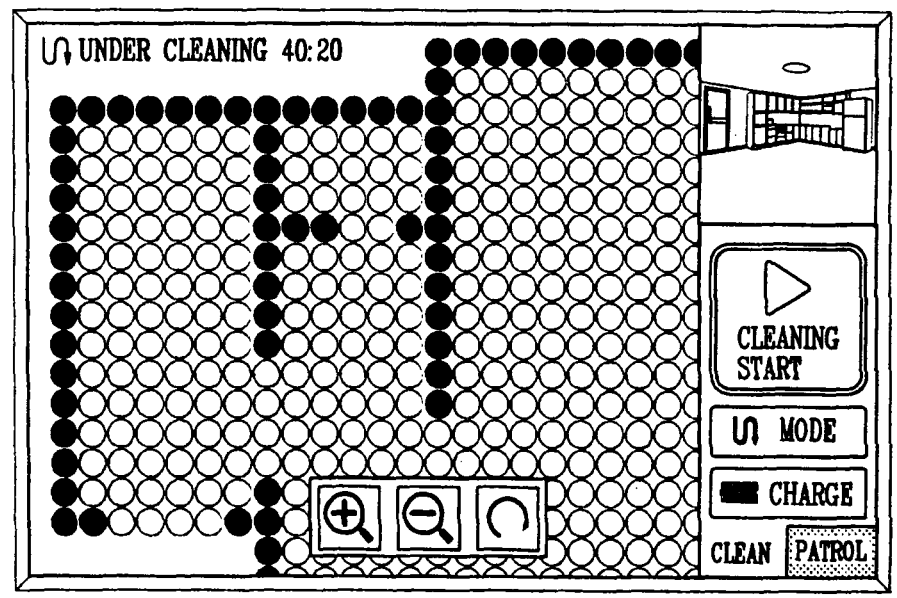

Referring to FIGS. 40 to 43, the robot cleaner may create a map while performing a cleaning operation. The terminal may display, on the screen, the operation to create the map by the robot cleaner. The robot cleaner may detect an image to transmit image information to the terminal, and may create a map to transmit the map to the terminal. In this case, as shown in FIG. 40, the display unit may display the image information on the first region, and may display the map on the second region. If the first region is dragged to the second region, or if the second region is dragged to the first region as shown in FIG. 41, the display unit may display the image information and the map in a switching manner.

Figure 44:
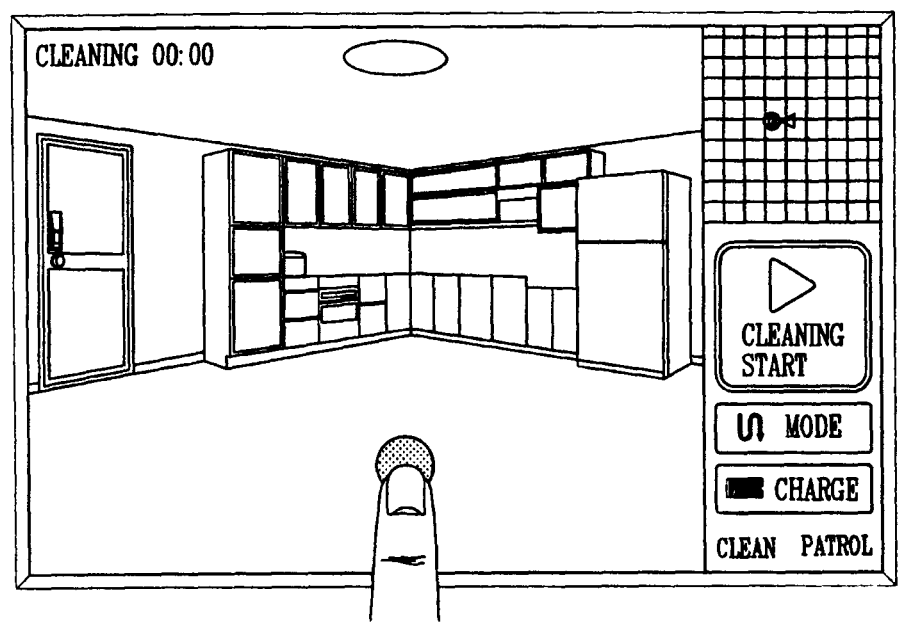
FIGS. 44 to 46 are views showing a screen of a terminal for explaining a manual operation of a robot cleaner using a terminal.
Figure 45:
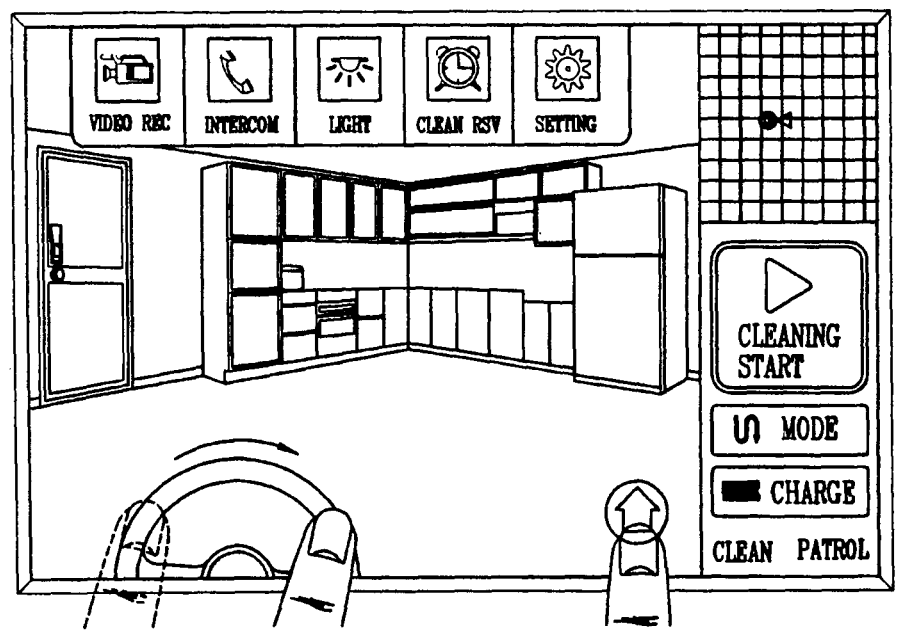
Figure 46:
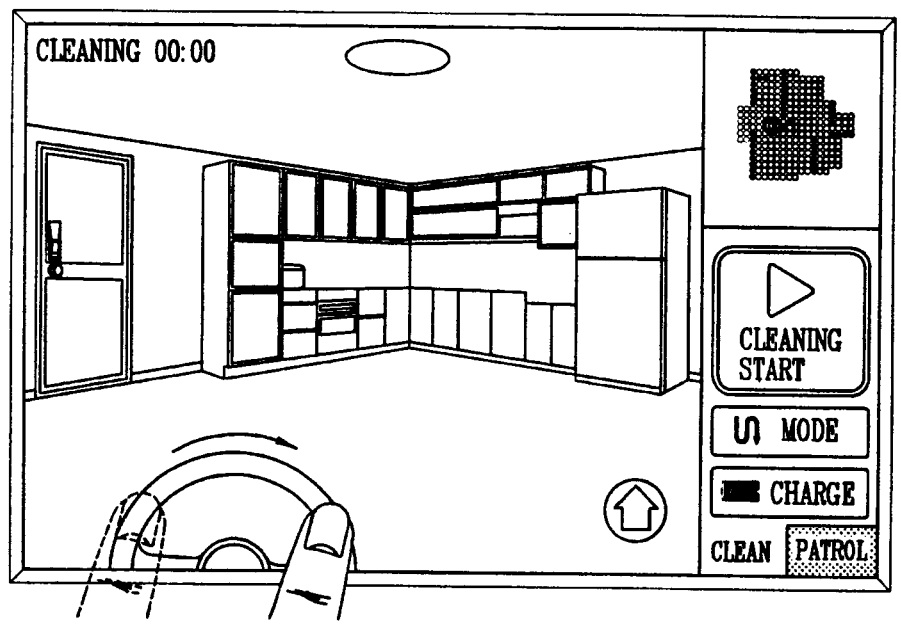

Referring to FIG. 44. if a touch input is applied to the first region while the robot cleaner performs a control command or while the robot cleaner is in a standby state, the display unit displays an option menu. The configuration of the option menu may be variable according to a design. For instance, as shown in FIG. 45, the option menu may include menus such as video-recording, interphone, lighting, cleaning reservation and setting. As shown in FIG. 45 or 46, the display unit may further display an icon for enabling a manual operation of the robot cleaner. Once a cleaning command is input through a manual operation, the terminal creates a control signal and transmits the control signal to the robot cleaner. The robot cleaner may transmit, to the terminal, the map created while performing a cleaning operation. Then, the display unit may display the map on the screen.

Figure 62:
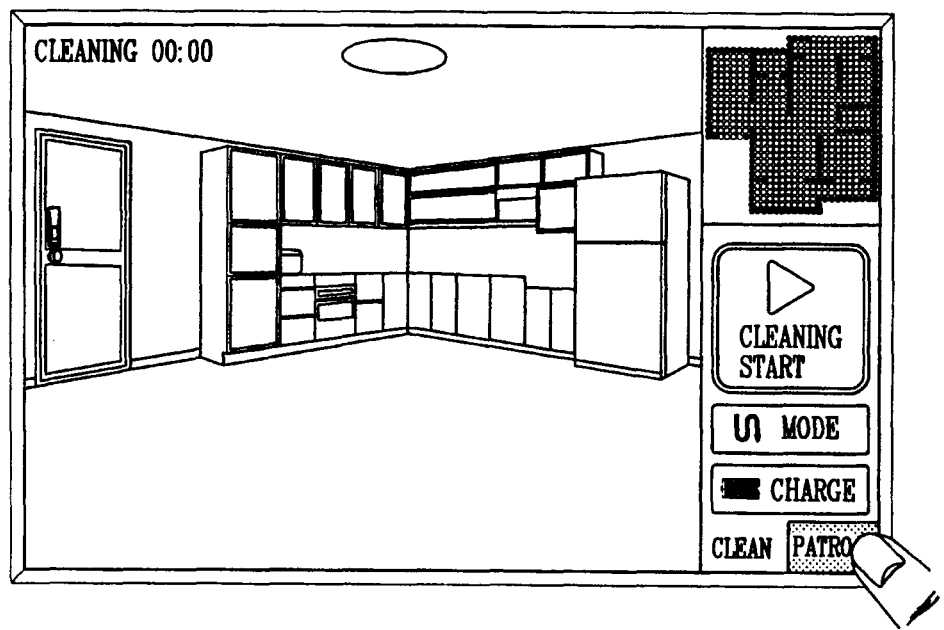
FIGS. 62 and 63 are views showing a cleaning screen and a patrol screen, respectively, the cleaning screen on which a cleaning operation being currently performed by the robot cleaner is displayed, and the patrol screen on which a patrol operation being currently performed by the robot cleaner is displayed.
Figure 63:
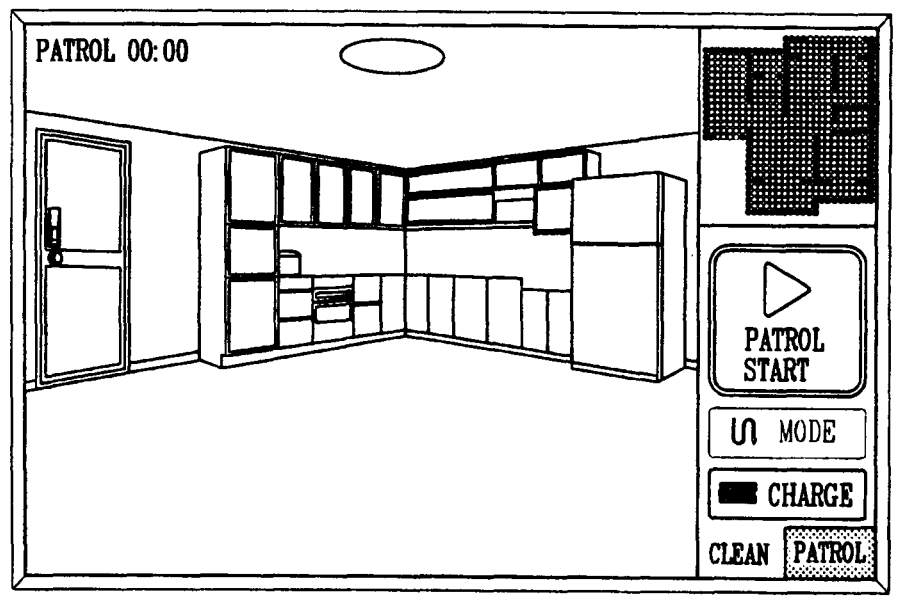

Referring to FIGS. 62 and 63, the display unit may display a cleaning tap which displays a screen for inputting a cleaning start command or a cleaning stop command, and may display a patrol tap which displays a screen for inputting a patrol command. As shown in FIG. 62, the terminal displays a control screen for inputting a cleaning command, and receives a touch input with respect to the patrol tap. Then, the terminal may display a cleaning screen on the screen of the display unit as shown in FIG. 63.

Figure 64:
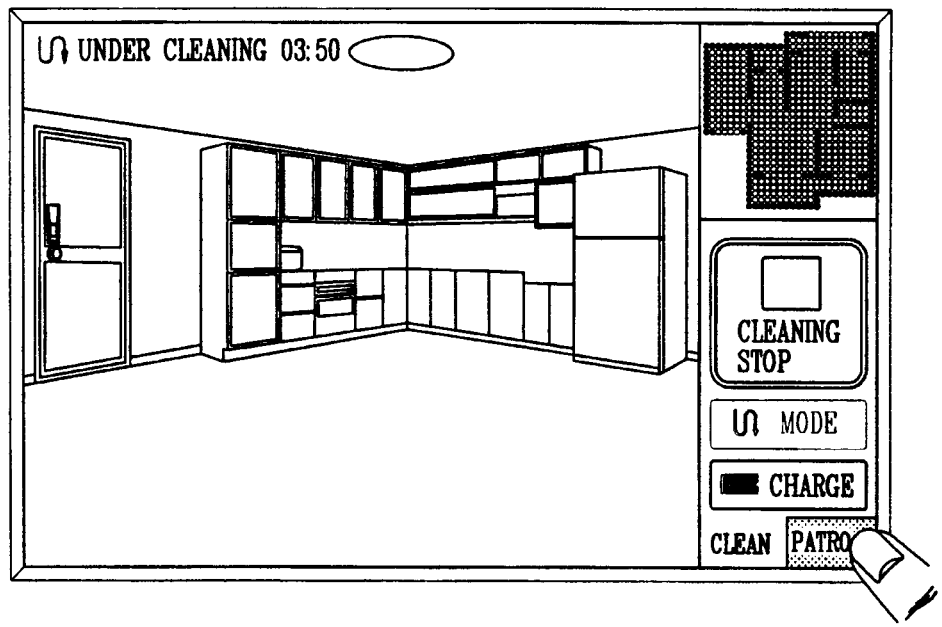
FIGS. 64 to 66 are views showing a screen of a terminal for explaining an operation to transmit a patrol command while a robot cleaner performs a cleaning operation.
Figure 65:
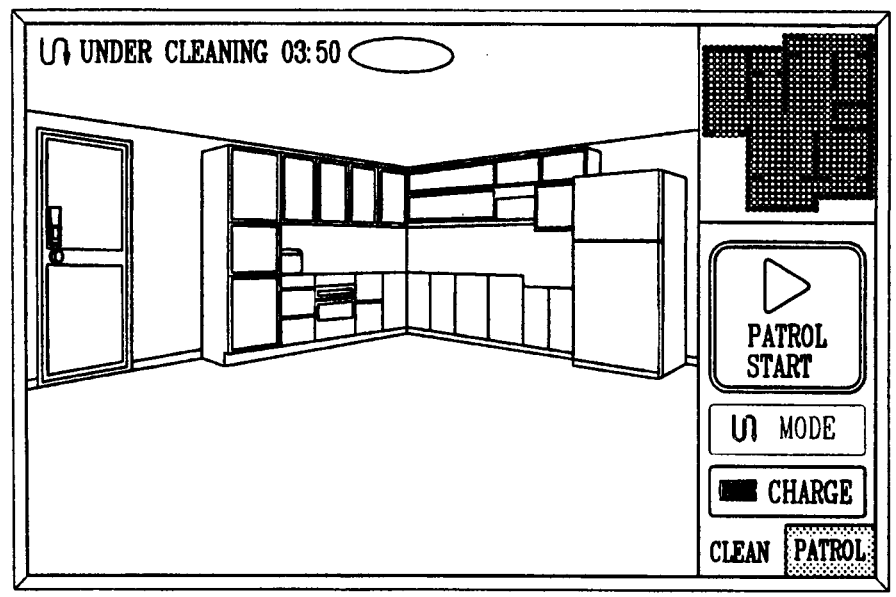
Figure 66:
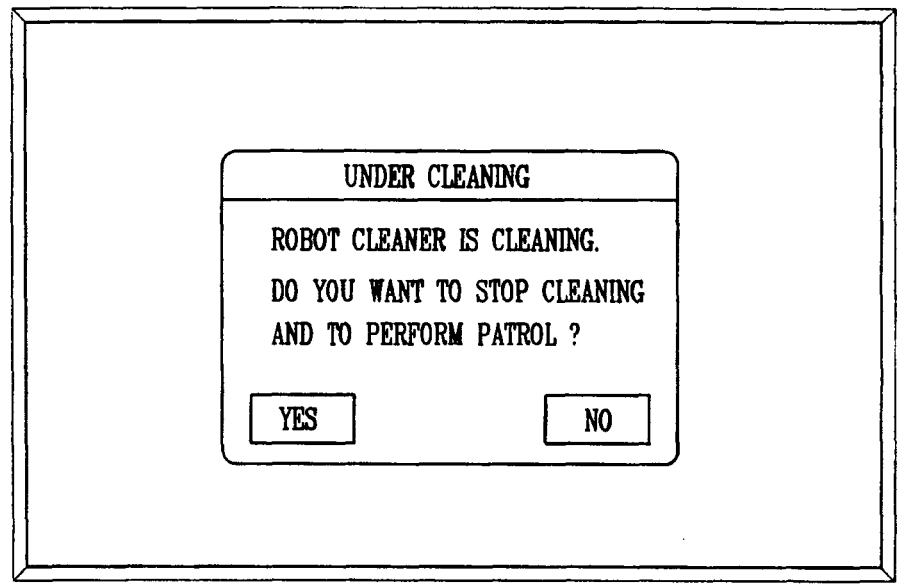

Referring to FIG. 64, while the robot cleaner performs a cleaning operation, a user may touch the patrol tap. In this case, the display unit changes the current screen into a patrol screen as shown in FIG. 65. Then, as shown in FIG. 66, the display unit displays, on the screen, a message notifying that "The robot cleaner is cleaning. Do you want to stop the cleaning and start patrol?".

Figure 96:
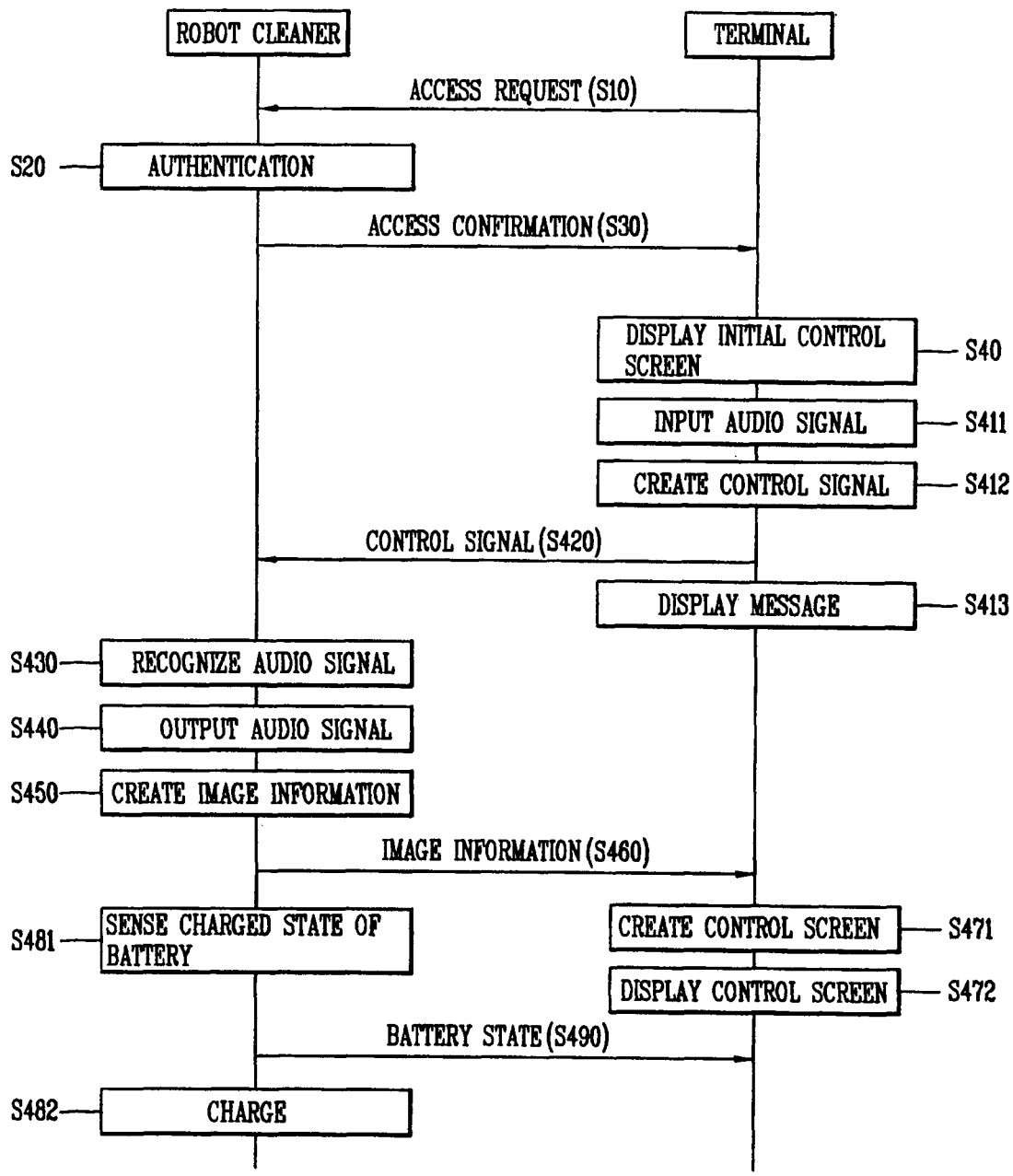

Referring to FIG. 96, a method for remotely-controlling a robot cleaner according to another embodiment includes: the terminal's receiving an input of an audio signal (S411); the terminal's converting the audio signal into a control signal, and transmitting the control signal to the robot cleaner (S412, S420); the robot cleaner's extracting the audio signal from the control signal (S430); and the robot cleaner's outputting the audio signal to the outside (S440).

The terminal receives an input of an audio signal (S411), and creates an audio signal (S412). The terminal converts the audio signal into a control signal, and transmits the control signal to the robot cleaner (S420). The robot cleaner extracts the audio signal from the received control signal (S430), and the robot cleaner's outputting the recognized audio signal to the outside through a speaker, etc. (S440). The robot cleaner may continuously transmit, to the terminal, data such as image information, a map and obstacle information (S450). And, the terminal may create a control screen using the data (S471), and display the created control screen (S472).

As another example, the terminal may receive, through a user's voice, a control command for controlling the robot cleaner. The terminal receives an input of the control command, and creates a control signal. The control command includes a moving start command, a patrol start command, a patrol stop command, a cleaning command, a charging command, a set changing command, etc. Once a user inputs a control command by inputting voice through a microphone, the terminal creates a control signal in correspondence to a communication protocol, and transmits the control signal to the robot cleaner through a network. The robot cleaner extracts a control command included in the control signal, and executes the control command. The robot cleaner continuously transmits, to the terminal, data such as image information, a map and obstacle information (S450). And, the terminal creates a control screen using the data (S471), and displays the created control screen (S472).

Referring to FIG. 96, the robot cleaner may continuously sense a charged state of the battery while cleaning or moving or patrolling (S481), and may transmit sensing information to the terminal (S490). Even if there is no charging command received from the terminal, the robot cleaner may move to a charging station based on the sensing information, and perform a charging operation (S482).

Referring to FIG. 96, the method for remotely controlling a robot cleaner may further include the terminal's requesting for access to the robot cleaner (S10), the robot cleaner's authenticating the access (S20), the robot cleaner's approving and verifying the access to the terminal (S30), and the terminal's displaying an initial control screen (S40).

Once the terminal executes a remote control program for remotely controlling the robot cleaner, a log-in window for inputting log-in information on the robot cleaner is created. The remote control program may be pre-stored in a memory of the terminal, or may be downloaded from a server which stores therein a remote control program. In case of a smart phone, a remote control program is downloaded in the form of an application, and then is displayed on the screen of the display unit in the form of an icon, so that a user can execute the application by touching the icon. Once the user inputs log-in information, the terminal requests for access to the robot cleaner (S10). The robot cleaner may execute an authentication with respect to the log-in information, and the terminal may display, on the screen, a message informing that the terminal is accessing the robot cleaner.

The terminal may be accessed to one of a plurality of robot cleaners. The display unit displays a plurality of connectable robot cleaners, in the form of a list or icons. Once a user selects one of the plurality of robot cleaners, the selected robot cleaner executes an authentication with respect to the terminal.

After the authentication, the robot cleaner transmits an access confirmation signal to the terminal (S30), and the terminal displays an initial control screen (S40). The initial control screen may include an option menu, or may include data such as image information and a map. In the latter case, upon detection of a touch input to a first region, the display unit may display an option menu. And, the controller may control the display unit to temporarily display an option menu and then to display data as the initial control screen.

If log-in information is not consistent with pre-stored authentication information, the robot cleaner transmits an access non-acknowledgement signal to the terminal. Then, the terminal displays an error message such as 'ID or password is not correct. Please try again after check.'. Also, if a robot cleaner to be accessed has already accessed other terminal, or a robot cleaner to be accessed is being used by other user, the display unit may display an error message. The terminal may display a guide message according to a communication type. If a robot cleaner selected by a user has not been registered to a network, or if the robot cleaner has not accessed a network, the terminal may display an error message.

Figure 67:
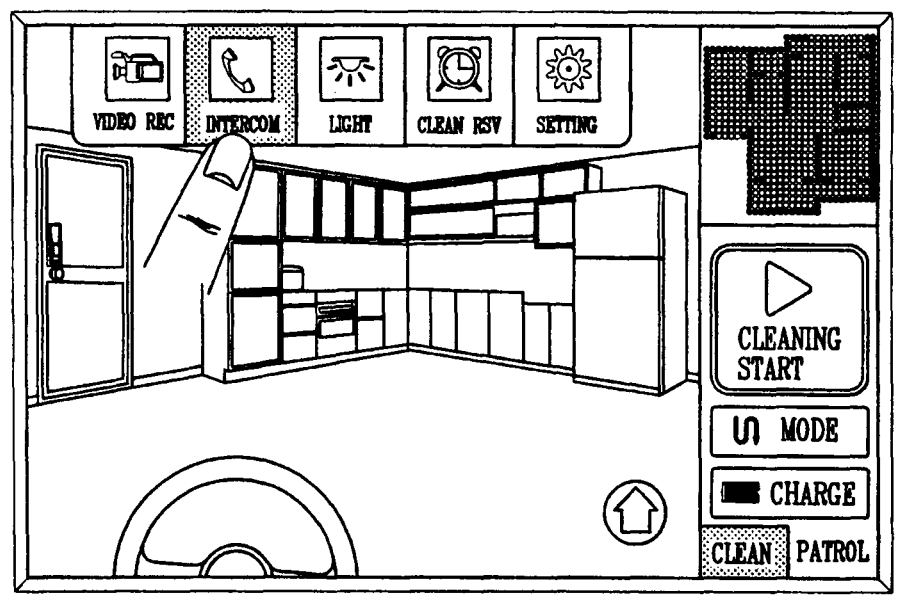
FIGS. 67 to 72 are views showing an example of a screen of a terminal for explaining an operation to execute a voice call using the terminal and a robot cleaner.
Figure 68:
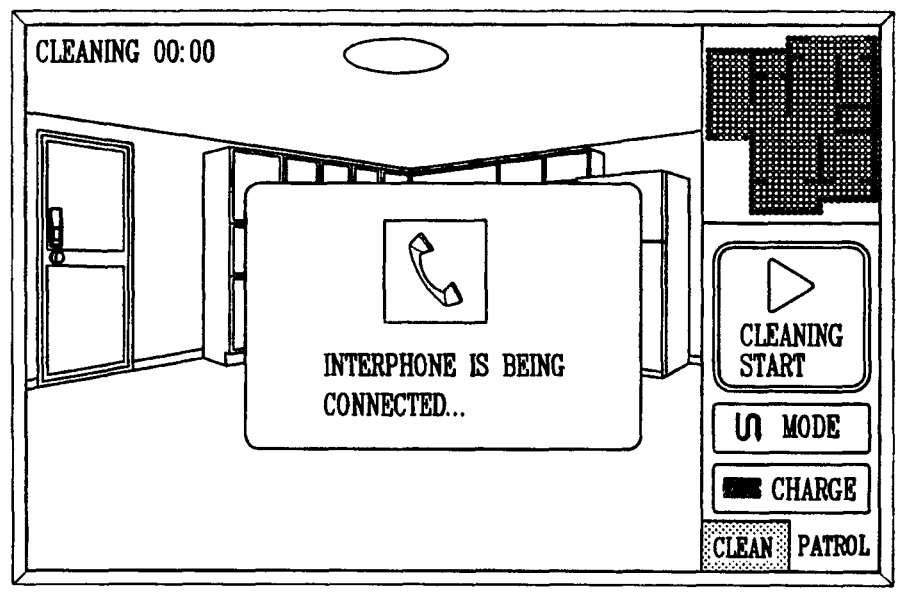
Figure 69:
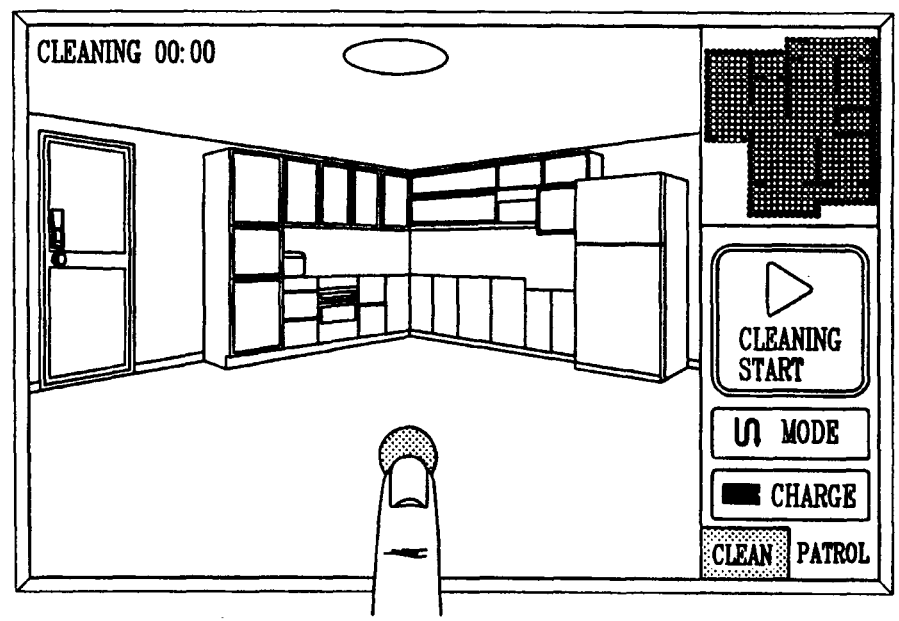
Figure 70:
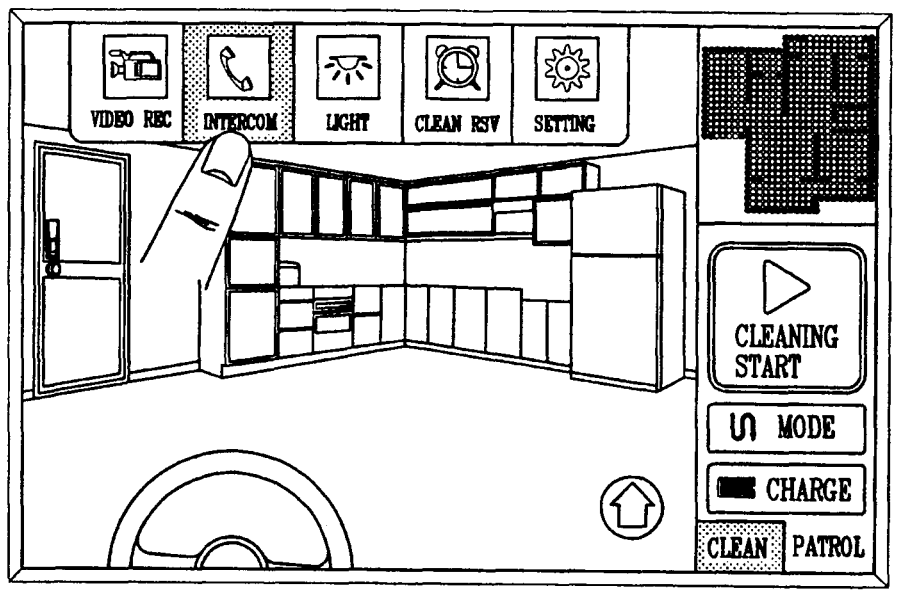
Figure 71:
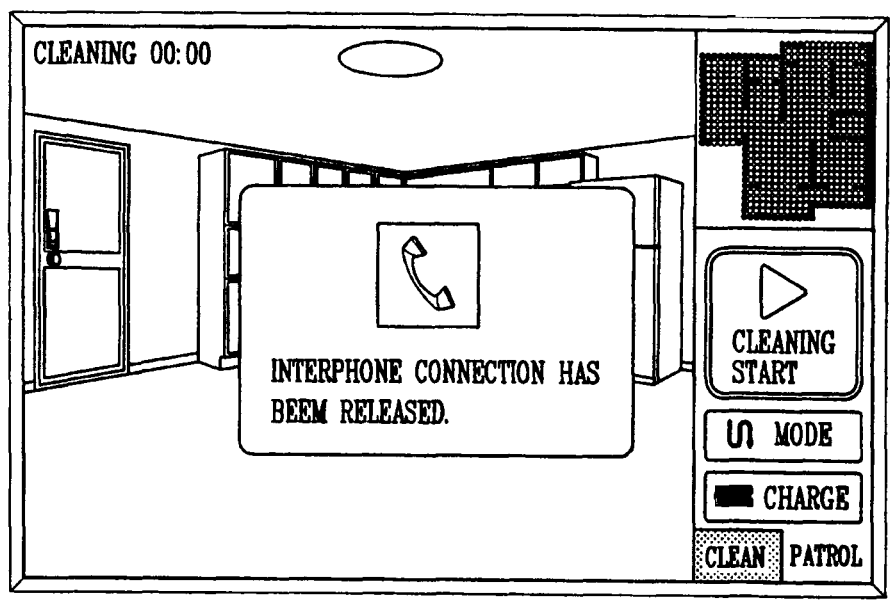
Figure 72:
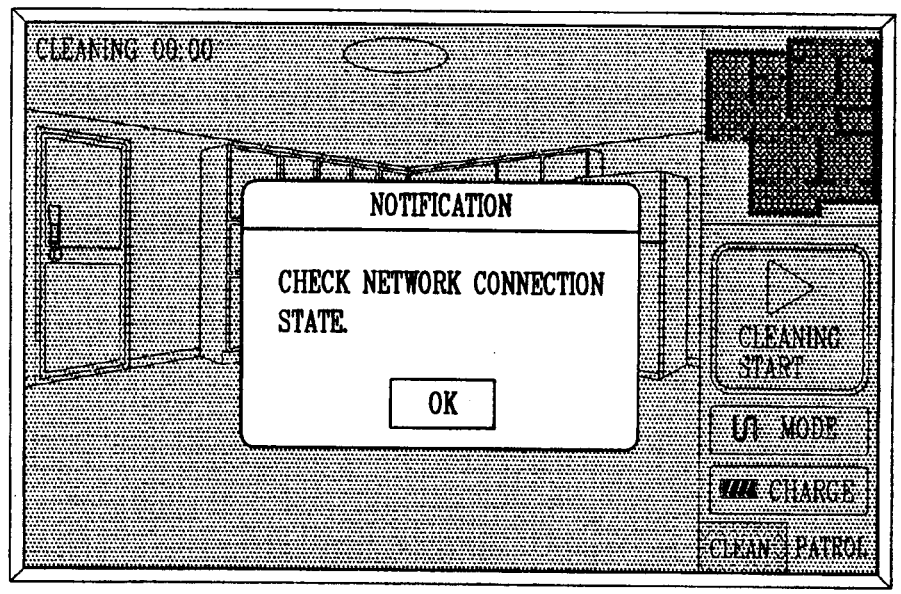

Referring to FIG. 67, if a touch input is applied to the first region while the robot cleaner performs a control command or while the robot cleaner is in a standby state, the display unit displays an option menu. The configuration of the option menu may be variable according to a design. For instance, as shown in FIG. 67, the option menu may include menus such as video-recording, interphone, lighting, cleaning reservation and setting. The display unit may further display an icon for enabling a manual operation of the robot cleaner. Once a cleaning command is input through a manual operation, the terminal creates a control signal and transmits the control signal to the robot cleaner. As shown in FIG. 67, upon detection of a user's touch input with respect to an interphone icon, the terminal starts to execute an interphone function. Referring to FIG. 68, the display unit may display, on the screen, a message notifying that "Robot cleaner is being connected to interphone.". As shown in FIG. 69, if a user touches the screen of the display unit while the robot cleaner is being connected to the interphone, the display units re-displays an option menu. If a user touches the interphone icon again as shown in FIG. 70, the terminal releases the interphone connection. As shown in FIG. 71, the display unit may display, on the screen, a message notifying that "Interphone connection has been released.". If an error occurs to a network during the interphone connection, the display unit may display a message as shown in FIG. 72, the message notifying that "Please check network connection state.".

Figure 73:
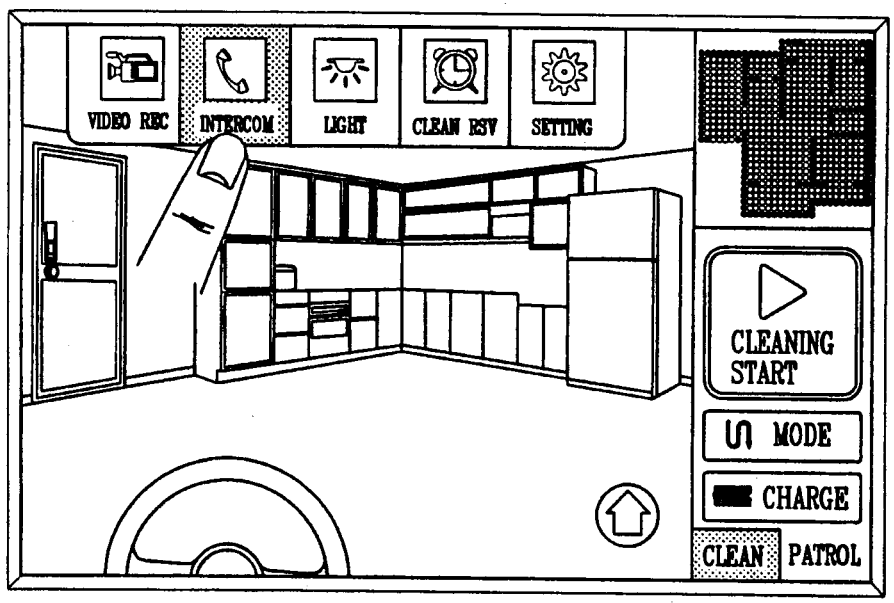
FIGS. 73 to 77 are views showing another example of a screen of a terminal for explaining an operation to execute a voice call using the terminal and a robot cleaner.
Figure 74:
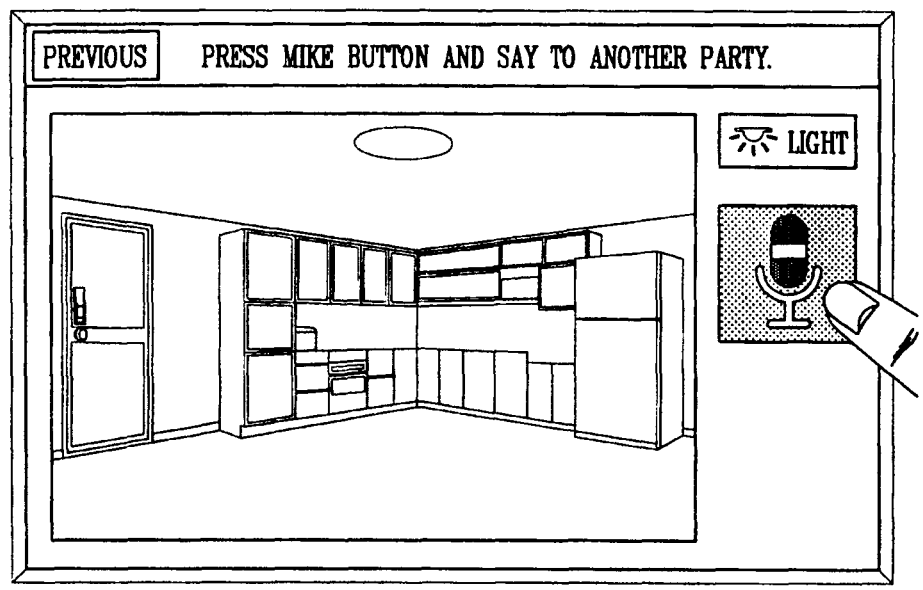
Figure 75:
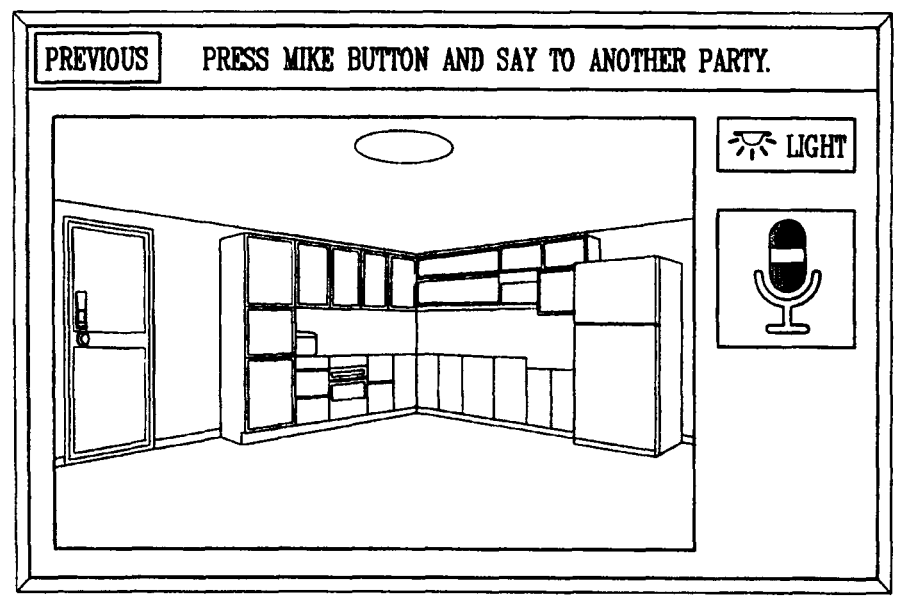
Figure 76:
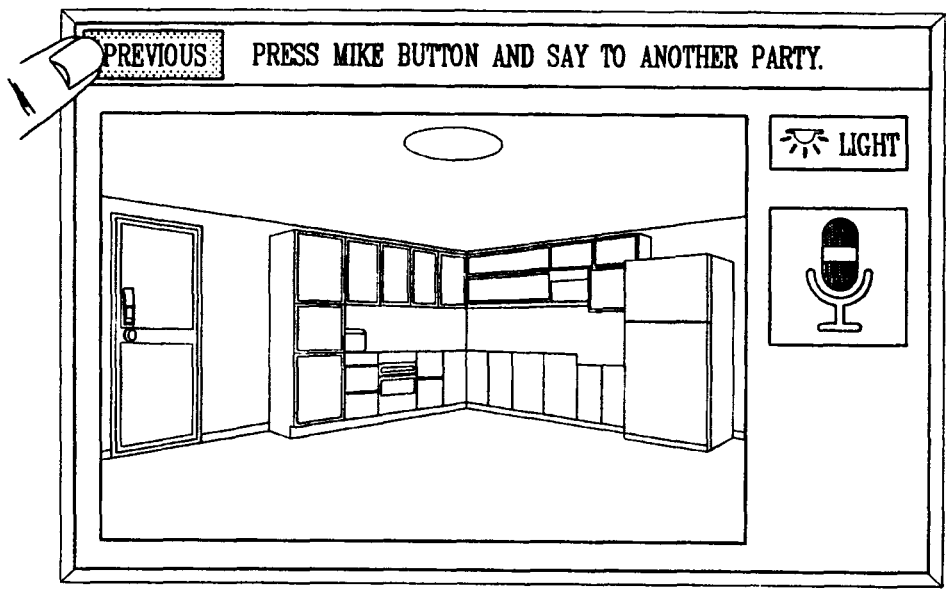
Figure 77:
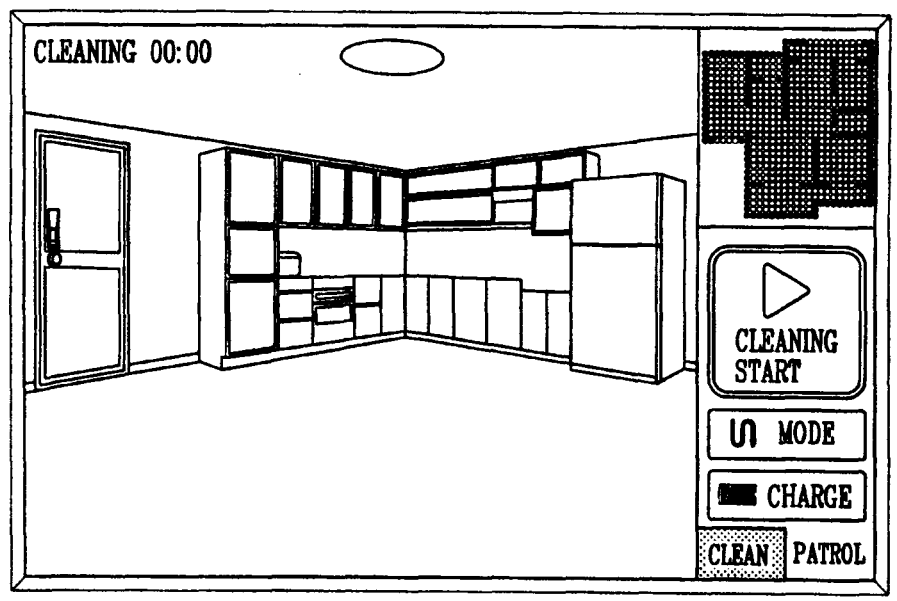

As shown in FIG. 73, upon detection of a user's touch input with respect to an interphone icon, the terminal starts to execute an interphone function. The terminal may receive an input of a command instructing a speaker of the robot cleaner to be activated or non-activated, through an interphone icon. As shown in FIG. 74 or 75, the terminal displays a microphone icon on the screen of the display unit, and executes an interphone function if a user touches the microphone icon (presses a microphone button). As shown in FIG. 76, the display unit may further display a previous button for converting the current screen to the previous control screen. Once a user presses the previous button, the display unit displays the previous control screen (FIG. 77).

According to another embodiment, the robot cleaner receives an input of a sound from the outside through an audio recognition unit mounted thereat, and extracts an audio signal from the sound. Then, the robot cleaner recognizes the extracted audio signal, and transmits the audio signal to the terminal. Then, the terminal receives an input of a user's voice through a microphone mounted thereat, and creates a control signal therefrom. Then, the terminal transmits the control signal to the robot cleaner, thereby implementing a phone function. The robot cleaner may output the audio signal received from the terminal, to the outside, through an audio output unit such as a speaker mounted thereat.

According to still another embodiment, the robot cleaner may pre-store an audio signal and a control command corresponding to the audio signal, and may extract a control command corresponding to an audio signal received from the terminal thus to execute the control command. The audio signal transmitted to the robot cleaner from the terminal, is an audio signal applied to the terminal and then converted into a control signal by the terminal. On the contrary, the terminal may pre-store an audio signal and a control command corresponding to the audio signal. And, if an input audio signal is a control command for controlling the robot cleaner, the terminal may convert the audio signal into a control signal thus to transmit to the robot cleaner. The robot cleaner having received the control signal, may extract a control command from the control signal, and may execute the control command.

Figure 78:
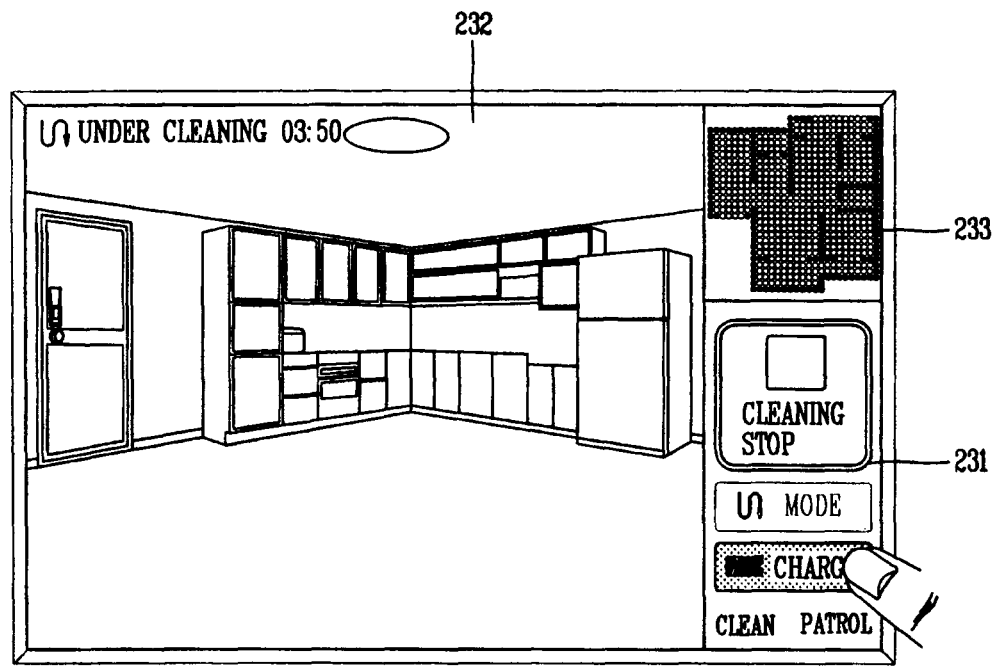
FIGS. 78 to 82 are views showing a screen of a terminal for explaining a charging operation while a robot cleaner performs a cleaning operation.
Figure 79:
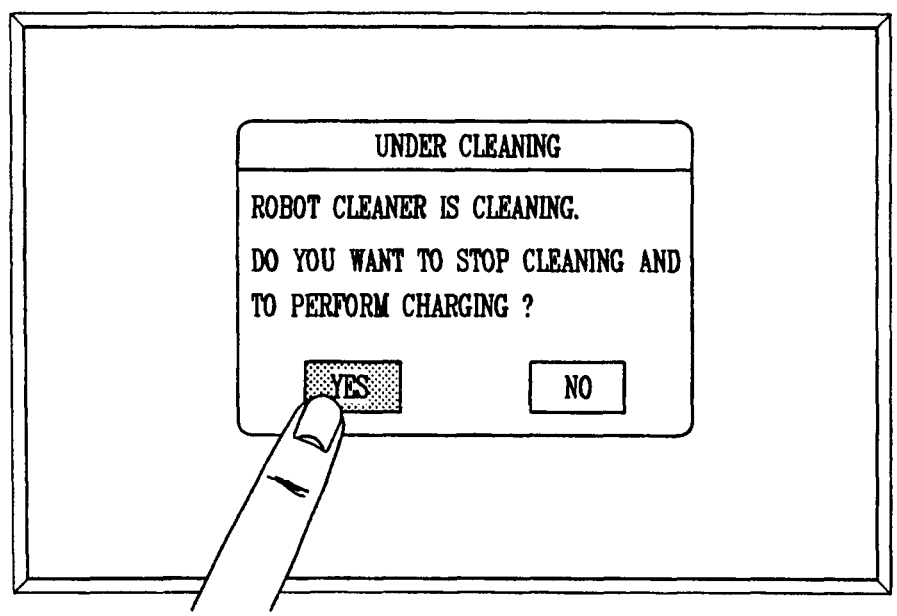
Figure 80:
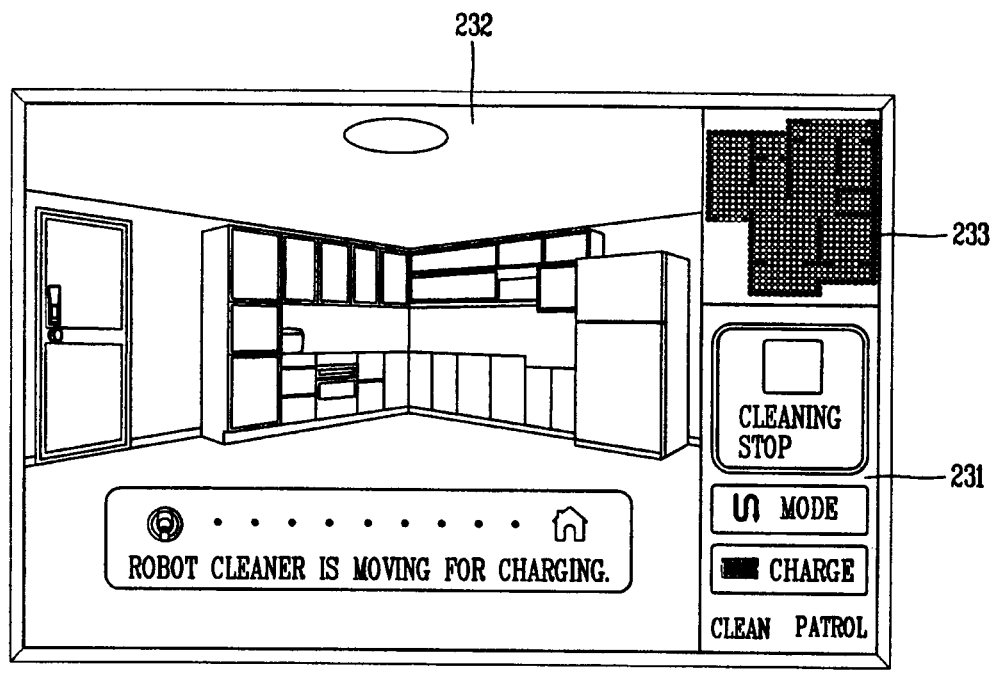
Figure 81:
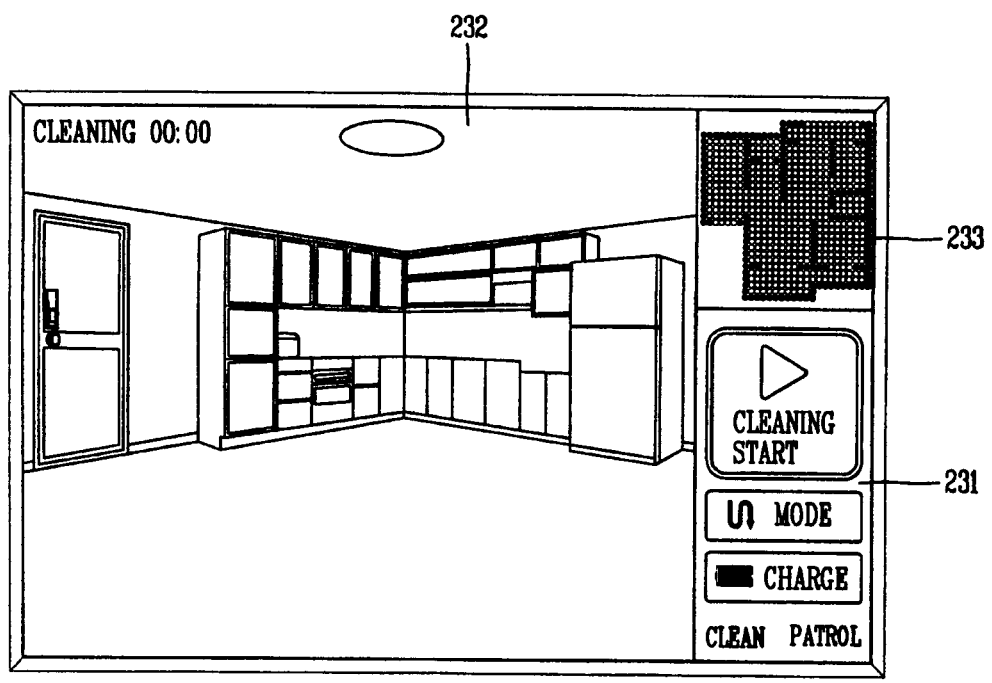
Figure 82:
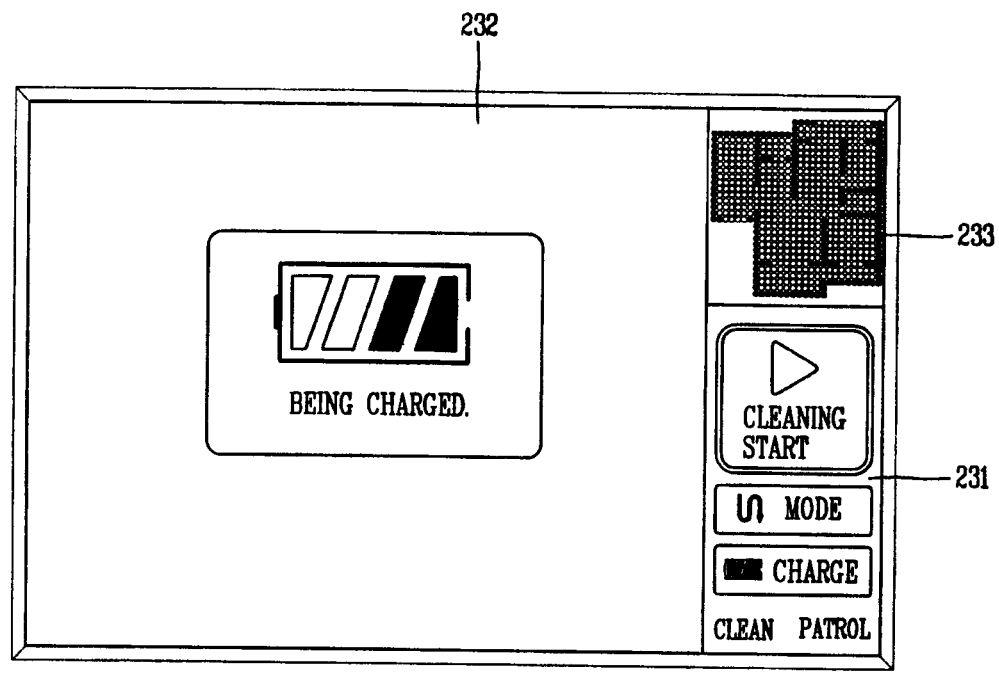

Unlike FIGS. 83 to 86, FIGS. 78 to 82 show a case where a user inputs a charging command to the robot cleaner through the terminal. Referring to FIG. 78, while the robot cleaner 100 performs a cleaning operation, a user may input a charging command through the terminal 200. The display unit 230 displays one or more icons including a charging icon. Upon receipt of a charging command while the robot cleaner 100 performs a cleaning operation, the terminal may display, on the screen, a message informing that that the robot cleaner is performing a cleaning operation, as shown in FIG. 79. That is, if a charging icon is touched, the display unit displays a charging message on a touch recognition region (first region). If a cleaning stop command is input, the terminal transmits, to the robot cleaner, a control signal corresponding to a charging command. If a charging icon is touched and a cleaning stop icon is touched, the controller 220 creates a control signal corresponding to a charging command. As shown in FIGS. 80 to 82, the robot cleaner stops the cleaning operation based on a charging command, and moves to a charging station thus to perform a charging operation. After real-time receiving state information, the terminal may create a control screen and display the created control screen.

As shown in FIGS. 87 to 92, a control program of the robot cleaner may be updated.

Figure 87:
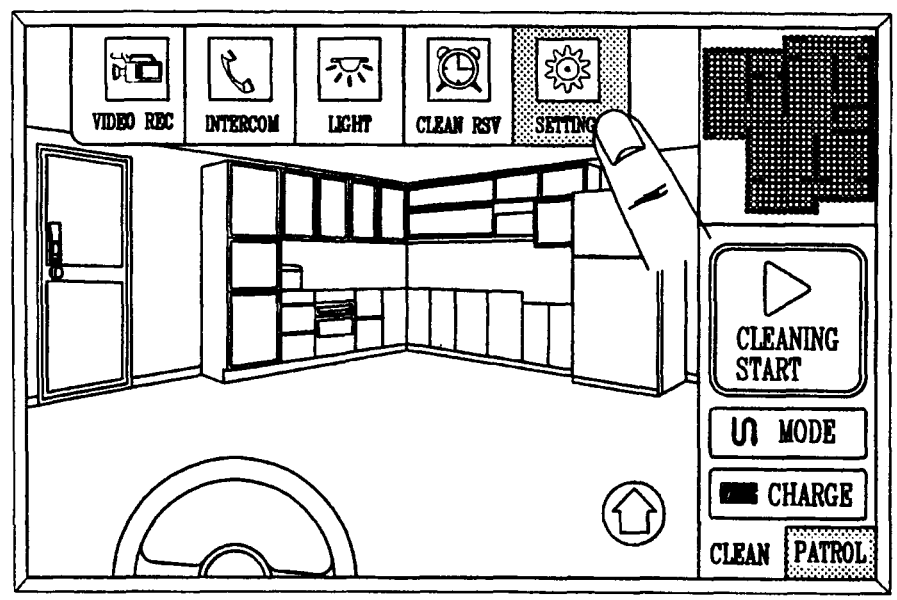
FIGS. 87 to 92 are views showing a screen of a terminal for explaining an operation to update a control program of a robot cleaner.

Referring to FIG. 87, the controller 220 creates a control screen based on data such as a map, image information, obstacle information, position information, and state information, the data received from the robot cleaner by the radio communication unit 210. As shown in FIG. 87, the control screen may be divided into one or more regions. Referring to FIG. 87, the display unit 230 divides a touch recognition region into three regions. The first region displays image information, the second region displays a map, and the third region displays an icon for inputting a control command, etc.

As shown in FIG. 87, if a touch input is applied to the first region while the robot cleaner performs a control command or while the robot cleaner is in a standby state, the display unit displays an option menu. The configuration of the option menu may be variable according to a design. For instance, as shown in FIG. 87, the option menu may include menus such as video-recording, interphone, lighting, cleaning reservation and setting. The display unit may further display an icon for enabling a manual operation of the robot cleaner. Once a cleaning command is input through a manual operation, the terminal creates a control signal and transmits the control signal to the robot cleaner. As shown in FIG. 87, upon detection of a user's touch input with respect to a setting icon, the terminal starts to change a setting of the robot cleaner.

Figure 88:
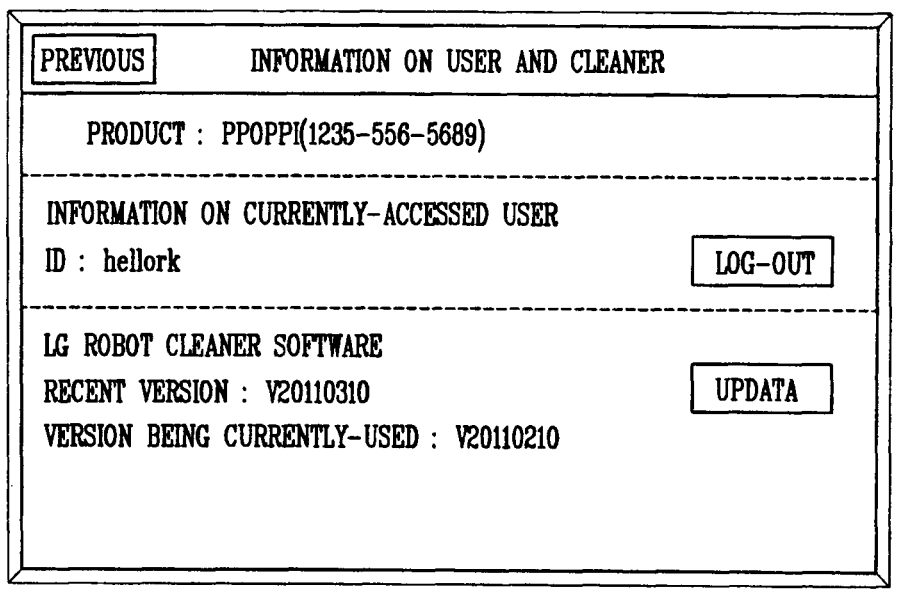

Referring to FIG. 88, the display unit displays, on the screen, information on a user and the robot cleaner. The information includes a user being currently accessed, a product name, the current version of a control program, a recent version of the control program, etc. If the current version is different from the recent version, the terminal may automatically create an update command thus to transmit the update command to the robot cleaner. If a user having checked the difference between the current version and the recent version touches an update button, the terminal may create an update command thus to transmit the update command to the robot cleaner.

Figure 89:
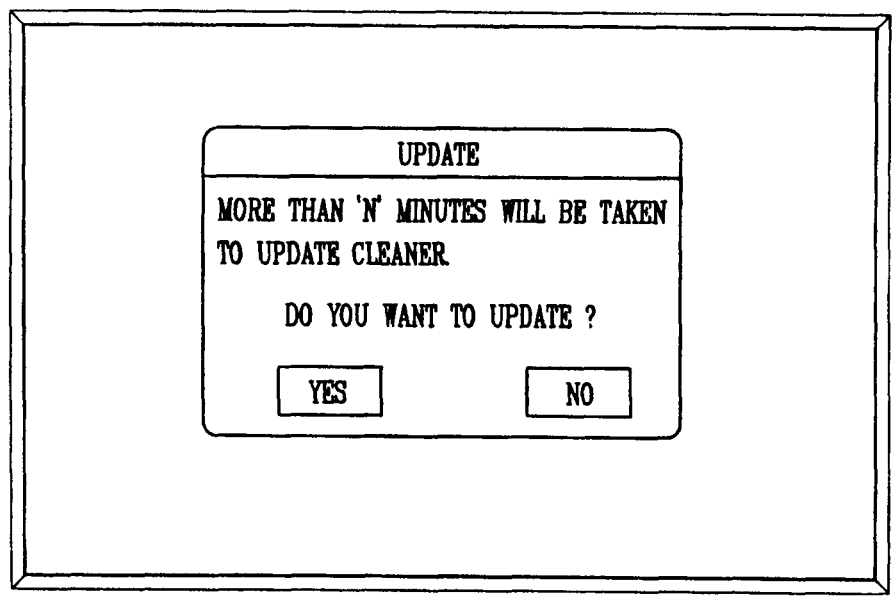
Figure 90:
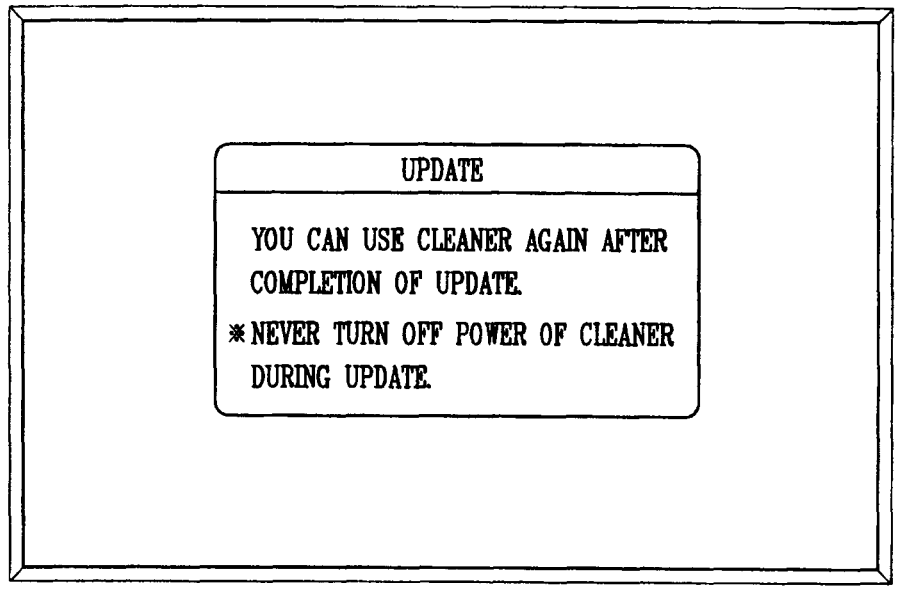
Figure 91:
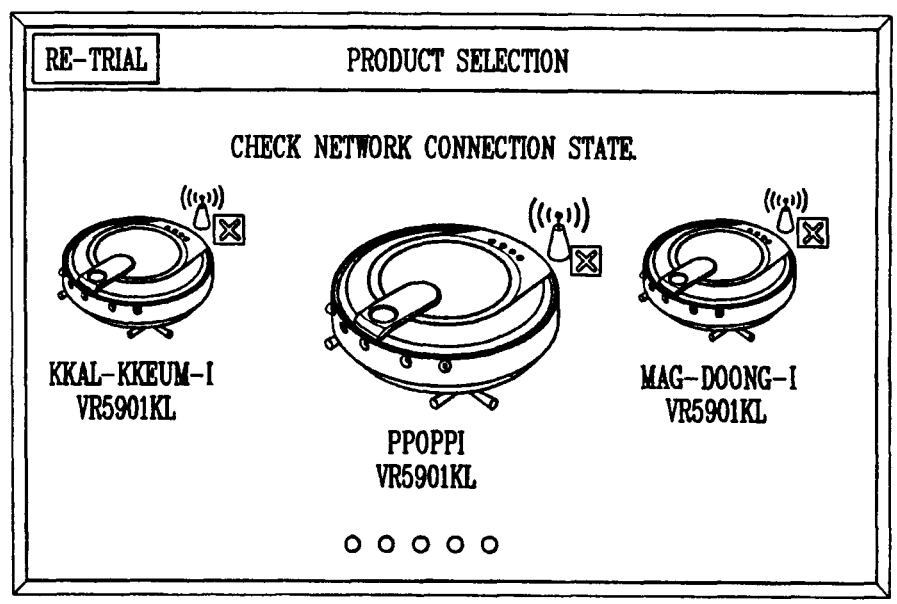

As shown in FIG. 89, the display unit may display, on the screen, a message indicating that the update is being performed. As shown in FIG. 90, the display unit may display, on the screen, a message notifying that the robot cleaner cannot be used. In this case, a user may get to know that the robot cleaner and the terminal have been disconnected from each other. As shown in FIG. 91, if there are a plurality of robot cleaners to which the terminal can access, the robot cleaners may be displayed in the form of a list or icons. During an update process, a user may check that the robot cleaner and the terminal have been disconnected from each other. In this case, the display unit may display, on the screen, a guide message such as "Check network connection state.".

Figure 92:
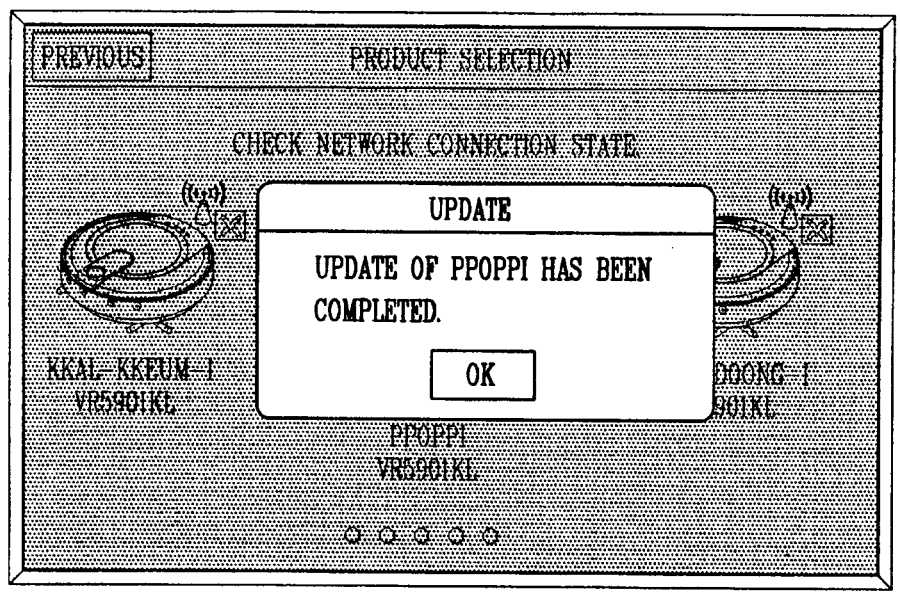

Upon completion of the update of the control program of the robot cleaner, the display unit displays, on the screen, a completion message as shown in FIG. 92, the message informing that "Update has been completed.". In this case, a user may get to know that the robot cleaner and the terminal have been re-connected to each other.

The present disclosure may have the following advantages.

Firstly, since the robot cleaner and the terminal are accessed to each other through a network, the robot cleaner can be controlled in more various manners.

Secondly, a situation inside a house can be real-time checked from the outside, and the satiation can be rapidly handled according to a state of the robot cleaner.

Thirdly, the robot cleaner can perform automatic cleaning, manual cleaning, cleaning mode change, etc. in an autonomous manner, or in a remote-controlled manner by the terminal.

Fourthly, the robot cleaner can real-time check a battery state during a cleaning operation thus to perform a charging operation, and can real-time transmit state information to the terminal.

Fifthly, a voice call function and an interphone function or a video call function can be implemented through the terminal and the robot cleaner.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A robot cleaner, comprising:
    an image detection unit configured to create image information by capturing a periphery;
    a signal input unit configured to receive an input of a sound;
    a communication unit configured to receive a control signal from an external terminal, and to transmit, to the terminal, a response signal with respect to the control signal; and
    a control unit configured to execute a control command by extracting the control command from the control signal, and configured to create the response signal,
    wherein the control unit is configured to extract a cleaning start command or a cleaning stop command from the control signal, and is configured to perform a cleaning operation according to the cleaning start command, or to stop the cleaning operation according to the cleaning stop command, and
    wherein the robot cleaner transfers both the image information and the inputted sound to the external terminal simultaneously when the robot cleaner outputs a received audio signal and a received image information both of which are sent from the external terminal,
    wherein the external terminal includes:
    a radio communication unit configured to transmit a control signal to the robot cleaner, and to receive data from the robot cleaner;
    a controller configured to create the control signal, and to create a control screen using the data; and a display unit having a touch recognition region for inputting the control command, and configured to display the control screen,
wherein the touch recognition region includes:
a first region configured to display the control screen, and on which the control command is input; and
a second region having a size equal to or less than that of the first region.

2. The robot cleaner of claim 1, wherein the communication unit is configured to receive cleaning reservation information from the terminal, and the control unit performs a cleaning operation based on the cleaning reservation information.

3. The robot cleaner of claim 1, further comprising:
an obstacle detection unit having one or more sensors, and configured to detect peripheral obstacles, and to output obstacle information; and
a position recognition unit having one or more sensors, and configured to recognize a position of the robot cleaner, and configured to output position information,
wherein the control unit is configured to create a map based on at least one of the image information, the obstacle information and the position information.

4. The robot cleaner of claim 3, wherein the robot cleaner creates the map and transfers the created map to the external terminal while performing the cleaning operation according to a manual operation, and the external terminal displays a process of creating the map on a screen.

5. The robot cleaner of claim 4, wherein the robot cleaner creates the map and transfers the created map to the external terminal while performing the cleaning operation based on a cleaning command inputted by a manual operation.

6. The robot cleaner of claim 1, wherein the control unit is configured to extract an audio signal from the control signal, and to execute a control command corresponding to the audio signal.

7. The robot cleaner of claim 1, further comprising an audio recognition unit configured to extract an audio signal from a peripheral sound, and to recognize the extracted audio signal, and
wherein the control unit is configured to convert the audio signal recognized by the audio recognition unit, into the response signal.

8. The robot cleaner of claim 7, wherein the audio recognition unit includes:
a noise filter configured to remove noise from the inputted sound by the signal input unit; and
an audio signal extractor configured to extract an audio signal from the sound having noise removed therefrom.

9. A system for remotely-controlling a robot cleaner, the system comprising:
a robot cleaner configured to execute a control command included in a control signal by receiving the control signal, and configured to transmit one or more data including image information or a cleaning map; and
a terminal configured to create the control signal corresponding to the control command and to transmit the control signal to the robot cleaner, and configured to create a control screen based on the data and to display the control screen,
wherein the control command includes a cleaning start command or a cleaning stop command, and
wherein the robot cleaner transfers both the image information and an inputted sound by a signal input unit to the terminal simultaneously when the robot cleaner outputs a received audio signal and a received image information both of which are sent from the terminal,
wherein the external terminal includes:
a radio communication unit configured to transmit the control signal to the robot cleaner, and to receive the data from the robot cleaner;
a controller configured to create the control signal, and to create a control screen using the data; and
a display unit having a touch recognition region for inputting the control command, and configured to display the control screen,
wherein the touch recognition region includes:
a first region configured to display the control screen, and on which the control command is input; and
a second region having a size equal to or less than that of the first region.

10. The system of claim 9, wherein the display unit displays, on the touch recognition region, a cleaning start icon for inputting a cleaning start command, and a cleaning stop icon for inputting a cleaning stop command, in an alternating manner.

11. The system of claim 10, wherein the display unit further includes a mode icon for setting a cleaning mode, and
wherein the controller creates a mode setting screen, upon receipt of a touch input with respect to the mode icon.

12. The system of claim 10, wherein the display unit further includes a cleaning reservation icon for setting cleaning reservation, and
wherein the controller creates a cleaning reservation screen, upon receipt of a touch input with respect to the cleaning reservation icon.

13. The system of claim 12, wherein the terminal creates cleaning reservation information thus to transmit to the robot cleaner, and
wherein the robot cleaner executes a cleaning operation based on the cleaning reservation information.

14. The system of claim 9, wherein the terminal further includes a microphone configured to receive an input of the audio signal, and
wherein the controller is configured to create a control signal based on the audio signal.

15. The system of claim 14, wherein the robot cleaner is configured to extract a control command from the audio signal, and to execute the control command.

16. The system of claim 9, wherein the display unit includes a microphone icon configured to activate or non-activate an audio output unit of the robot cleaner.

17. The system of claim 9, wherein the terminal further includes a camera configured to detect image information by capturing a periphery.

18. A method for remotely-controlling a robot cleaner in a system including a robot cleaner, and a terminal for controlling the robot cleaner, the method comprising:
the robot cleaner's receiving a control signal from the terminal;
the robot cleaner's extracting, from the control signal, a control command including a cleaning start command or a cleaning stop command; and
the robot cleaner's performing a cleaning operation according to the cleaning start command, or the robot cleaner's stopping the cleaning operation according to the cleaning stop command,
wherein the method further comprising:
the robot cleaner's receiving an input of a sound and creating image information by capturing a periphery;
the robot cleaner's transferring both the inputted sound and the image information to the terminal simultaneously when the robot cleaner's outputting a received audio signal and a received image information both of which are sent from the terminal, wherein the external terminal includes:

a radio communication unit configured to transmit the control signal to the robot cleaner, and to receive the data from the robot cleaner;

a controller configured to create the control signal, and to create a control screen using the data; and a display unit having a touch recognition region for inputting the control command, and configured to display the control screen, wherein the touch recognition region includes:

a first region configured to display the control screen, and on which the control command is input; and a second region having a size equal to or less than that of the first region.

19. The method of claim 18, further comprising:
the robot cleaner's transmitting, to the terminal, one or more data including the image information or a map.

20. The method of claim 19, further comprising:
the terminal's creating cleaning reservation information with respect to the robot cleaner; and
the terminal's transmitting the cleaning reservation information to the robot cleaner,
wherein the cleaning operation is performed or stopped based on the cleaning reservation information.

21. The method of claim 19, further comprising:
the terminal's receiving an input of the audio signal;
the terminal's converting the audio signal into a control signal, and transmitting the control signal to the robot cleaner;
the robot cleaner's extracting the audio signal from the control signal; and
the robot cleaner's executing the control command extracted from the control signal.

22. The method of claim 18, further comprising:
the terminal's receiving an input of the audio signal corresponding to the control command;
the robot cleaner's extracting the control command from the audio signal.

23. The method of claim 18, further comprising:
the robot cleaner's receiving an input of a sound from the outside; and
the robot cleaner's converting the sound into a response signal, and transmitting the response signal to the terminal.

* * * * *